United States Patent
Tabata et al.

(10) Patent No.: US 6,719,076 B1
(45) Date of Patent: Apr. 13, 2004

(54) VEHICLE BRAKED BY MOTOR TORQUE AND METHOD OF CONTROLLING THE VEHICLE

(75) Inventors: Atsushi Tabata, Okazaki (JP); Yutaka Taga, Aichi-gun (JP); Seiji Nakamura, Nagoya (JP); Masaya Amano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/889,970

(22) PCT Filed: Jan. 31, 2000

(86) PCT No.: PCT/JP00/00526

§ 371 (c)(1),
(2), (4) Date: Jul. 24, 2001

(87) PCT Pub. No.: WO00/46062

PCT Pub. Date: Aug. 10, 2000

(30) Foreign Application Priority Data

Feb. 8, 1999 (JP) ................................................ 11-30019

(51) Int. Cl.$^7$ ................................................. B60K 6/02
(52) U.S. Cl. ....................................................... 180/65.7
(58) Field of Search ............................... 180/65.1, 65.2, 180/65.6, 65.7, 65.8, 170, 174, 179; 701/70, 95

(56) References Cited

U.S. PATENT DOCUMENTS

| 4,335,429 A | * | 6/1982 | Kawakatsu ................ 180/65.2 |
| 5,335,743 A | * | 8/1994 | Gillbrand et al. ........... 180/170 |
| 5,530,651 A | * | 6/1996 | Uemura et al. .............. 701/70 |
| 5,646,841 A | * | 7/1997 | Suzuki et al. ................ 701/70 |
| 5,789,823 A | * | 8/1998 | Sherman .................... 180/65.2 |
| 5,839,533 A | * | 11/1998 | Mikami et al. ............ 180/65.2 |
| 5,915,801 A | | 6/1999 | Taga et al. |
| 5,924,508 A | * | 7/1999 | Clauss et al. ............... 180/179 |
| 6,116,363 A | * | 9/2000 | Frank ........................ 180/65.2 |
| 6,134,498 A | * | 10/2000 | Oba ............................ 701/70 |
| 6,155,365 A | * | 12/2000 | Boberg ...................... 180/65.2 |
| 6,175,797 B1 | * | 1/2001 | Iizuka ........................ 180/170 |

FOREIGN PATENT DOCUMENTS

| JP | A 58-186387 | 10/1983 |
| JP | A 4-185210 | 7/1992 |
| JP | A 5-191904 | 7/1993 |
| JP | A 5-284610 | 10/1993 |
| JP | A 9-37407 | 2/1997 |
| JP | A 9-98509 | 4/1997 |
| JP | A 9-331604 | 12/1997 |

* cited by examiner

*Primary Examiner*—Frank Vanaman
(74) *Attorney, Agent, or Firm*—Oliff & Berridge, PLC

(57) ABSTRACT

A vehicle characterized by a deceleration that is readily adjustable in the course of braking control with a torque of a motor mounted on a vehicle. In one embodiment, the vehicle has a power system including an engine, a motor, a torque converter, a transmission, and an axle that are linked with one another in series. The transmission is a mechanism that changes over a gear ratio under control of a control unit to vary the transmitted torque. The driver manipulates a gearshift lever in the vehicle to specify a desired deceleration by power source braking. The control unit refers to a predetermined map and specifies a combination of motor torque and gear ratio to attain the specified deceleration. In the course of braking control, the deceleration is corrected according to a step-on amount of an accelerator pedal in a range of play of the accelerator pedal. This arrangement facilitates minute adjustment of the deceleration by the power source braking.

23 Claims, 29 Drawing Sheets

Fig.3

| | C0 | C1 | C2 | B0 | B1 | B2 | B3 | B4 | F0 | F1 | F2 |
|---|---|---|---|---|---|---|---|---|---|---|---|
| P | ○ | | | | | | | | | | |
| R | | | ○ | ○ | | | | ○ | | | |
| N | ○ | | | | | | | | | | |
| 1st | ○ | ○ | | | | | | | ○ | | ○ |
| 2nd | ◎ | ○ | | | | | | ◎ | ○ | | |
| 3rd | ○ | ○ | | | ◎ | ○ | ○ | | ○ | | |
| 4th | | ○ | ○ | | | △ | | | ○ | ○ | |
| 5th | | | ○ | ○ | | △ | | | ○ | | |

○ : Coupled
◎ : Coupled in the case of power-source braking
△ : Coupled but not involved in power transmission (a)

(b)

VEHICLE BRAKED BY MOTOR TORQUE AND METHOD OF CONTROLLING THE VEHICLE

TECHNICAL FIELD

The present invention relates to a vehicle that may be braked with a motor as well as with a mechanical brake utilizing frictional force, and also to a method of controlling such a vehicle. More specifically the present invention pertains to a vehicle that is braked with a motor to attain an arbitrarily adjustable speed reduction rate, as well as to a controlling method to actualize such braking.

BACKGROUND ART

A hybrid vehicle with both an engine and a motor as the power source has been proposed as one form of transportation. For example, a hybrid vehicle disclosed in JAPANESE PATENT LAID-OPEN GAZETTE No. 9-37407 additionally has a motor placed in series between an engine and a transmission in a power system of an ordinary vehicle where an output shaft of the engine is connected with a drive shaft via the transmission. This arrangement enables the hybrid vehicle to be driven by means of both the engine and the motor as the power source. The engine generally has poor fuel consumption at a time of starting the vehicle. In order to avoid driving having poor fuel consumption, the hybrid vehicle makes a start by utilizing the power of the motor. After the speed of the vehicle reaches a predetermined level, the hybrid vehicle starts its engine and is subsequently driven by utilizing the power of the engine. The hybrid vehicle accordingly improves the fuel consumption at the time of starting. The hybrid vehicle causes the motor to regenerate the rotations of the drive shaft as electric power, which is used for braking (hereinafter such braking is referred to as the regenerative braking). The hybrid vehicle carries out the regenerative braking and thereby enables the kinetic energy to be used without significant waste. These characteristics desirably improve the fuel consumption of the hybrid vehicle.

There are two different types of braking in the vehicle. One braking process presses a brake pad against the drive shaft in response to actuation of a brake pedal, so as to apply frictional force to the axle (hereinafter referred to as the wheel braking). The other braking process causes the power source to apply a load to the drive shaft, like engine brake (hereinafter referred to as the power source braking). The hybrid vehicle utilizes, as the power source braking, engine brake based on a pumping loss of the engine and regenerative braking due to a regenerative load of the motor. The power source braking does not require the driver to change the foot position from the accelerator pedal to the brake pedal for the purpose of braking. In order to enhance the effectiveness of the power source braking, it is desirable to arbitrarily set a speed reduction rate required by the driver.

The engine brake results in a substantially fixed speed reduction rate according to the engine speed, unless the open and close timings of an intake valve and an exhaust valve are changed. In order to attain a desired speed reduction rate by engine brake, the driver is required to operate a gearshift level to vary the gear ratio of the transmission and thereby change the ratio of the torque of the power source to the torque output to the drive shaft. The advantage of the regenerative braking of the motor is, on the other hand, relatively easy control of the regenerative load, which leads to relatively easy control of the speed reduction rate. From this point of view, the hybrid vehicle disclosed in JAPANESE PATENT LAID-OPEN GAZETTE No. 9-37407 controls the regenerative speed reduction rate of the motor, in order to attain the desired speed reduction rate set by the driver.

The prior art hybrid vehicle, however, requires specific operations to change the setting of the speed reduction rate. The power source braking does not readily attain the driver's desired speed reduction rate and is thus not utilized effectively enough. The required speed reduction rate frequently varies according to the driving state of the vehicle. In the prior art hybrid vehicle, the change of the actual speed reduction rate does not sufficiently follow the variation in required speed reduction rate. Namely the prior art hybrid vehicle has difficulties in subtle adjustment of the speed reduction rate.

In the prior art hybrid vehicle, the speed reduction rate can be set only in a changeable range of the regenerative load of the motor. In some cases, the hybrid vehicle can not sufficiently attain the speed reduction rate required by the driver. The insufficient speed reduction rate occurs especially in the course of high-speed driving of the vehicle.

Utilizing the wheel braking to compensate for the insufficiency of the speed reduction rate damages the advantage of the power source braking that effects the braking without any change of the foot position. The wheel braking causes the kinetic energy of the vehicle to be consumed in the form of thermal energy and accordingly damages the advantage of the hybrid vehicle that is the effective use of energy.

In the prior art hybrid vehicle, a large speed reduction rate may be attained by operating the gearshift lever to change the gear ratio of the transmission. In this case, however, the speed reduction rate drastically varies with the operation of the gearshift lever, which results in a poor ride.

The problems discussed above arise not only in the hybrid vehicle with both the engine and the motor as the power source but in any vehicle that is braked with the torque of the motor. The problems are also found in vehicles with a motor that is not used as the power source during a drive but is mounted for the purpose of regenerative braking.

DISCLOSURE OF THE INVENTION

One object of the present invention is thus to provide a vehicle that readily regulates the speed reduction rate in the process of braking with the torque of a motor by a compatible operation, which does not make the driver feel uneasy, as well as a method of controlling such a vehicle. Another object of the present invention is to provide a vehicle that enables smooth regulation of the speed reduction rate in a wide possible range of setting in response to a driver's instruction, and a controlling method to attain such braking.

The present invention adopts the following arrangement, in order to attain at least part of the above and the other related objects.

The present invention is thus directed to a vehicle that is driven while regulating power output from a power source to a drive shaft through an operation of an accelerator unit. The vehicle includes: a motor that is capable of applying a braking force to the drive shaft; a detection unit that measures an operating amount of the accelerator unit; a target speed reduction rate setting unit that, when the observed operating amount of the accelerator unit is not greater than a predetermined level, sets a target speed reduction rate of the vehicle corresponding to the observed operating amount, based on a preset relationship between operating amount and speed reduction rate; a motor driving state specification unit that specifies a target driving state of the motor to apply a required braking force to the drive shaft, in order to attain the setting of the target speed reduction rate; and a control unit that controls the motor to be driven in the target driving state, so as to brake the vehicle.

The target driving state of the motor is specified with a diversity of driving state-related parameters, for example, a target torque, a quantity of electric power regenerated by the motor, and a value of electric current flowing through the motor.

In the vehicle of the present invention, the target speed reduction rate is set corresponding to the observed operating amount of the accelerator unit. The vehicle is under braking control with the setting of the target speed reduction rate. The accelerator unit is manipulated to specify a required magnitude of the power to be output from the power source. The accelerator unit generally has a margin of manipulation called play. When the operating amount of the accelerator unit is sufficiently small to be within a range of the play, the accelerator unit does not function to specify the magnitude of the output power. The vehicle of the present invention enables the driver to set the target speed reduction rate according to the operating amount of the accelerator unit in this range of the play. This arrangement thus allows the driver to readily adjust the speed reduction rate without feeling any incompatibility during a drive. The accelerator unit is a manipulation unit that is frequently operated during the drive. The vehicle of the present invention thus ensures adjustment of the target speed reduction rate, which well follows a variation in required speed reduction rate with a change of the driving state of the vehicle, while advantageously allowing minute adjustment of the target speed reduction rate.

The principle of the present invention is not restricted to the application of setting the target speed reduction rate in response to the operating amount of the accelerator unit in the range of the play. The predetermined level of the operating amount may be set to a value exceeding the range of the play. In the vehicle of the present invention, the accelerator unit that is manipulated to specify a variation in required power is also used to set the target speed reduction rate. For the purpose of making the conflicting instructions compatible, the effected instruction is changed, according to the range of the operation of the accelerator unit, between the specification of the required magnitude of the output power and the setting of the target speed reduction rate. This arrangement ensures the effects of the present invention discussed above. The predetermined level of the operating amount is thus not restricted to the range of the play, but may be set in any range suitable for the specification of the required power and the setting of the target speed reduction rate.

The following concretely explains the advantages of the arrangement that allows the target speed reduction rate to be set in response to the operation of the accelerator unit. The accelerator unit is typically constructed as an accelerator pedal. The braking control with the torque of the motor is effected in response to reduction of the depression of the accelerator pedal. When the reduced depression does not give a desired speed reduction rate corresponding to a driver's requirement, the driver steps on a brake pedal to effect wheel braking and thereby raise the speed reduction rate. This requires a change of the foot position from the accelerator pedal to the brake pedal. Acceleration after the speed reduction requires another change of the foot position from the brake pedal to the accelerator pedal. Such frequent change of the foot position worsens the operatability of the vehicle.

In the vehicle of the present invention, however, the desired speed reduction rate corresponding to the driver's requirement is achieved according to the reduced depression of the accelerator pedal as discussed above. The driver can thus brake the vehicle and re-accelerate the vehicle immediately after the speed reduction without any change of the foot position between the accelerator pedal and the brake pedal. Varying the step-on amount of the accelerator pedal allows minute adjustment of the speed reduction rate. The arrangement of the present invention thus significantly improves the operatability of the vehicle. The above discussion regards the accelerator unit constructed as the accelerator pedal. The advantages discussed above are, however, not restricted to such construction as the pedal.

Engine brake applies a practically unequivocally fixed speed reduction rate corresponding to the vehicle speed. A special mechanism is required to vary the speed reduction rate by the power source braking; for example, a mechanism of changing the on-off timings of an intake valve and an exhaust valve of the engine. The speed reduction rate by the motor, on the other hand, can be regulated rather easily and has a higher response. The vehicle of the present invention attains the desired speed reduction rate corresponding to the driver's requirement, based on such advantages of the braking control by the motor.

The vehicle of the present invention has a further advantage on the energy efficiency. The wheel braking typically converts the kinetic energy of the vehicle into thermal energy through friction of the drive shaft against a brake pad and discharges the thermal energy to outside, so as to effect the braking control. This is not preferred from the viewpoint of the energy efficiency. The regenerative braking control by the motor, on the other hand, regenerates the kinetic energy of the vehicle in the form of electric power and thus allows the energy to be effectively used for a subsequent drive. The vehicle of the present invention allows a wide range of regenerative braking control by the motor, thus desirably enhancing the energy efficiency of the vehicle.

In the specification hereof, the speed reduction rate represents a parameter related to speed reduction of the vehicle; for example, a deceleration, that is, a decrease in vehicle speed per unit time, or a braking force.

In the specification hereof, the term 'vehicle' represents vehicles of diverse types. The first type includes vehicles using only a motor as the power source, that is, pure electric vehicles. The second type includes hybrid vehicles using both an engine and a motor as the power source. The hybrid vehicles are classified into two groups: parallel hybrid vehicles where the output power of the engine is directly transmittable to the drive shaft; and series hybrid vehicles where the output power of the engine is not directly transmitted to the drive shaft but is used only for power generation. The principle of the present invention is applicable to both the hybrid vehicles. The present invention may also be applied to vehicles with three or more prime movers including a motor as the power source. The third type includes vehicles using an engine as the power source for driving but having a motor for regenerative braking control.

The vehicle of the present invention may be provided with another braking force source to apply the braking torque, in addition to the motor. In the structure that has only the motor as the braking force source, the motor driving state specification unit specifies the target torque of the motor to effect all the desired speed reduction rate. The target torque generally takes a negative value, and the motor carries out regenerative operation. In the structure that has a plurality of different braking force sources including the motor, on the other hand, the motor driving state specification unit specifies the target torque of the motor by taking into account the speed reduction rate by the separate braking force source other than the motor. In the latter structure, the speed reduction rate by the other braking force source may be treated as a preset value. The torque of the motor may alternatively be subject to feedback control, in order to make the total speed reduction rate reach a predetermined level.

In the vehicle of the present invention, a diversity of settings may be applied for the predetermined relationship referred to by the target speed reduction rate setting unit.

Especially preferable is that the predetermined relationship referred to by the target speed reduction rate setting unit increases the speed reduction rate with a decrease in operating amount. One example of such setting is a relationship of decreasing the speed reduction rate inversely proportional to the operating amount.

The accelerator unit is generally designed to increase the power output from the power source in response to the greater operating amount. In other words, the accelerator unit is generally constructed to decrease the required power and lower the acceleration of the vehicle in response to the smaller operating amount. The arrangement of increasing the speed reduction rate with a decrease in operating amount of the accelerator unit well agrees with the driver's feeling. The vehicle with the above setting for the predetermined relationship thus enables the driver to adjust the target speed reduction rate without feeling any incompatibility, thus ensuring the excellent operatability.

It is also preferable that the predetermined relationship referred to by the target speed reduction rate setting unit gives a significantly greater speed reduction rate in a specific state practically corresponding to the operating amount of zero than speed reduction rates in residual states.

Such setting for the predetermined relationship attains the speed reduction rate better suited to the driver's feeling. The driver sets the operating amount of the accelerator unit equal to zero, that is, sets the accelerator unit in OFF position, when requiring rather abrupt braking control. The braking control at the significantly greater speed reduction rate in the OFF state of the accelerator unit than the speed reduction rates in the other states well follows the driver's requirement. The vehicle of the above arrangement thus ensures the effective braking control by the motor.

A setting of continuously varying the speed reduction rate according to the operating amount may also be applicable to the vehicle of the present invention, where a reference speed reduction rate is set in the OFF state of the accelerator unit. In this case, however, the variation in speed reduction rate per unit operating amount of the accelerator unit, that is, the rate of change of the speed reduction rate, is relatively steep to ensure a sufficient level of the reference speed reduction rate. The large rate of change of the speed reduction rate makes it difficult to minutely adjust the speed reduction rate. The above setting for the predetermined relationship ensures the sufficient level of the reference speed reduction rate in the OFF state of the accelerator unit, while specifying the relationship between the speed reduction rate and the operating amount at the specific rate of change that enables minute adjustment of the speed reduction rate in the other states.

In the above setting of the predetermined relationship, the specific state practically corresponding to the operating amount of zero is defined by taking into account the resolving power of a sensor for measuring the operating amount of the accelerator unit. The specific state is not restricted to the state of setting the operating amount strictly equal to zero, but may include a range in which the operating amount is determined to be practically zero by taking into account the resolving power of the sensor.

When the vehicle of the present invention has a braking mechanism that utilizes mechanical frictional force, that is, a mechanism of wheel braking, the relationship between the operating amount of the accelerator unit and the speed reduction rate may be changed according to the on-off state of the wheel braking. One possible application sets the speed reduction rate by the motor in the ON state of the wheel braking to be greater than the speed reduction rate in the OFF state of the wheel braking. The driver generally requires a greater speed reduction rate in the ON state of the wheel braking. Such setting thus attains the braking control well suited to the driver's feeling.

The relationship between the operating amount of the accelerator unit and the speed reduction rate may be specified comprehensively, based on a diversity of parameters.

For example, when the vehicle is provided with a vehicle speed detection unit that measures vehicle speed of the vehicle, the target speed reduction rate setting unit may set the target speed reduction rate, based on the observed operating amount and the observed vehicle speed.

In accordance with one preferable embodiment of the present invention, the vehicle further includes: a transmission that is capable of selecting one among a plurality of different gear ratios in the course of applying a braking force and is interposed between the motor and the drive shaft; a selection unit that selects a target gear ratio to attain the target speed reduction rate with a torque of the motor; and a change speed control unit that controls the transmission to effect the target gear ratio.

The vehicle of this construction attains an adequate gear ratio corresponding to the speed reduction rate specified by the driver and the magnitude of the torque of the motor by means of the selection unit. Controlling the driving state of the motor at the adequate gear ratio gives the speed reduction rate specified by the driver. The vehicle of this arrangement totally controls both the transmission and the motor, thus ensuring a wide range of braking control well following a driver's requirement.

In the vehicle of this arrangement, the relationship between the operating amount of the accelerator unit and the target speed reduction rate may be changed according to the gear ratio currently used for driving.

In the vehicle with the transmission, it is preferable that the predetermined relationship referred to by the target speed reduction rate setting unit is specified to cause a variable range of the speed reduction rate corresponding to the operating amount to be allowed in a fixed gear ratio of the transmission.

Such setting for the predetermined relationship keeps the gear ratio of the transmission at a fixed value even when the speed reduction rate is adjusted by varying the operating amount of the accelerator unit. Namely the variation in speed reduction rate is implemented by controlling the motor. This arrangement enables adjustment of the speed reduction rate without changing the gear ratio, thus ensuring smooth driving.

The principle of the present invention is applicable to a diversity of vehicles having the power source of various structures.

It is especially preferable to apply the technique of the present invention to a vehicle with both the motor and an engine as the power source.

The present invention is desirably applied to a hybrid vehicle with both the motor and the engine mounted thereon, where the motor is used as the power source and the output power of the engine is transmittable to the axle. As mentioned previously, it is rather difficult to adjust the speed reduction rate by the engine brake in the vehicle with only the engine as the power source. In the hybrid vehicle with both the engine and the motor as the power source, on the other hand, the total speed reduction rate of the vehicle is adjusted rather easily by regulating the braking torque of the motor. Application of the present invention for the hybrid vehicle with the engine as the main power source significantly enhances the effectiveness of the power source braking.

The hybrid vehicle is preferably provided with the transmission discussed above. The hybrid vehicle of the above configuration generally has the motor as the auxiliary power source second to the engine. The motor is used, for example, at the time of starting the vehicle or during a low-speed drive, and is also utilized to supplement an insufficient of torque by the engine. The parallel hybrid vehicle typically has a small-sized motor of a relatively low output rating for this purpose. The motor alone does not have a sufficient ability of regenerative braking control required by the driver. The combined use of the transmission enables a wide range of braking control and ensures the especially effective application of the present invention.

In accordance with another preferable embodiment of the present invention, the vehicle further includes: a manipulation unit that is independent of the accelerator unit and enables a driver of the vehicle to specify a desired speed reduction rate in the course of braking control with the motor; and a change unit that changes a setting range of the target speed reduction rate of the vehicle according to the operating amount of the accelerator unit, in response to an operation of the manipulation unit.

In the vehicle of this embodiment, the driver operates the manipulation unit to change the setting range of the target speed reduction rate. The target speed reduction rate may be adjusted minutely according to the operating amount of the accelerator unit. This arrangement enables the driver to utilize the braking control by the motor in a wider range, thus significantly enhancing the operatability of the vehicle.

In the case of a requirement of a relatively large speed reduction rate, for example, in the case of preference of a crisp run over the good ride, the driver operates the manipulation unit to change the setting range of the target speed reduction rate to a higher side. Manipulation of the accelerator unit after such a change allows minute adjustment of the speed reduction rate about a relatively large reference speed reduction rate. When the road surface has a relatively low friction coefficient, for example, in the case of snow-covered road, the driver operates the manipulation unit to change the setting range of the target speed reduction rate to a lower side, in order to prevent the occurrence of a slip. Manipulation of the accelerator unit after such a change allows minute adjustment of the speed reduction rate about a relatively small reference speed reduction rate. The whole range of the speed reduction rate required by the driver may be set without any operation of the manipulation unit but through only the operation of the accelerator unit. The combination of the setting of the speed reduction rate through the operation of the manipulation unit with the adjustment through the operation of the accelerator unit advantageously facilitates the minute adjustment of the speed reduction rate.

In the vehicle having the independent manipulation unit for the setting of the speed reduction rate from the accelerator unit, the setting range of the target speed reduction rate may be changed in response to the operation of the manipulation unit, and the target speed reduction rate is adjusted according to the operating amount of the accelerator unit. The same effects may be achieved by different applications. One applicable method sets the target speed reduction rate in response to the operation of the manipulation unit and then corrects the target speed reduction rate according to the operating amount of the accelerator unit. Another applicable method sets the target speed reduction rate in response to the operation of the manipulation unit and then corrects the target torque of the motor according to the operating amount of the accelerator unit. These methods are only modifications of the processing and are practically equivalent to the above arrangement.

A diversity of structures may be applied for the manipulation unit.

For example, the manipulation unit may include a first switch that shifts the setting range in a stepwise manner in a direction of increasing the speed reduction rate, and a second switch that shifts the setting range in a stepwise manner in a direction of decreasing the speed reduction rate. The first switch and the second switch may be mounted on a steering wheel of the vehicle. This arrangement advantageously ensures the high operatability.

The manipulation unit may have a mechanism that allows the driver to specify the desired speed reduction rate by sliding a lever along a preformed slide groove. Especially the mechanism of continuously varying the setting of the speed reduction rate by a slide of the lever desirably heightens the degree of freedom in setting of the speed reduction rate.

In the case where the vehicle further includes: a transmission that is capable of selecting one among a plurality of different gear ratios for power output from the power source; and a gearshift lever that is operated to input a selected gearshift position, which represents a selectable range of the gear ratio during a drive of the vehicle, it is preferable that the manipulation unit and the gearshift lever have a common mechanism. This arrangement does not require a separate manipulation unit and desirably gives the manipulation unit of extremely high operatability.

In another preferable example, the manipulation unit has a slide groove, along which the gearshift lever is slid during a drive of the vehicle, and another slide groove, along which the gearshift lever is slid to specify the desired speed reduction rate, where these slide grooves are provided in series. This enhances the operatability in the process of specifying the speed reduction rate.

It is preferable that the vehicle with the manipulation unit for changing the setting range of the speed reduction rate has an information unit that gives the driver information regarding a setting state of the speed reduction rate. The information unit allows the driver to readily recognize the setting range of the speed reduction rate in response to the driver's own operation. The information unit may be constructed in the form of a display unit that displays the setting range of the deceleration or in the form of an acoustic unit that informs the driver of the setting state of the speed reduction rate by acoustic means. The information given here may be any suitable piece of information; for example, information representing the setting range of the speed reduction rate or information representing a deviation from the reference speed reduction rate.

In accordance with still another preferable embodiment of the present invention, the vehicle further includes: a torque converter having a mechanism that converts the output power to another combination of torque and revolving speed by utilizing a slip between two rotating members and transmits the converted power, and a lock mechanism that locks up relative rotations of the two rotating members to allow direct transmission of the output power, the mechanism and the lock mechanism being provided on a pathway for transmitting the braking force of the motor to the drive shaft; and a lock mechanism regulation unit that, when the observed operating amount of the accelerator unit is not greater than a predetermined value, regulates the lock mechanism to fall into a specific state for restricting the slip between the two rotating members of the torque converter.

Regulating the lock mechanism during the braking control restricts the relative slip between the two rotating members of the torque converter. The braking force of the motor is thus transmitted to the drive shaft with little loss.

The torque converter may have a known mechanism utilizing a fluid.

In the application of regulating the lock mechanism, the specific state may lock up the relative rotations of the two rotating members. The predetermined value may be set in a range smaller than a specific operating amount to start braking control. This arrangement ensures the braking control well suited to the driver's feeling. The present invention is, however, not restricted to such settings, but may be applicable to a diversity of other arrangements.

The vehicle with the torque converter may further include: a transmission that is capable of selecting one among a plurality of different gear ratios to transmit the braking force of the motor to the drive shaft; a gearshift position input unit that is manipulated to specify a selectable range of gear ratio of the transmission; and a mechanical braking mechanism that is operated to apply the braking force to the drive shaft by mechanical frictional force. In this application, the control unit regulates the gear ratio to allow selection of a greater gear ratio exceeding the selectable range specified by the gearshift position input unit, when the mechanical braking mechanism is operated.

Combination of the regulation of the gear ratio with the control of the motor attains the target speed reduction rate. In this embodiment, regulation of the gear ratio may exceed the restriction set by the gearshift position. This arrangement enhances the achievement of the target speed reduction rate. The control unit may be constructed as a unit of simply increasing the gear ratio by one step, irrespective of the specification of the gearshift position input unit, while the mechanical braking mechanism is being operated.

Other than the vehicles having any of the arrangements discussed above, the present invention may be actualized by a method of controlling such vehicles.

BRIEF DESCRIPTION OF THE DRAWINGS

FIG. 3 shows the relationship between the state of coupling of the respective clutches, brakes, and one-way clutches and the change-speed gear position;

BEST MODES OF CARRYING OUT THE INVENTION

Some modes of carrying out the present invention are discussed below as preferred embodiment.

(1) Construction of System

Figure 1:
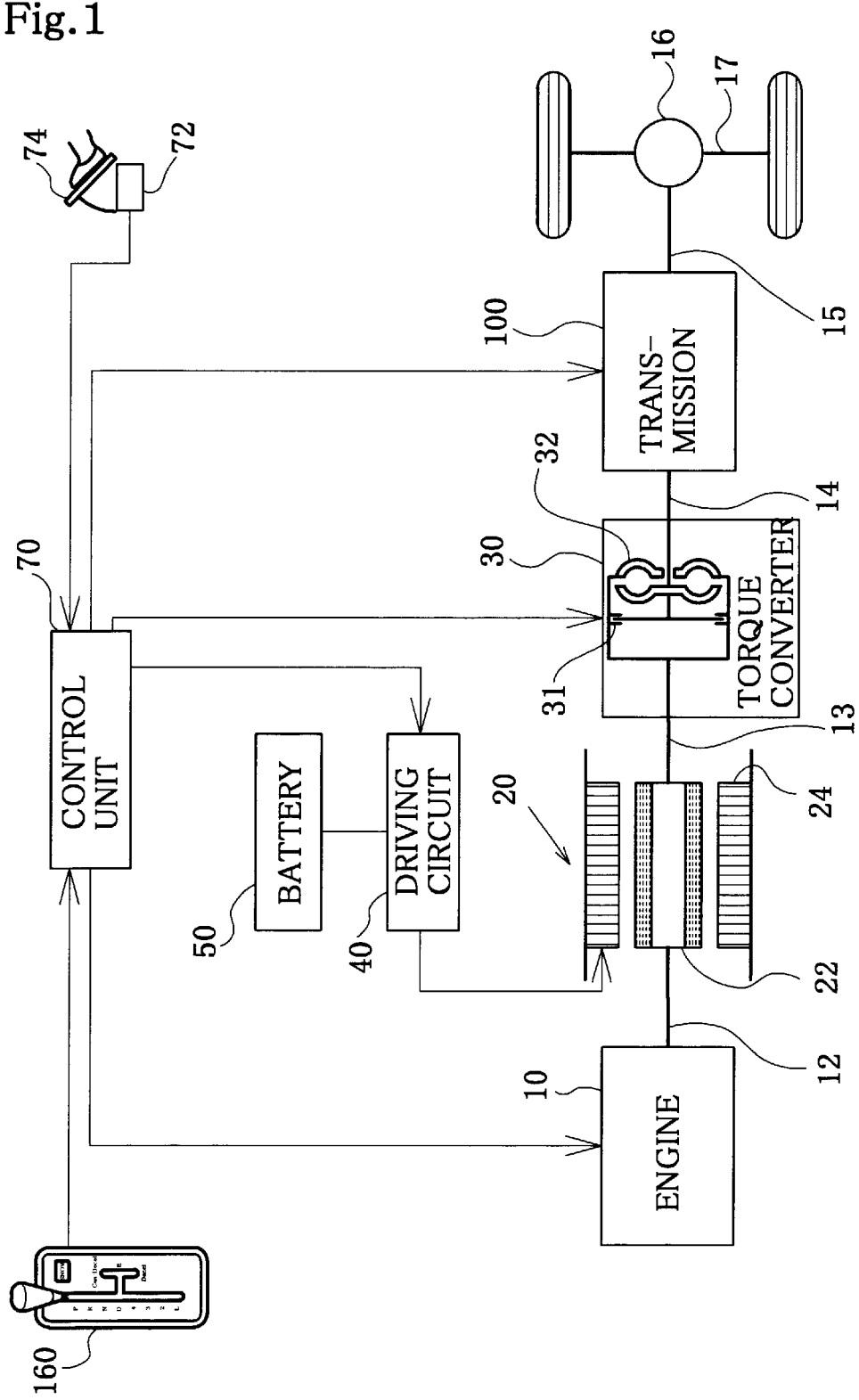
FIG. 1 schematically illustrates the construction of a hybrid vehicle in one embodiment of the present invention.

FIG. 1 schematically illustrates the construction of a hybrid vehicle in one embodiment of the present invention. The hybrid vehicle of the embodiment has an engine 10 and a motor 20 as power source thereof. A power system of the hybrid vehicle of this embodiment includes the engine 10, the motor 20, a torque converter 30, and a transmission 100 that are connected in this sequence from the upstream side. More specifically, the motor 20 is linked with a crankshaft 12 of the engine 10, whereas a rotating shaft 13 of the motor 20 is linked with the torque converter 30. An output shaft 14 of the torque converter 30 is linked with the transmission 100. An output shaft 15 of the transmission 100 is linked with an axle 17 via a differential gear 16.

The engine 10 is an ordinary gasoline engine. The engine 10 has a mechanism of regulating the open and close timings of an intake valve, which causes a gaseous mixture of gasoline and the air to be sucked into a cylinder, and an exhaust valve, which causes the hot combustion exhaust to be discharged from the cylinder, relative to vertical movements of a piston (hereinafter this mechanism is referred to as the VVT mechanism). The structure of the VVT mechanism is known in the art and is thus not described here in detail. The VVT mechanism of the engine 10 regulates the open and close timings of the intake and exhaust valves to delay the actual closing operations of the respective valves relative to the vertical movements of the piston, thereby reducing the pumping loss. This results in decreasing the braking force by engine brake. The VVT mechanism also reduces the torque to be output from the motor 20 in the course of motoring the engine 10. The VVT mechanism controls the open and close timings of the respective valves to attain the highest combustion efficiency according to the speed of the engine 10 in the process of outputting power through combustion of gasoline.

The motor 20 is a three-phase synchronous motor, which includes a rotor 22 with a plurality of permanent magnets attached to the circumferential face thereof and a stator 24 with three-phase coils wound thereon to generate a revolving magnetic field. The motor 20 is driven to rotate by the interaction between the magnetic field generated by the permanent magnets attached to the rotor 22 and the magnetic field generated by the three-phase coils wound on the stator 24. When the rotor 22 is rotated by an external force, the interaction between these magnetic fields causes an electromotive force between both ends of the three-phase coils. A sine wave polarized motor, in which the magnetic flux density between the rotor 22 and the stator 24 has a sinusoidal distribution in the circumferential direction, is applicable for the motor 20. A non-sine wave polarized motor that can output a relatively large torque is, however, applied for the motor 20 in this embodiment.

The stator 24 is electrically connected to a battery 50 via a driving circuit 40. The driving circuit 40 is constructed as a transistor inverter that includes plural pairs of transistors, one as a source and the other as a sink, provided respectively for the three phases of the motor 20. As illustrated, the driving circuit 40 is electrically connected with a control unit 70. The control unit 70 carries out PWM (pulse width modulation) control of the on- and off-time of the respective transistors included in the driving circuit 40. The PWM control causes quasi three-phase alternating currents to be output from the battery 50 as the power supply and flow through the three-phase coils of the stator 24, so as to generate a revolving magnetic field. The motor 20 functions either as a motor or a generator by means of the revolving magnetic field.

The torque converter 30 is a known power transmission mechanism by taking advantage of a fluid. The input shaft of the torque converter 30, that is, the output shaft 13 of the motor 20, is not mechanically linked with the output shaft 14 of the torque converter 30, so that the input and output shafts 13 and 14 of the torque converter 30 are rotatable in the presence of a slide. Turbines 32 with a plurality of blades are attached respectively to the input and output shafts 13 and 14 of the torque converter 30. The turbines set on the output shaft 13 of the motor 20 and set on the output shaft 14 of the torque converter 30 are arranged to face each other in the torque converter 30. The torque converter 30 has a sealed structure that is filled with transmission oil. The transmission oil works on the respective turbines, so that power is transmitted from one rotating shaft to the other rotating shaft. Since these rotating shafts are rotatable in the presence of a slide, the power input from one rotating shaft is converted to a different combination of revolving speed and torque and transmitted to the other rotating shaft. The torque converter 30 is provided with a lockup clutch 31 that locks the rotations of the turbines transmitting the power. Coupling of the lockup clutch 31 under predetermined conditions, for example, under a condition that reduces the slide of the turbines 32 to a relatively small level, allows transmission of the power without any slide at the turbines. This arrangement desirably decreases the potential loss in the course of power transmission.

Figure 2:
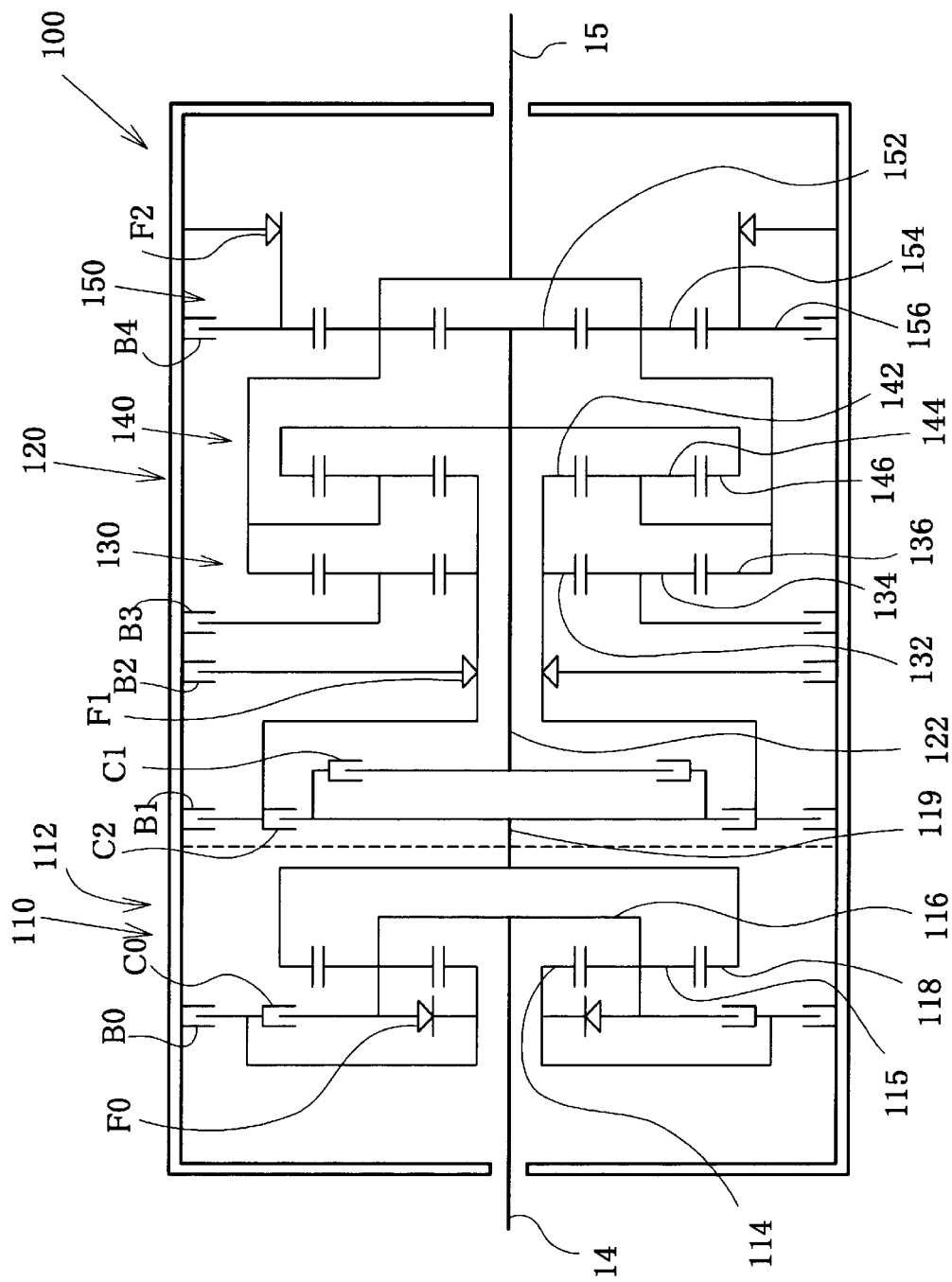
FIG. 2 illustrates the internal structure of a transmission 100.

The transmission 100 includes a plurality of gear units, clutches, one-way clutches, and brakes and changes the gear ratio, so as to enable the power input from the output shaft 14 of the torque converter 30 to be converted to a different combination of torque and revolving speed and transmitted to the output shaft 15 of the transmission 100. FIG. 2 shows the internal structure of the transmission 100. The transmission 100 of this embodiment mainly includes an auxiliary transmission unit 110 (a portion on the left side of the dotted line in FIG. 2) and a primary transmission unit 120 (a portion on the right side of the dotted line). The structure ensures five forward speeds and one reverse speed.

The detailed structure of the transmission 100 is described sequentially from the rotating shaft 14. As illustrated in FIG. 2, the auxiliary transmission unit 110 constructed as an overdrive unit converts the power input from the rotating shaft 14 at a predetermined gear ratio and transmits the converted power to a rotating shaft 119. The auxiliary transmission unit 110 includes a first planetary gear unit 112 of a single pinion type, a clutch C0, a one-way clutch F0, and a brake B0. The first planetary gear unit 112 includes three different gears, that is, a sun gear 114 revolving on the center, a planetary pinion gear 115 revolving both round the sun gear 114 and on its axis, and a ring gear 118 revolving round the planetary pinion gear 115. The planetary pinion gear 115 is supported on a rotating part called a planetary carrier 116.

In the planetary gear unit, when the rotating conditions of two gears selected among the three gears are determined, the rotating condition of one residual gear is automatically determined. The rotating conditions of the respective gears in the planetary gear unit are expressed by Equations (1) known in the field of mechanics and given below:

$$Ns=(1+\rho)/\rho \times Nc - Nr/\rho$$

$$Nc=\rho/(1+\rho) \times Ns + Nr/(1+\rho)$$

$$Nr=(1+\rho)Nc - \rho Ns$$

$$Ts=Tc \times \rho/(1+\rho) = \rho Tr$$

$$Tr=Tc/(1+\rho) \tag{1}$$

where ρ denotes the number of teeth in the sun gear to the number of teeth in the ring gear, Ns represents the revolving speed of the sun gear, Ts represents the torque of the sun gear, Nc represents the revolving speed of the planetary carrier, Tc represents the torque of the planetary carrier, Nr represents the revolving speed of the ring gear, and Tr represents the torque of the ring gear.

In the auxiliary transmission unit 110, the rotating shaft 14 corresponding to the input shaft of the transmission 100 is linked with the planetary carrier 116. The one-way clutch F0 and the clutch C0 are disposed in parallel between the planetary carrier 116 and the sun gear 114. The one-way clutch F0 is set in a specific direction that attains coupling when the sun gear 114 has normal rotations relative to the planetary carrier 116, that is, when the sun gear 114 rotates in the same direction as that of the input shaft 14 of the transmission 100. The sun gear 114 is connected to the multiple disc brake B0 that can stop the rotation of the sun gear 114. The ring gear 118 corresponding to the output of the auxiliary transmission unit 110 is linked with the rotating shaft 119, which corresponds to the input shaft of the primary transmission unit 120.

In the auxiliary transmission unit 110 of the above configuration, the planetary carrier 116 integrally rotates with the sun gear 114 in the state of coupling of either the clutch C0 or the one-way clutch F0. According to Equations (1) given previously, when the sun gear 114 and the planetary carrier 116 have an identical revolving speed, the revolving speed of the ring gear 118 is also equal to the identical revolving speed. In this state, the revolving speed of the rotating shaft 119 is identical with the revolving speed of the input shaft 14. In the state of coupling of the brake B0 to stop the rotation of the sun gear 114, on the other hand, according to Equations (1), substitution of the value '0' into the revolving speed Ns of the sun gear 114 makes the revolving speed Nr of the ring gear 118 higher than the revolving speed Nc of the planetary carrier 116. Namely the rotation of the rotating shaft 14 is accelerated and subsequently transmitted to the rotating shaft 119. The auxiliary transmission unit 110 selectively performs the function of directly transmitting the power input from the rotating shaft 14 to the rotating shaft 119 and the function of accelerating the input power and then transmitting the accelerated power to the rotating shaft 119.

The primary transmission unit 120 includes three planetary gear units 130, 140, and 150, two clutches C1 and C2, two one-way clutches F1 and F2, and four brakes B1 through B4. Like the first planetary gear unit 112 included in the auxiliary transmission unit 110, each of the planetary gear units 130, 140, and 150 includes a sun gear, a planetary carrier, a planetary pinion gear, and a ring gear. The three planetary gear units 130, 140, and 150 are linked as discussed below.

A sun gear 132 of the second planetary gear unit 130 is integrally linked with a sun gear 142 of the third planetary gear unit 140. These sun gears 132 and 142 may be connected with the input shaft 119 via the clutch C2. The rotating shaft with these sun gears 132 and 142 is connected with the brake B1 to stop the rotation of the rotating shaft. The one-way clutch F1 is set in a specific direction that attains coupling in the case of reverse rotation of this rotating shaft. There is another brake B2 to stop the rotation of the one-way clutch F1.

A planetary carrier 134 of the second planetary gear unit 130 is connected with the brake B3 to stop the rotation of the planetary carrier 134. A ring gear 136 of the second planetary gear unit 130 is integrally linked with a planetary carrier 144 of the third planetary gear unit 140 and a planetary carrier 154 of the fourth planetary gear unit 150. The ring gear 136 and the planetary carriers 144 and 154 are further connected with the output shaft 15 of the transmission 100.

A ring gear 146 of the third planetary gear unit 140 is linked with a sun gear 152 of the fourth planetary gear unit 150 and with a rotating shaft 122. The rotating shaft 122 may be linked with the input shaft 119 of the primary transmission unit 120 via the clutch C1. A ring gear 156 of the fourth planetary gear unit 150 is connected with the brake B4 to stop the rotation of the ring gear 156 and with the one-way clutch F2 that is set in a specific direction to attain coupling in the state of reverse rotation of the ring gear 156.

The clutches C0 through C2 and the brakes B0 through B4 included in the transmission 100 are coupled and released by means of the hydraulic pressure. The respective clutches and brakes are connected with piping of hydraulic pressure for enabling such coupling and releasing operations and elements including solenoid valves for regulating the hydraulic pressure, although these constituents are not specifically illustrated. In the hybrid vehicle of the embodiment, the control unit 70 outputs control signals to these solenoid valves and other related elements, so as to control the operations of the respective clutches and brakes.

The transmission 100 of the embodiment can set the change-speed gear at a position selected among five forward speeds and one reverse speed through the combination of coupling and release of the clutches C0 through C2 and the brakes B0 through B4. The transmission 100 also has a Neutral position and a Parking position. FIG. 3 shows the relationship between the state of coupling of the respective clutches, brakes, and one-way clutches and the position of the change-speed gear. In the table of FIG. 3, the circle represents a normal state of coupling, the double circle represents coupling in the case of power source braking, and the triangle represents a specific state of coupling that is not involved in the transmission of power. The power source braking here implies the braking by means of the engine 10 and the motor 20. The coupling of the one-way clutches F0 through F2 does not respond to the control signal output from the control unit 70, but is based on the direction of rotation of each corresponding gear.

As shown in FIG. 3, in the case of either a Parking (P) position or a Neutral (N) position, the clutch C0 and the one-way clutch F0 are coupled. Since both the clutches C2 and C1 are released, the power is not transmitted from the input shaft 119 of the primary transmission unit 120 to the downstream elements.

In the case of the first speed ($1^{st}$), the clutches C0 and C1 and the one-way clutches F0 and F2 are coupled. Under the application of engine brake, the brake B4 is also coupled. This is equivalent to the state where the input shaft 14 of the transmission 100 is directly linked with the sun gear 152 of the fourth planetary gear unit 150. The power is accordingly transmitted to the output shaft 15 at a certain gear ratio corresponding to the gear ratio of the fourth planetary gear unit 150. The ring gear 156 is restricted not to rotate reversely by the function of the one-way clutch F2. The revolving speed of the ring gear 156 is thus practically equal to zero. Under such conditions, according to Equations (1) given previously, the relations between a revolving speed Nin and a torque Tin of the input shaft 14 and a revolving speed Nout and a torque Tout of the output shaft 15 are expressed by Equations (2) given below:

$$N_{out}=N_{in}/k_1$$
$$T_{out}=k_1 \times T_{in}$$
$$k_1=(1+\rho 4)/\rho 4 \quad (2)$$

where ρ4 denotes the gear ratio of the fourth planetary gear unit 150.

In the case of the second speed ($2^{nd}$), the clutch C1, the brake B3, and the one-way clutch F0 are coupled. Under the application of engine brake, the clutch C0 is also coupled. This is equivalent to the state where the input shaft 14 of the transmission 100 is directly linked with the sun gear 152 of the fourth planetary gear unit 150 and with the ring gear 146 of the third planetary gear unit 140. In this state, the planetary carrier 134 of the second planetary gear unit 130 is fixed. The sun gear 132 of the second planetary gear unit 130 and the sun gear 142 of the third planetary gear unit 140 have an identical revolving speed. The ring gear 136 and the planetary carrier 144 have an identical revolving speed. Under such conditions, according to Equations (1) given previously, the rotating conditions of the second and third planetary gear units 130 and 140 are determined unequivocally. The relations between the revolving speed Nin and the torque Tin of the input shaft 14 and the revolving speed Nout and the torque Tout of the output shaft 15 are expressed by Equations (3) given below. The revolving speed Nout of the output shaft 15 at the second speed ($2^{nd}$) is higher than the revolving speed at the first speed ($1^{st}$), whereas the torque Tout of the output shaft 15 at the second speed ($2^{nd}$) is smaller than the torque at the first speed ($1^{st}$).

$$N_{out}=N_{in}/k_2$$
$$T_{out}=k_2 \times T_{in}$$
$$k_2=\{\rho 2(1+\rho 3)+\rho 3\}/\rho 2 \quad (3)$$

where ρ2 and ρ3 respectively denote the gear ratios of the second planetary gear unit 130 and the third planetary gear unit 140.

In the case of the third speed ($3^{rd}$), the clutches C0 and C1, the brake B2, and the one-way clutches F0 and F1 are coupled. Under the application of engine brake, the brake B1 is also coupled. This is equivalent to the state where the input shaft 14 of the transmission 100 is directly linked with the sun gear 152 of the fourth planetary gear unit 150 and the ring gear 146 of the third planetary gear unit 140. The sun gears 132 and 142 of the second and third planetary gear units 130 and 140 are restricted not to rotate reversely by the functions of the brake B2 and the one-way clutch F1. The revolving speeds of these sun gears 132 and 142 are thus practically equal to zero. As in the case of the second speed ($2^{nd}$), under such conditions, according to Equations (1) given previously, the rotating conditions of the second and third planetary gear units 130 and 140 are determined unequivocally, and the revolving speed of the output shaft 15 is also determined unequivocally. The relations between the revolving speed Nin and the torque Tin of the input shaft 14 and the revolving speed Nout and the torque Tout of the output shaft 15 are expressed by Equations (4) given below. The revolving speed Nout of the output shaft 15 at the third speed ($3^{rd}$) is higher than the revolving speed at the second speed ($2^{nd}$), whereas the torque Tout of the output shaft 15 at the third speed ($3^{rd}$) is smaller than the torque at the second speed ($2^{nd}$).

$$N_{out}=N_{in}/k_3$$
$$T_{out}=k_3 \times T_{in}$$
$$k_3=1+\rho 3 \quad (4)$$

In the case of the fourth speed ($4^{th}$), the clutches C0 through C2 and the one-way clutch F0 are coupled. The brake B2 is simultaneously coupled but is not involved in transmission of the power. In this state, the clutches C1 and C2 are coupled simultaneously, so that the input shaft 14 is directly linked with the sun gear 132 of the second planetary gear unit 130, the sun gear 142 and the ring gear 146 of the third planetary gear unit 140, and the sun gear 152 of the fourth planetary gear unit 150. The third planetary gear unit 140 thus integrally rotates with the input shaft 14 at the same revolving speed. The output shaft 15 also integrally rotates with the input shaft 14 at the identical revolving speed. The output shaft 15 rotates at a higher revolving speed in the fourth speed ($4^{th}$) than in the third speed ($3^{rd}$). The relations between the revolving speed Nin and the torque Tin of the input shaft 14 and the revolving speed Nout and the torque Tout of the output shaft 15 are expressed by Equations (5) given below. The revolving speed Nout of the output shaft 15 at the fourth speed ($4^{th}$) is higher than the revolving speed at the third speed ($3^{rd}$), whereas the torque Tout of the output shaft 15 at the fourth speed ($4^{th}$) is smaller than the torque at the third speed ($3^{rd}$).

$$N_{out}=N_{in}/k_4$$
$$T_{out}=k_4 \times T_{in}$$
$$k_4=1 \quad (5)$$

In the case of the fifth speed ($5^{th}$), the clutches C1 and C2 and the brake B0 are coupled. The brake B2 is simultaneously coupled but is not involved in transmission of the power. In this state, the clutch C0 is released, so that the revolving speed is raised in the auxiliary transmission unit 110. The revolving speed of the input shaft 14 of the transmission 100 is raised and transmitted to the input shaft 119 of the primary transmission unit 120. The clutches C1 and C2 are coupled simultaneously, so that the input shaft 119 and the output shaft 15 rotate at an identical revolving speed, as in the case of the fourth speed ($4^{th}$). According to Equations (1) given previously, the relations between the revolving speeds and the torques of the input shaft 14 and the output shaft 119 of the auxiliary transmission unit 110 are obtained, in order to determine the revolving speed and the torque of the output shaft 15. The relations between the revolving speed Nin and the torque Tin of the input shaft 14 and the revolving speed Nout and the torque Tout of the output shaft 15 are expressed by Equations (6) given below. The revolving speed Nout of the output shaft 15 at the fifth speed ($5^{th}$) is higher than the revolving speed at the fourth speed ($4^{th}$), whereas the torque Tout of the output shaft 15 at the fifth speed ($5^{th}$) is smaller than the torque at the fourth speed ($4^{th}$).

$$N_{out}=N_{in}/k_5$$
$$T_{out}=k_5 \times T_{in}$$
$$k_5=1/(1+\rho 1) \quad (6)$$

where ρ1 denotes the gear ratio of the first planetary gear unit 112.

In the case of reverse speed (R), the clutch C2 and the brakes B0 and B4 are coupled. In this state, the revolving speed of the input shaft 14 is raised in the auxiliary transmission unit 110 and is connected to the sun gear 132 of the second planetary gear unit 130 and the sun gear 142 of the third planetary gear unit 140. As described previously, the ring gear 136 and the planetary carriers 144 and 154 have an identical revolving speed. The ring gear 146 and the sun gear 152 also have an identical revolving speed. The revolving speed of the ring gear 156 of the fourth planetary gear unit 150 becomes practically equal to zero by the function of the brake B4. Under such conditions, according to Equations (1) given previously, the rotating conditions of the respective planetary gear units 130, 140, and 150 are determined unequivocally. At this moment, the output shaft 15 rotates in the negative direction to allow a reverse movement.

As described above, the transmission 100 of the embodiment can set the position of the change-speed gear among the five forward speeds and one reverse speed. The power input from the input shaft 14 is converted to a different combination of revolving speed and torque and output to the output shaft 15. The output power is defined by the increasing revolving speed and the decreasing torque in the sequence of the first speed ($1^{st}$) to the fifth speed ($5^{th}$). This is also true when a negative torque, that is, a braking force, is applied to the input shaft 14. The variables k1 through k5 in Equations (2) through (6) given above denote the gear ratios at the respective positions of the change-speed gear. In the case where a fixed braking force is applied to the input shaft 14 by means of the engine 10 and the motor 20, the braking force applied to the output shaft 15 decreases in the sequence of the first speed ($1^{st}$) to the fifth speed ($5^{th}$). The transmission 100 may have any of various known structures, other than the structure adopted in this embodiment. For example, the transmission 100 may have a greater number or a less number of forward speeds.

Figure 4:
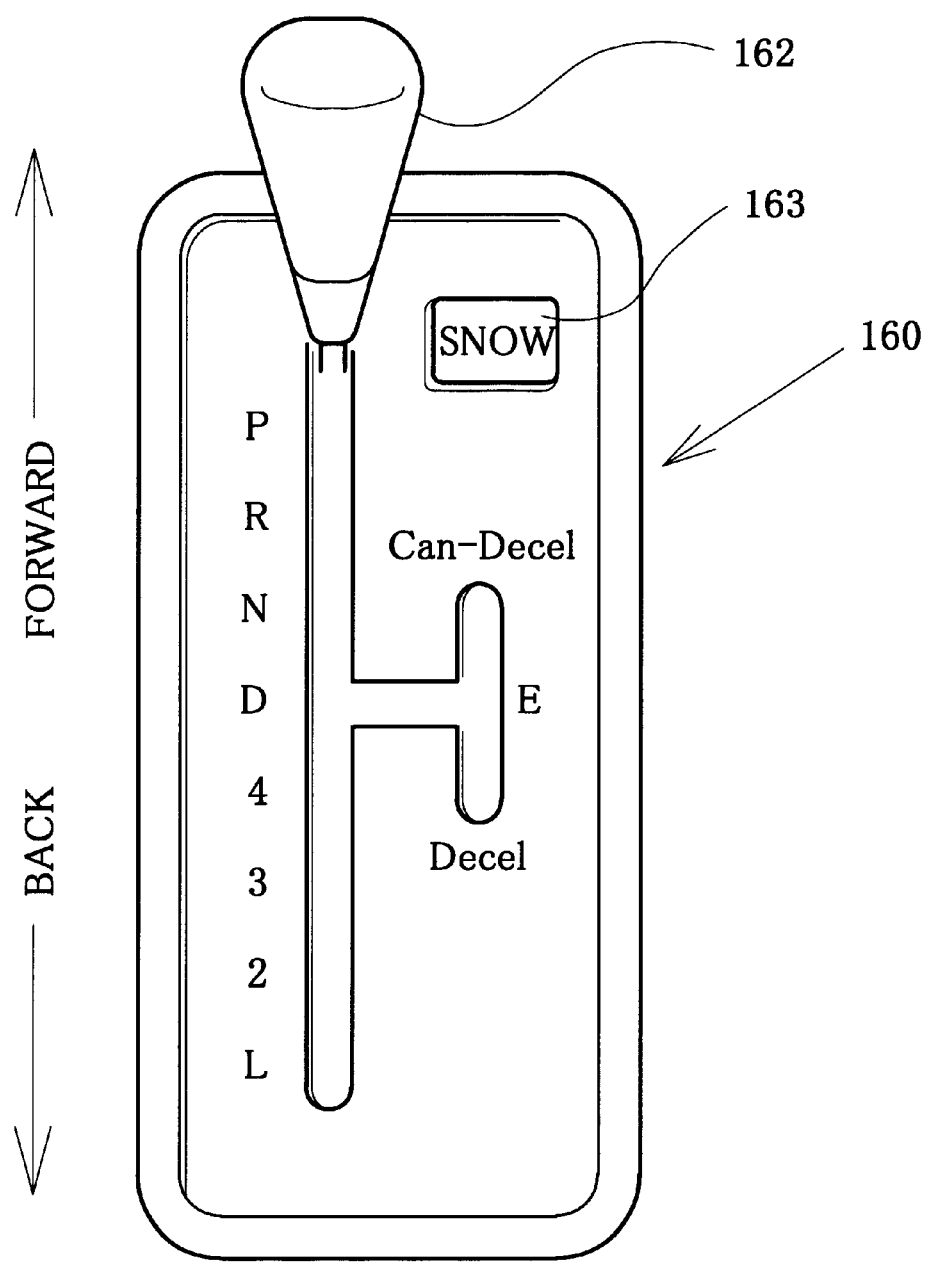
FIG. 4 shows a manipulation unit 160 for selecting the gearshift position in the hybrid vehicle of the embodiment.

The control unit 70 sets the position of the change-speed gear in the transmission 100 according to the vehicle speed and other conditions. The driver manually operates a gearshift lever provided in the vehicle and selects a desired gearshift position, so as to vary the applicable range of the change-speed gear. FIG. 4 shows a manipulation unit 160 for selecting the gearshift position in the hybrid vehicle of this embodiment. The manipulation unit 160 is located along a longitudinal axis of the vehicle on the floor next to the driver's seat.

As shown in FIG. 4, the manipulation unit 160 includes a gearshift lever 162. The driver slides the gearshift lever 162 along the longitudinal axis of the vehicle to select one among available gearshift positions. The available gearshift positions include a parking (P) position, a reverse (R) position, a neutral (N) position, a drive (D) position, a fourth position (4), a third position (3), a second position (2), and a low position (L), which are arranged in this order from the forward of the vehicle.

The parking (P), reverse (R), and neutral (N) positions respectively correspond to the coupling states shown in FIG. 3. At the drive position (D), the selected mode enables a drive using the first speed ($1^{st}$) to the fifth speed ($5^{th}$) shown in FIG. 3. At the fourth position (4), the selected mode enables a drive using the first speed ($1^{st}$) to the fourth speed ($4^{th}$). In a similar manner, the selected mode at the third position (3), the second position (2), and the low position (L) respectively enables a drive using the first speed ($1^{st}$) to the third speed ($3^{rd}$), using the first speed ($1^{st}$) to the second speed ($2^{nd}$), and using only the first speed ($1^{st}$).

In the hybrid vehicle of the embodiment, the driver can arbitrarily set the deceleration by the power source braking as discussed later. The manipulation unit 160 for selecting the gearshift position has a mechanism for setting the deceleration.

As shown in FIG. 4, in the hybrid vehicle of the embodiment, the gearshift lever 162 may be slid sideways at the drive (D) position, as well as slid in the longitudinal direction for selecting the gearshift position. The position selected in this way is called an E position. When the gearshift lever 162 is at the E position, the setting of the deceleration by the power source braking may be varied by operating the gearshift lever 162 in the longitudinal direction as discussed below. The manipulation unit 160 includes a sensor for detecting the selected gearshift position and an E position switch that is turned on when the gearshift lever 162 is at the E position. The signals of these sensor and switch are transmitted to the control unit 70 and used for the various control operations in the vehicle as discussed later.

The following describes the series of operations when the gearshift lever 162 is at the E position. The gearshift lever 162 is kept in the middle of the E position, that is, the neutral state, while the driver does not hold the gearshift lever 162. When the driver desires to increase the deceleration, that is, when abrupt braking is required, the driver presses back the gearshift lever 162 (to the side of Decel). When the driver desires to decrease the deceleration, that is, when gentle braking is required, on the other hand, the driver presses forward the gearshift lever 162 (to the side of Can-Decel). The gearshift lever 162 is not continuously slid in the longitudinal direction at the E position but is moved stepwise. Namely the gearshift lever 162 may be set in one of the three states, that is, the neutral state, the pressing-forward Can-Decel state, and the pressing-back Decel state at the E position. When the driver releases the force applied to the gearshift lever 162, the gearshift lever 162 immediately returns to the neutral state. The deceleration by the power source braking is varied in a stepwise manner according to the frequency of operations of the gearshift lever 162 in the longitudinal direction.

Figure 5:
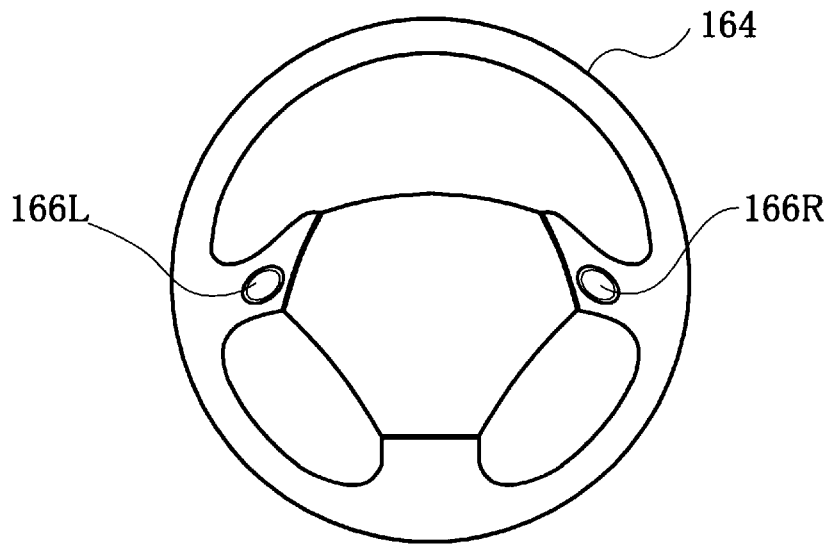
FIG. 5 shows operation elements mounted on a steering wheel.
Figure 5:
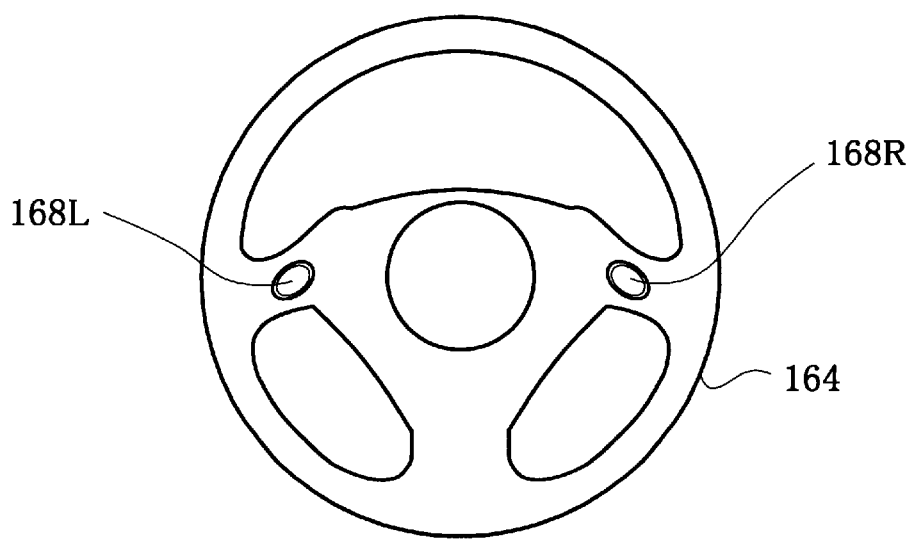

The hybrid vehicle of the embodiment has operation elements mounted on a steering wheel to vary the deceleration by the power source braking, in addition to the operations of the gearshift lever 162 described above. FIG. 5 shows the operation elements mounted on the steering wheel. FIG. 5(a) shows the surface of the steering wheel 164, that is, the side facing the driver. A pair of Decel switches 166L and 166R are placed on a spoke of the steering wheel 164 to increase the deceleration. The positions of these switches 166L and 166R are specified to allow an easy manual operation with the left thumb or the right thumb while the driver handles the steering wheel. In this embodiment, the two switches 166L and 166R have an identical function, in order to ensure the adequate operation without any confusion even when the steering wheel 164 is rotated.

FIG. 5(b) shows the rear face of the steering wheel 164. A pair of Can-Decel switches 168L and 168R are mounted at practically reverse positions of the Decel switches 166L and 166R to decrease the deceleration. The positions of these switches 168L and 168R are also specified to allow an easy manual operation with the left index finger or the right index finger while the driver handles the steering wheel. Because of the same reason as discussed above with regard to the Decel switches 166L and 166R, the two Can-Decel switches 168L and 168R have an identical function.

When the driver presses the Decel switch 166L or 166R, the deceleration is increased according to the frequency of pressing the switch. When the driver presses the Can-Decel switch 168L or 168R, on the other hand, the deceleration is decreased according to the frequency of pressing the switch. These switches 166L, 166R, 168L, and 168R are effective only in the case where the gearshift lever 162 is at the E position (see FIG. 4). This arrangement effectively prevents the setting of the target deceleration from being changed unintentionally by accidental presses of these switches 166L, 166R, 168L, and 168R while the driver handles the steering wheel 164.

The manipulation unit 160 also has a snow mode switch 163. The driver presses the snow mode switch 163 when the road surface has a low friction coefficient and is in a slippery condition, for example, in the case of snow-covered road. In the ON position of the snow mode switch 163, the upper limit of the target deceleration is restricted to be not greater than a preset level as discussed later. The speed reduction by a large deceleration during a drive on the road surface having a low friction coefficient may cause a slip or a skid of the vehicle. In the ON position of the snow mode switch 163, the deceleration is restricted to be not greater than the preset level, so as to prevent a slip or a skid of the vehicle. In the ON position of the snow mode switch 163, the deceleration may be changed in a certain range that does not cause a slip or a skid of the vehicle.

Figure 6:
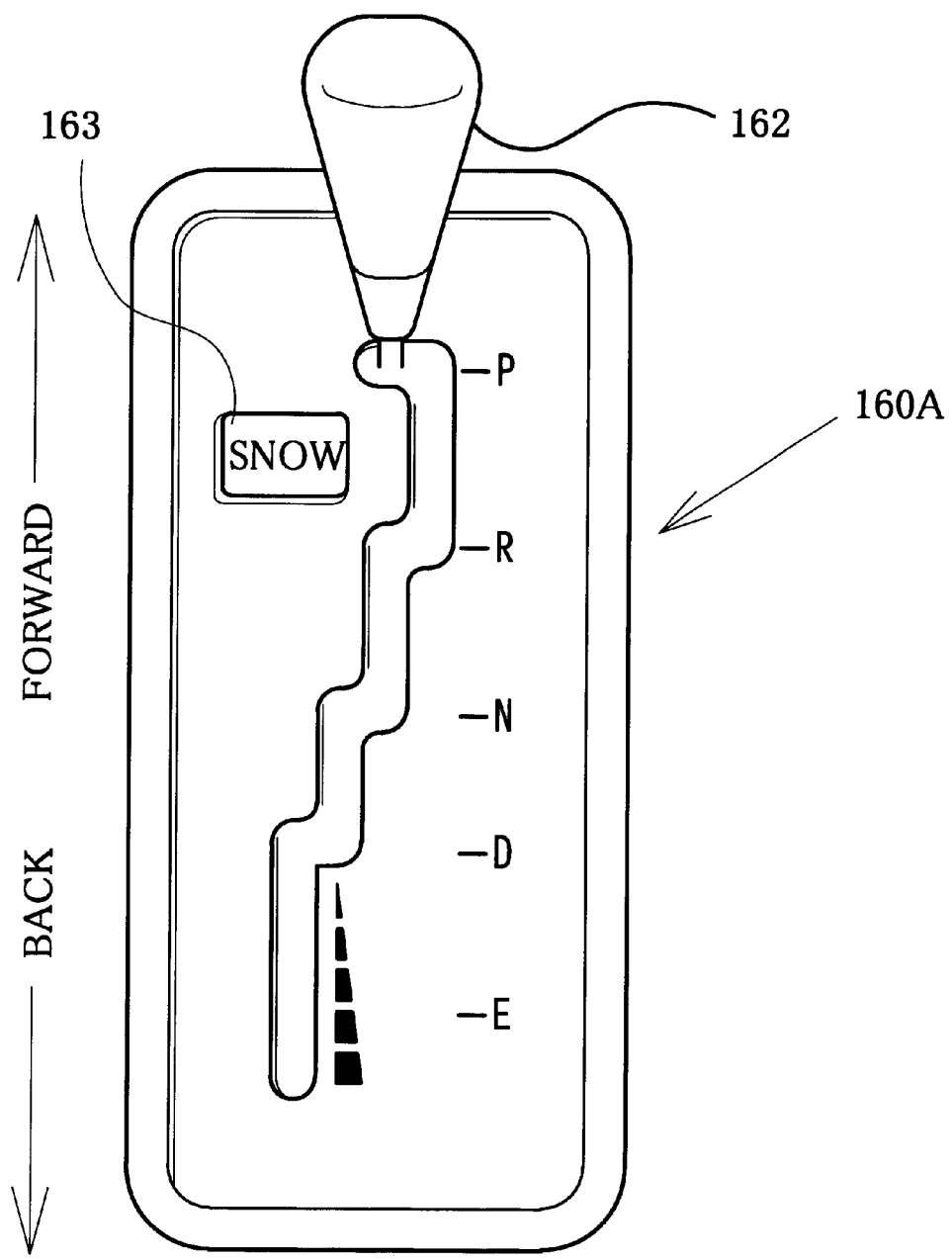
FIG. 6 shows another manipulation unit 160A having a modified structure.

The manipulation unit for selecting the gearshift position and setting the target deceleration is not restricted to the structure of the embodiment (shown in FIG. 4), but may have any suitable structure. FIG. 6 shows another manipulation unit 160A having a modified structure. The manipulation unit 160A is arranged along the longitudinal axis of the vehicle on the floor next to the driver's seat. The driver slides the gearshift lever 162 in the longitudinal direction to select one among various gearshift positions. Although the fourth to the low positions are omitted from the illustration of FIG. 6, the manipulation unit 160A of the modified structure may have these gearshift positions like the manipulation unit 160 shown in FIG. 4. The manipulation unit 160A of the modified structure has the E position at the rear of the normal movable range for selecting the gearshift position. The driver slides the gearshift lever 162 along the longitudinal axis of the vehicle in the E position, so as to vary the setting of the deceleration continuously. In this example, the deceleration increases with a backward slide of the gearshift lever 162, and decreases with a forward slide of the gearshift lever 162. This modified structure is only an example, and there are a diversity of other structures applicable for the mechanism of setting the deceleration.

Figure 7:
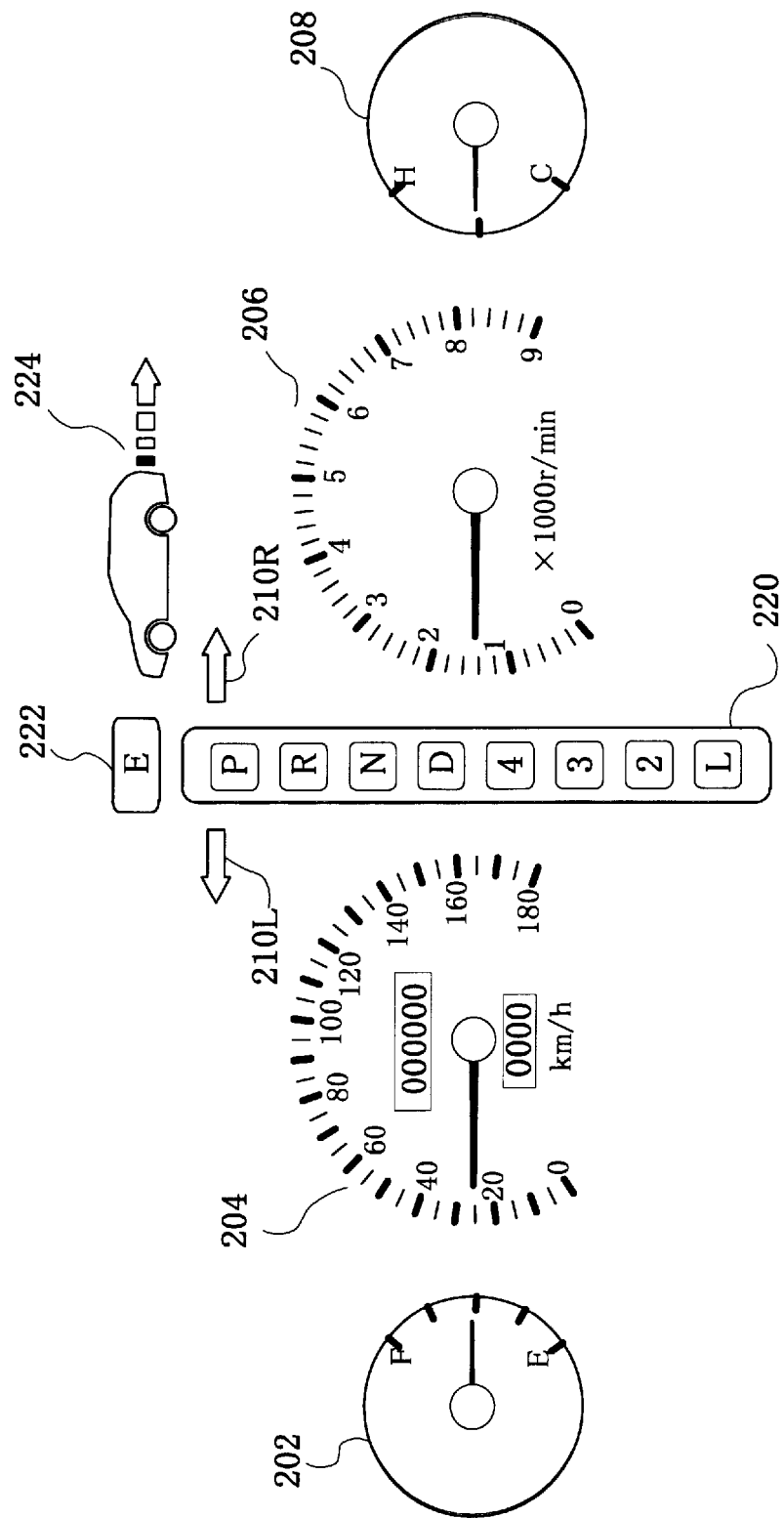
FIG. 7 shows an instrument panel in the hybrid vehicle of the embodiment.

The setting of the deceleration is displayed on an instrument panel in the vehicle. FIG. 7 shows an instrument panel in the hybrid vehicle of this embodiment. The instrument panel is placed in front of the driver like the standard vehicle. A fuel gauge 202 and a speedometer 204 are disposed on the left side of the instrument panel seen from the driver. An engine temperature gauge 208 and a tachometer 206 are disposed on the right side of the instrument panel. A gearshift position indicator 220 is arranged on the center of the instrument panel to display the gearshift position. Direction indicators 210L and 210R are set on both sides of the gearshift position indicator 220. These instruments are also found in the standard vehicle. In the hybrid vehicle of this embodiment, in addition to these instruments, an E position indicator 222 is provided above the gearshift position indicator 220. A deceleration indicator 224 is also set on the right side of the E position indicator 222 to display the current setting of the deceleration.

The E position indicator 222 lights up when the gearshift lever 162 is set at the E position. When the driver presses the Decel switch and the Can-Decel switch to set the deceleration, the length of a rearward arrow (rightward arrow in FIG. 7) displayed with a symbol of the vehicle in the deceleration indicator 224 is varied to express the setting of the deceleration. In the hybrid vehicle of the embodiment, the setting of the deceleration may be restricted according to a variety of conditions as discussed later. In the case where the setting of the deceleration is restricted, the E position indicator 222 and the deceleration indicator 224 flash or give a display in a different form, in order to inform the driver of the restricted setting of the deceleration.

Figure 8:
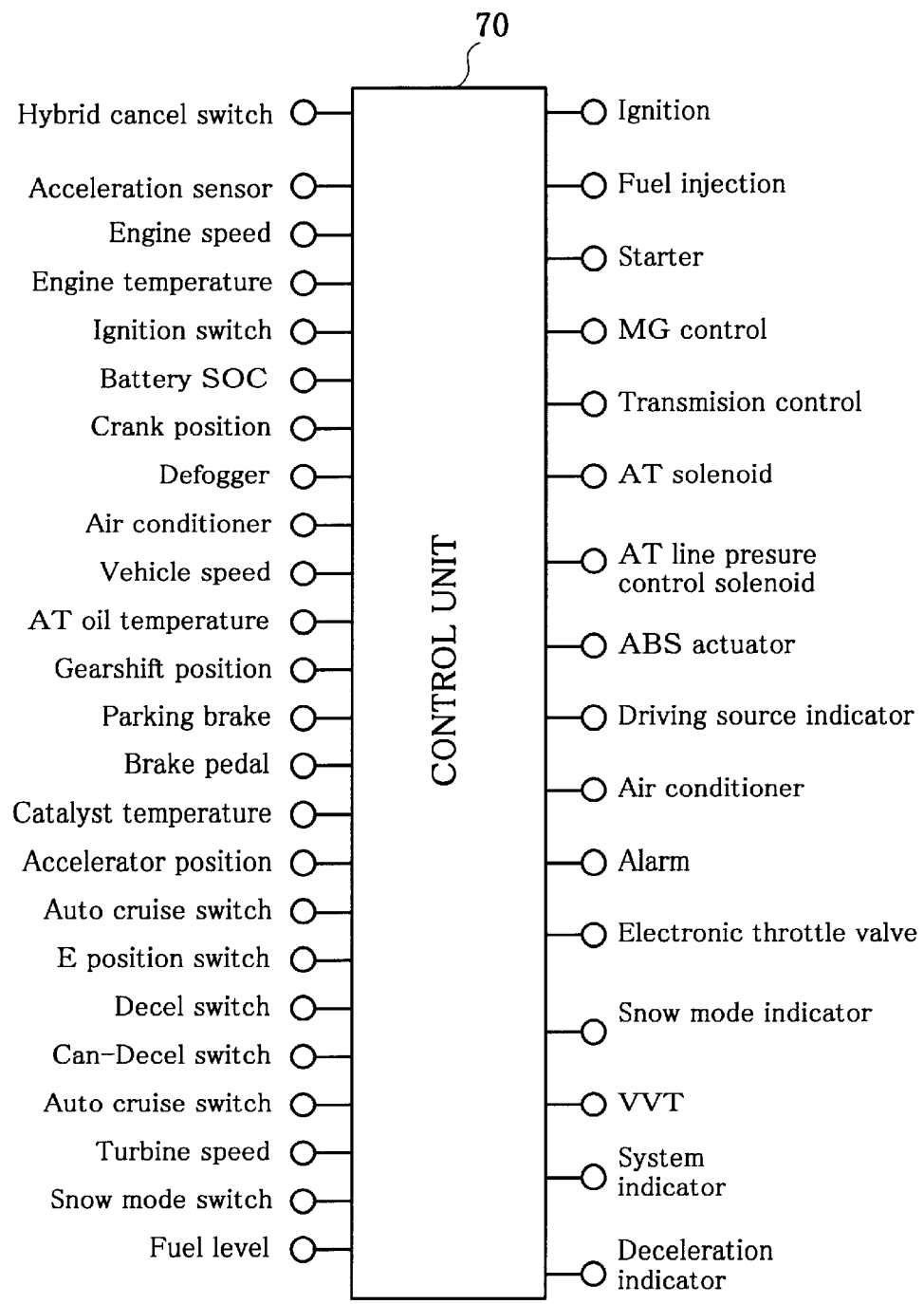
FIG. 8 shows connections of input and output signals into and from a control unit 70 in the hybrid vehicle of the embodiment.

In the hybrid vehicle of the embodiment, the control unit 70 controls the operations of the engine 10, the motor 20, the torque converter 30, and the transmission 100 (see FIG. 1). The control unit 70 is constructed as a one-chip microprocessor including a CPU, a RAM, and a ROM. The CPU carries out various control operations discussed below according to programs recorded in the ROM. A variety of input and output signals are connected to the control unit 70 to implement the control operations. The illustration of FIG. 1 includes, as typical examples, a signal output from the manipulation unit 160 with the gearshift lever and a signal output from an accelerator pedal position sensor 72 for measuring the step-on amount of an accelerator pedal 74, that is, the accelerator position. A diversity of other signals shown in FIG. 8 are also input into and output from he control unit 70. FIG. 8 shows connections of input and output signals into and from the control unit 70. The left side of FIG. 8 shows the signals input into the control unit 70, whereas the right side shows the signals output from the control unit 70.

The signals input into the control unit 70 are received from various switches and sensors. The input signals represent, for example, the on-off state of a hybrid cancel switch to set a drive only with the engine 10 as the power source, the acceleration of the vehicle measured with an acceleration sensor, the speed of the engine 10, the water temperature in the engine 10, the on-off state of an ignition switch, the state of charge or remaining charge SOC of the battery 50, the crank position of the engine 10, the on-off state of a defogger, the driving condition of an air conditioner, the vehicle speed, the oil temperature in the torque converter 30, the gearshift position (see FIG. 4), the on-off state of a parking brake, the amount of actuation of the brake pedal, the temperature of a catalyst for converting the exhaust of the engine 10, the accelerator position or travel, the on-off state of an auto cruise switch, the on-off state of the E position switch (see FIG. 4), the operating state of the Decel switch and the Can-Decel switch to change the setting of the target deceleration, the turbine speed of a supercharger, the on-off state of the snow mode switch to set a drive mode on the road surface having a low friction coefficient, such as the snow-covered road, and the level of the fuel measured by the fuel gauge.

The signals output from the control unit 70 are used to control the engine 10, the motor 20, the torque converter 30, and the transmission 100. The output signals include, for example, an ignition signal to regulate the ignition timing of the engine 10, a fuel injection signal to control the fuel injection, a starter signal to start the engine 10, an MG control signal to carry out the switching in the driving circuit 40 and control the operation of the motor 20, a transmission control signal to change over the position of the change-speed gear in the transmission 100, an AT solenoid signal and an AT line pressure control solenoid signal to regulate the hydraulic pressure in the transmission 100, a signal for regulating an actuator of an anti-lock braking system (ABS), a driving source indicator signal to display the source of the driving force, a control signal of the air conditioner, control signals for various alarms, a control signal of an electronic throttle valve of the engine 10, a snow mode indicator signal to display the selection of the snow mode, a VVT signal to regulate the open and close timings of the intake valve and the exhaust valve of the engine 10, a system indicator signal to display the driving state of the vehicle, and a deceleration indicator signal to display the current setting of the deceleration.

(2) General Operations

The following describes the general operations of the hybrid vehicle of this embodiment. As discussed previously with FIG. 1, the hybrid vehicle of this embodiment has the engine 10 and the motor 20 as the power source. The control unit 70 selectively uses the engine 10 and the motor 20 according to the driving state of the vehicle, that is, according to the combination of the vehicle speed and the torque. The adequate selection is set in advance in the form of a map and stored in the ROM included in the control unit 70.

Figure 9:
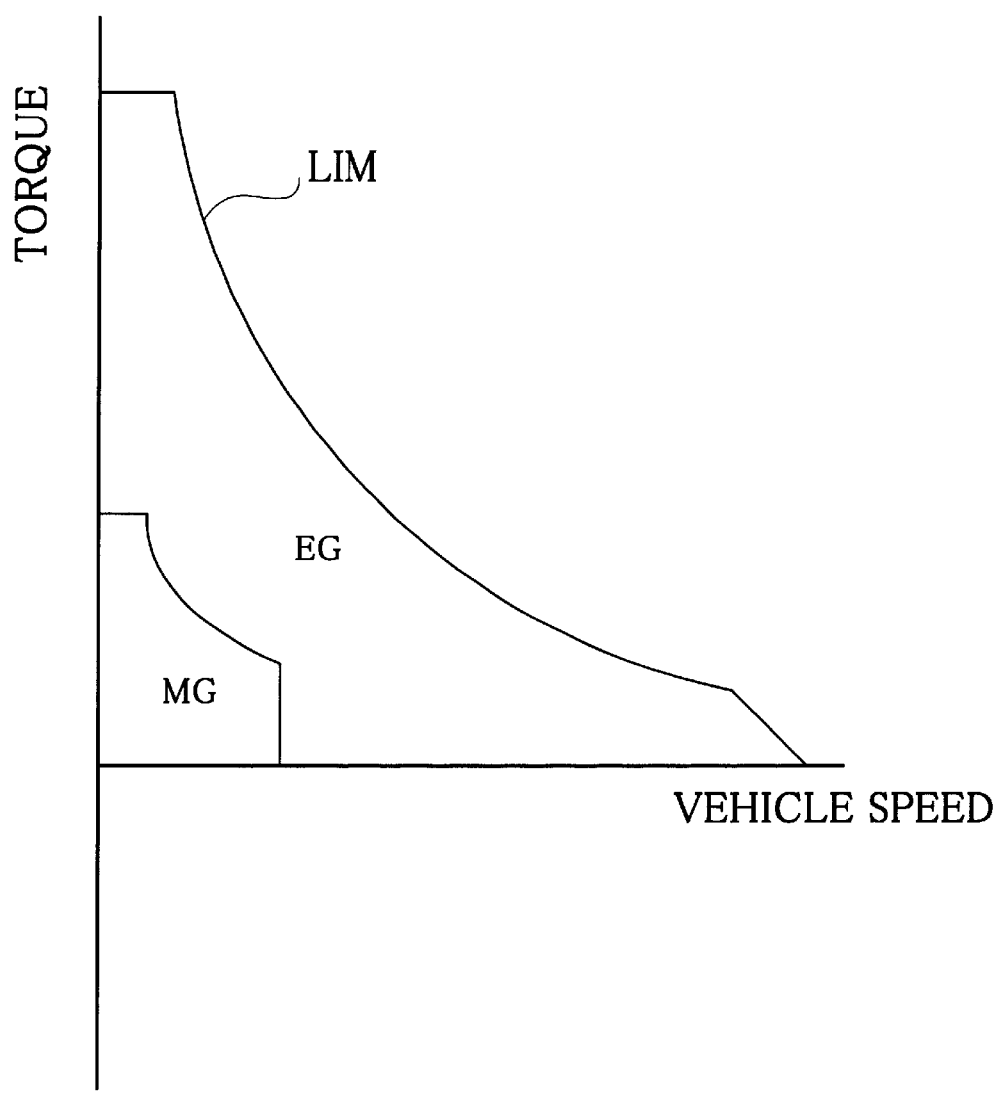
FIG. 9 is a map showing the relationship between the driving state of the vehicle and the power source.

FIG. 9 is a map showing the relationship between the driving state of the vehicle and the power source. A Curve LIM represents the limit of a drivable area of the vehicle. An area MG denotes a driving area in which the vehicle drives with the motor 20 as the power source, and an area EG denotes a driving area in which the vehicle drives with the engine 10 as the power source. Hereinafter the former is referred to as the EV drive and the latter as the standard drive. The arrangement of FIG. 1 allows the hybrid vehicle to be driven with both the engine 10 and the motor 20 as the power source, but this embodiment does not set such a driving area.

As shown in this map, the hybrid vehicle of this embodiment starts at the EV drive. As described previously (see FIG. 1), in the hybrid vehicle of the embodiment, the engine 10 and the motor 20 integrally rotate with each other. Even in the course of the EV drive, the engine 10 accordingly rotates, but is motored without fuel injection and ignition. As described previously, the engine 10 has the VVT mechanism. The control unit 70 controls the VVT mechanism and delays the open and close timings of the intake valve and the exhaust valve, in order to reduce the load applied to the motor 20 and enable the power output from the motor 20 to be effectively used for driving the vehicle in the case of the EV drive.

When the vehicle starting at the EV drive reaches a driving state close to the boundary between the area MG and the area EG in the map of FIG. 9, the control unit 70 starts the engine 10. Since the engine 10 has already been rotated at a predetermined speed by means of the motor 20, the control unit 70 simply carries out the fuel injection to the engine 10 and the ignition at a preset timing. The control unit 70 also controls the VVT mechanism to change the open and close timings of the intake valve and the exhaust valve to the timings suitable for driving the engine 10.

After the engine 10 starts, the vehicle is driven with only the engine 10 as the power source in the area EG. In response to the start of the drive in the area EG, the control unit 70 shuts down all the transistors included in the driving circuit 40. This causes the motor 20 to idle.

Figure 10:
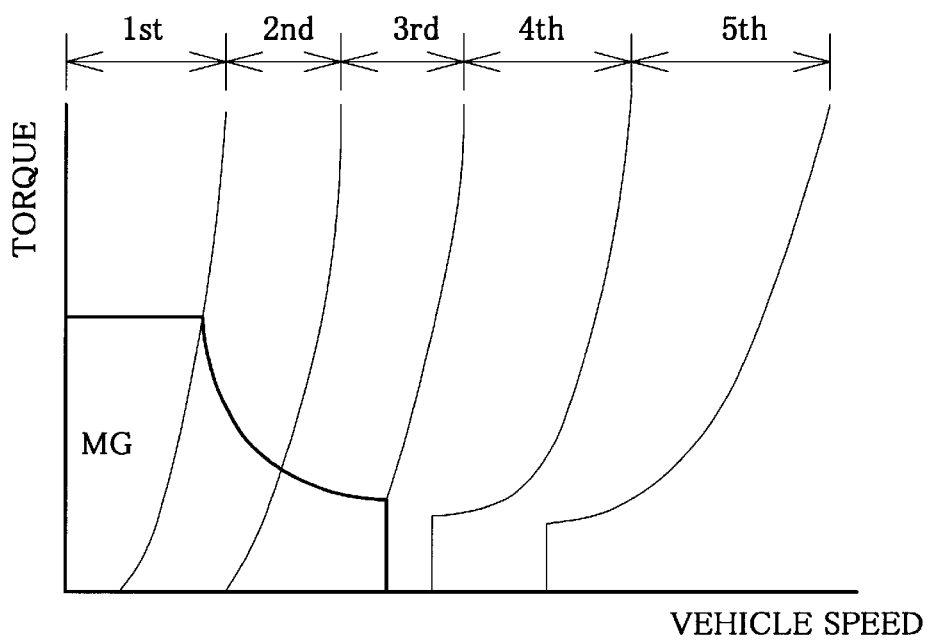
FIG. 10 is a map showing the relationship between the position of the change-speed gear in the transmission 100 and the driving state of the vehicle.

The control unit 70 carries out the control procedures to change the power source according to the driving state of the vehicle as well as to change over the position of the change-speed gear in the transmission 100. Like the changeover of the power source, the changeover of the position of the change-speed gear is implemented, based on a map that has been set in advance according to the driving state of the vehicle. FIG. 10 is a map showing the relationship between the position of the change-speed gear in the transmission 100 and the driving state of the vehicle. The control unit 70 changes over the position of the change-speed gear, in order to attain a smaller gear ratio with an increase in vehicle speed as shown in this map.

The changeover of the position of the change-speed gear is under the restriction of the gearshift position. At the drive (D) position, the vehicle may be driven using the change-speed gear up to the fifth speed ($5^{th}$) shown in the map of FIG. 10. At the fourth position (4), the vehicle is driven using the change-speed gear up to the fourth speed ($4^{th}$). In the latter case, the fourth speed ($4^{th}$) is used even in the area of the $5^{th}$ in the map of FIG. 10. The changeover of the position of the change-speed gear follows this map, and is also carried out by a kick down control. The kick down control changes over the position of the change-speed gear to a position of a greater gear ratio by one step, when the driver slams down on the accelerator pedal. The control procedures for the changeover are identical with those carried out in the conventional vehicle that uses only the engine as the power source and is provided with an automatic transmission. The hybrid vehicle of this embodiment carries out the similar control procedures during the EV drive (that is, in the area MG). The relationship between the position of the change-speed gear and the driving state of the vehicle is not restricted to the map of FIG. 10, but a variety of other settings are applicable for the relationship according to the gear ratio of the transmission 100.

The maps of FIGS. 9 and 10 correspond to the arrangement of selecting either the EV drive or the standard drive according to the driving state of the vehicle. The control unit 70 of the embodiment also has maps provided for the arrangement of carrying out only the standard drive over the whole driving state of the vehicle. These maps omit the area of the EV drive (that is, the area MG) from the maps of FIGS. 9 and 10. The EV drive requires the battery 50 to store a certain level of electric power. The control unit 70 thus selects the right map according to the state of charge in the battery 50 and carries out the control of the vehicle. When the state of charge SOC of the battery 50 is not less than a preset level, the control unit 70 carries out the control to drive the vehicle in the selected state of either the EV drive or the standard drive based on the maps of FIGS. 9 and 10. When the state of charge SOC of the battery 50 is less than the preset level, on the other hand, the control unit 70 carries out the control to drive the vehicle in the state of standard drive that uses only the engine 10 as the power source even at the time of starting and during a low-speed run. The selection of the right map is repeatedly carried out at predetermined time intervals. In some cases, the state of charge SOC of the battery 50 is not less than the preset level and the vehicle starts at the EV drive, but the consumption of electric power after the start makes the state of charge SOC less than the preset level. In this case, the control unit 70 changes the EV drive to the standard drive even when the driving state of the vehicle is within the area MG.

The following describes braking operations in the hybrid vehicle of the embodiment. The hybrid vehicle of the embodiment may adopt two different types of braking, that is, the wheel braking applied in response to actuation of the brake pedal and the power source braking by means of the loading torques from the engine 10 and the motor 20. The power source braking is made effective when the accelerator pedal is released. FIG. 9 shows a variation in braking force, that is, a variation in negative torque, by the power source braking. The variation in power source braking against the vehicle speed follows a straight line L1 in FIG. 9. When the driver steps on the brake pedal, the braking force applied to the vehicle is the sum of the power source braking and the wheel braking.

Under the application of the power source braking, the lockup clutch 31 of the torque converter 30 is generally controlled to be set in the coupling state. Some driving conditions, for example, the low oil temperature in the torque converter 30 and the low vehicle speed, however, are not suitable for coupling the lockup clutch 31. In such cases, the power source braking may be applied while the lockup clutch 31 is kept released. One modified application may regulate the degree of coupling of the lockup clutch 31 according to various conditions, for example, the vehicle speed and the engine speed. The following description regards the braking operations by the power source braking on the assumption that the lockup clutch 31 is set in the coupling state.

In the hybrid vehicle of the embodiment, the driver may set he deceleration by the power source braking through the operations at the E position as described previously. Namely the deceleration may be varied in a stepwise manner as shown by the broken line in FIG. 9. Operations of the Decel switch at the E position change the power source braking in the direction of the straight lines L1 and L2 in FIG. 9, so as to enhance the power source braking in a stepwise manner. Operations of the Can-Decel switch, on the other hand, weaken the power source braking in a stepwise manner.

Figure 11:
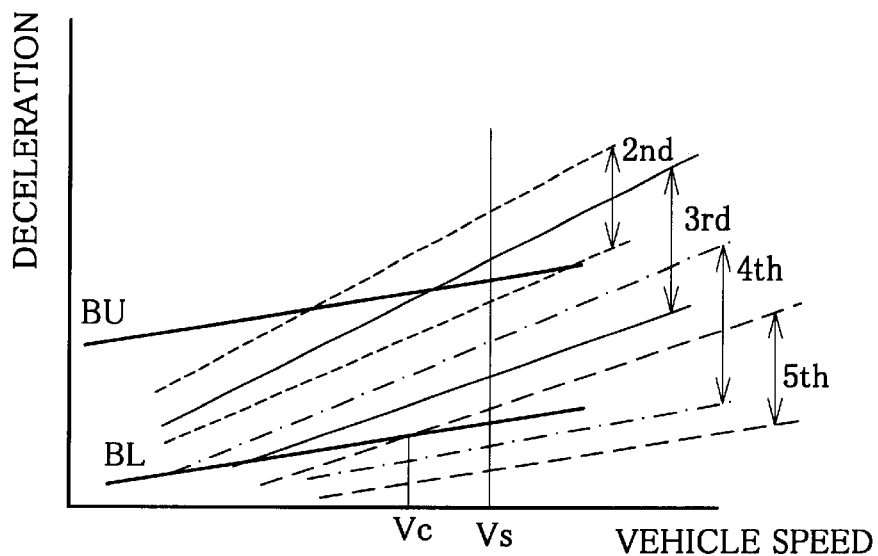
FIG. 11 is a map showing the combinations of the vehicle speed, the deceleration, and the position of the change-speed gear in the hybrid vehicle of the embodiment.

The hybrid vehicle of the embodiment implements the power source braking set in the stepwise manner as a combination of the changeover of the position of the change-speed gear in the transmission 100 with the braking force by the motor 20. FIG. 11 is a map showing the combinations of the vehicle speed, the deceleration, and the position of the change-speed gear in the hybrid vehicle of the embodiment. In the map of FIG. 11, the deceleration is expressed as absolute values. The operations of the Decel switch and the Can-Decel switch cause the deceleration of the vehicle to be varied in a stepwise manner in a range between straight lines BL and BU shown in FIG. 11.

The deceleration by the power source braking is varied in a certain range by regulating the torque of the motor 20. The changeover of the position of the change-speed gear in the transmission 100 varies the ratio of the torque of the power source to the torque output to the axle 17. This enables the deceleration of the vehicle to be changed according to the position of the change-speed gear. When the position of the change-speed gear is at the second speed ($2^{nd}$), regulating the torque of the motor 20 attains the deceleration in a range defined by the short-dashed lines in FIG. 11. At the third speed ($3^{rd}$), the regulation of the torque attains the deceleration in a range defined by the solid lines in FIG. 11. At the fourth speed ($4^{th}$), the regulation of the torque attains the deceleration in a range defined by the one-dot chain lines in FIG. 11. At the fifth speed ($5^{th}$), the regulation of the torque attains the deceleration in a range defined by the long-dashed lines in FIG. 11.

The control unit 70 selects the position of the change-speed gear to attain the preset deceleration based on the map of FIG. 11 and carries out the braking control. For example, when the deceleration is set on the straight line BL in FIG. 11, in an area of higher vehicle speed than a value Vc, the braking control is performed at the fifth speed ($5^{th}$). In the area of lower vehicle speed than the value Vc, on the other hand, the braking control is performed after the position of the change-speed gear is changed over to the fourth speed ($4^{th}$). In this area, the desired deceleration is not attained at the fifth speed ($5^{th}$). In the arrangement of this embodiment, the range of the deceleration attained at each position of the change-speed gear overlaps the ranges of deceleration attained at the adjacent positions of the change-speed gear. In the area of higher vehicle speed than the value Vc, the deceleration corresponding to the straight line BL may be attained at both the fourth speed ($4^{th}$) and the fifth speed ($5^{th}$). In this area, the control unit 70 selects the position of the change-speed gear suitable for the braking between the fourth speed ($4^{th}$) or the fifth speed ($5^{th}$), based on a variety of conditions, and carries out the braking control.

Figure 12:
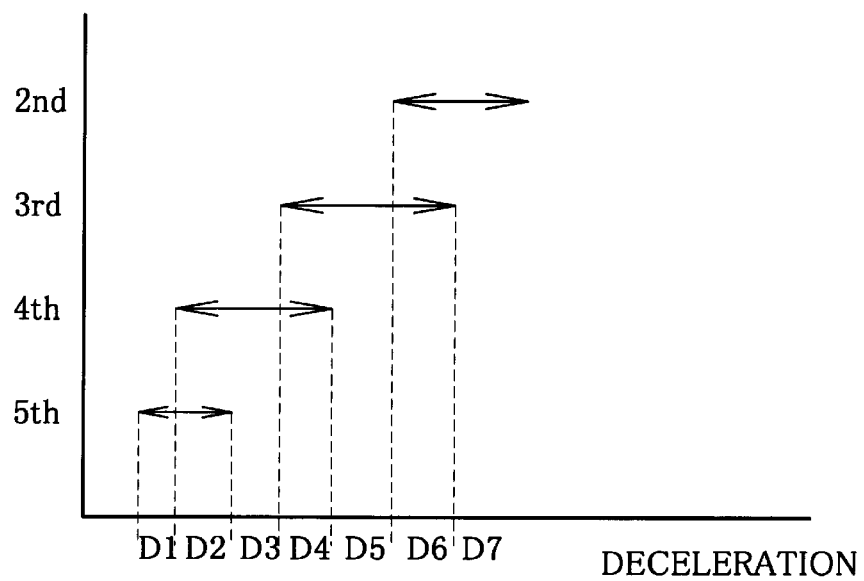
FIG. 12 is a map showing the relationship between the deceleration and the position of the change-speed gear at a certain vehicle speed Vs.

The settings at the respective positions of the change-speed gear in the embodiment are described more in detail. FIG. 12 is a map showing the relationship between the deceleration and the position of the change-speed gear at a certain vehicle speed Vs. The map of FIG. 12 corresponds to the relationship between the deceleration and the position of the change-speed gear along a straight line Vs in the map of FIG. 11. As shown in the map of FIG. 12, in a division D1 of relatively low deceleration, the target deceleration is attained only at the fifth speed ($5^{th}$). In a division D2 of higher deceleration, the target deceleration is attained at both the fifth speed ($5^{th}$) and the fourth speed ($4^{th}$). In a similar manner, the respective target decelerations are attained only at the fourth speed ($4^{th}$) in a division D3, at both the third speed ($3^{rd}$) and the fourth speed ($4^{th}$) in a division D4, only at the third speed ($3^{rd}$) in a division D5, at both the second speed ($2^{nd}$) and the third speed ($3^{rd}$) in a division D6, and only at the second speed ($2^{nd}$) in a division D7, where the deceleration increases in the order of the division D3 to the division D7. Although the map described here is for the braking control up to the second speed ($2^{nd}$), the map may also include the setting at the first speed ($1^{st}$).

Figure 13:
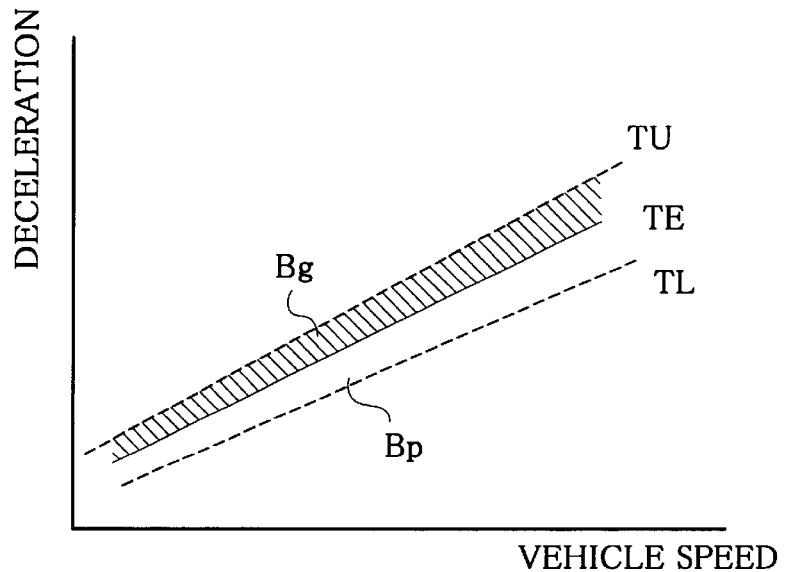
FIG. 13 is a graph showing a variation in deceleration at a fixed position of the change-speed gear.

The following gives the reason why the range of deceleration attained at each position of the change-speed gear overlaps the adjacent ranges of deceleration. FIG. 13 is a graph showing a variation in deceleration at the second speed ($2^{nd}$). Dashed lines TL and TU respectively represent the lower limit and the upper limit of deceleration attained at the second speed ($2^{nd}$). A solid line TE represents the deceleration attained only by engine brake of the engine 10. In the hybrid vehicle of the embodiment, the control of the VVT mechanism enables the deceleration by engine brake to be varied. Such control, however, has poor response and low accuracy. The technique of the embodiment accordingly does not control the VVT mechanism in the course of braking. The deceleration by engine brake is thus unequivocally determined against the vehicle speed as shown in FIG. 13.

In the hybrid vehicle of this embodiment, the deceleration is varied by regulating the torque of the motor 20. In a hatched area Bg of FIG. 13, the motor 20 carries out the regenerative operation and applies an additional braking force, thereby attaining a higher deceleration than the deceleration only by engine brake. In another area Bp, which is defined by the straight line TE and the dashed line TL, the motor 20 carries out the power operation and outputs a driving force, thereby attaining a lower deceleration than the deceleration only by engine brake.

Figure 14:
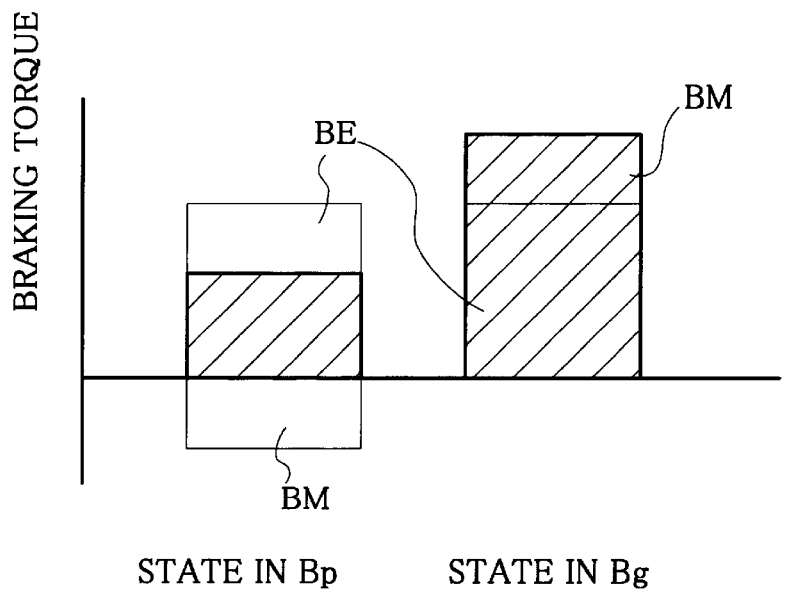
FIG. 14 schematically illustrates a comparison between a braking torque in the case where the motor 20 carries out the regenerative operation and a braking torque in the case where the motor 20 carries out the power operation.

FIG. 14 schematically illustrates the comparison between a braking torque in the case where the motor 20 carries out the regenerative operation and a braking torque in the case where the motor 20 carries out the power operation. The left bar in the graph shows the braking torque when the motor 20 carries out the power operation (that is, the state in the area Bp). The braking torque by engine brake is expressed as a bar BE. In the area Bp, the motor 20 outputs a driving force expressed as a bar BM in reverse of the direction of the braking torque BE by engine brake. The total braking torque, which is obtained as the sum of the braking torque by engine brake and the driving force by the motor 20, is output to the axle 17. The output braking torque is accordingly smaller than the braking torque BE by engine brake as shown in a hatched area.

The right bar in the graph shows the braking torque when the motor 20 carries out the regenerative operation (that is, the state in the area Bg). It is assumed that the braking torque BE by engine brake in the area Bg is identical with the braking torque BE in the area Bp. In the area Bp, the motor 20 outputs an additional braking torque expressed as a bar BM in the same direction as that of the braking torque by engine brake. The total braking torque, which is obtained as the sum of the braking torque by engine brake and the additional braking torque by the motor 20, is output to the axle 17. The output braking torque is accordingly greater than the braking torque BE by engine brake as shown in a hatched area.

The hybrid vehicle of the embodiment changes the driving state of the motor 20 between the regenerative operation and the power operation, so as to attain the higher deceleration and the lower deceleration than the deceleration only by engine brake. The map of FIG. 11 is set to make the area of deceleration attained by the power operation of the motor 20 at a specific position of the change-speed gear having a greater gear ratio overlap the area of deceleration attained by the regenerative operation of the motor 20 at a specific position of the change-speed gear having a smaller gear ratio. For example, the braking area by the power operation of the motor 20 at the second speed ($2^{nd}$) is made to overlap the braking area by the regenerative operation of the motor 20 at the third speed ($3^{rd}$).

This arrangement ensures the braking control according to the state of charge SOC of the battery 50. In the case where the battery 50 is in a state that allows further charging, the position of the change-speed gear having a smaller gear ratio is selected to attain the desired deceleration by the regenerative operation of the motor 20. In the case where the battery 50 is in a state that is close to the full charge, on the other hand, the position of the change-speed gear having a greater gear ratio is selected to attain the desired deceleration by the power operation of the motor 20. The technique of the embodiment sets the areas of deceleration at two adjacent positions of the change-speed gear in an overlapping manner, thereby attaining the desired deceleration irrespective of the state of charge SOC of the battery 50.

The above settings are only one example, where the area of deceleration at each position of the change-speed gear overlaps the areas of deceleration at the adjacent positions of the change-speed gear as shown in the map of FIG. 11. One possible modification sets the area of deceleration attained at each position of the change-speed gear in a non-overlapping manner. Another possible modification sets the area of deceleration attained at each position of the change-speed gear partly in an overlapping manner.

The setting of the deceleration corresponds to the lower limit of the power source braking applied to the vehicle. Here it is assumed that the setting of the deceleration is on the straight line BL. In the case where the position of the change-speed gear is at the third speed ($3^{rd}$) in the area of higher vehicle speed than Vc, the actual deceleration is always greater than the deceleration corresponding to the straight line BL. The lower limit of the deceleration is set in the hybrid vehicle of the embodiment. The desired deceleration is accordingly attained in this case. Namely, in the above case, the control procedure does not change the position of the change-speed gear over to the fourth speed ($4^{th}$) or the fifth speed ($5^{th}$) to attain a relatively low deceleration corresponding to the straight line BL. In the event that the driver presses the Can-Decel switch to lower the setting of the deceleration, however, the position of the change-speed gear should be changed over to attain the deceleration required by the driver.

As described above, the technique of this embodiment effects the braking control with the deceleration according to the driver's setting. Such braking control is carried out when the gearshift lever is in the E position (hereinafter referred to as the E position braking control). The standard braking control is performed in the case where the gearshift lever is out of the E position. The standard braking control does not change over the position of the change-speed gear, unlike the E position braking control. The standard braking control accordingly effects the braking at the present position of the change-speed gear used at the time when the power source braking starts application. When the gearshift lever is set in the drive position (D), the vehicle is typically driven at the fifth speed ($5^{th}$). The braking is thus performed with a relatively low deceleration that can be attained at the fifth speed ($5^{th}$). When the gearshift lever is set in the fourth position (4), the vehicle is driven up to the fourth speed ($4^{th}$). The braking is thus performed with a little higher deceleration than the deceleration in the drive position (D). In the case of standard braking control, the motor 20 carries out the regenerative operation in which the braking force gives a certain load. The standard braking control does not allow the wide range of deceleration at each position of the change-speed gear as shown in the map of FIG. 11, but attains only the deceleration along one straight line at each position of the change-speed gear.

(3) Drive Control Process

In the hybrid vehicle of the embodiment, the control unit 70 controls the operations of the engine 10 and the motor 20, so as to enable the drive discussed above. The following describes the details of the speed reduction control in the course of the braking operation, which is characteristic of the hybrid vehicle of the embodiment.

Figure 15:
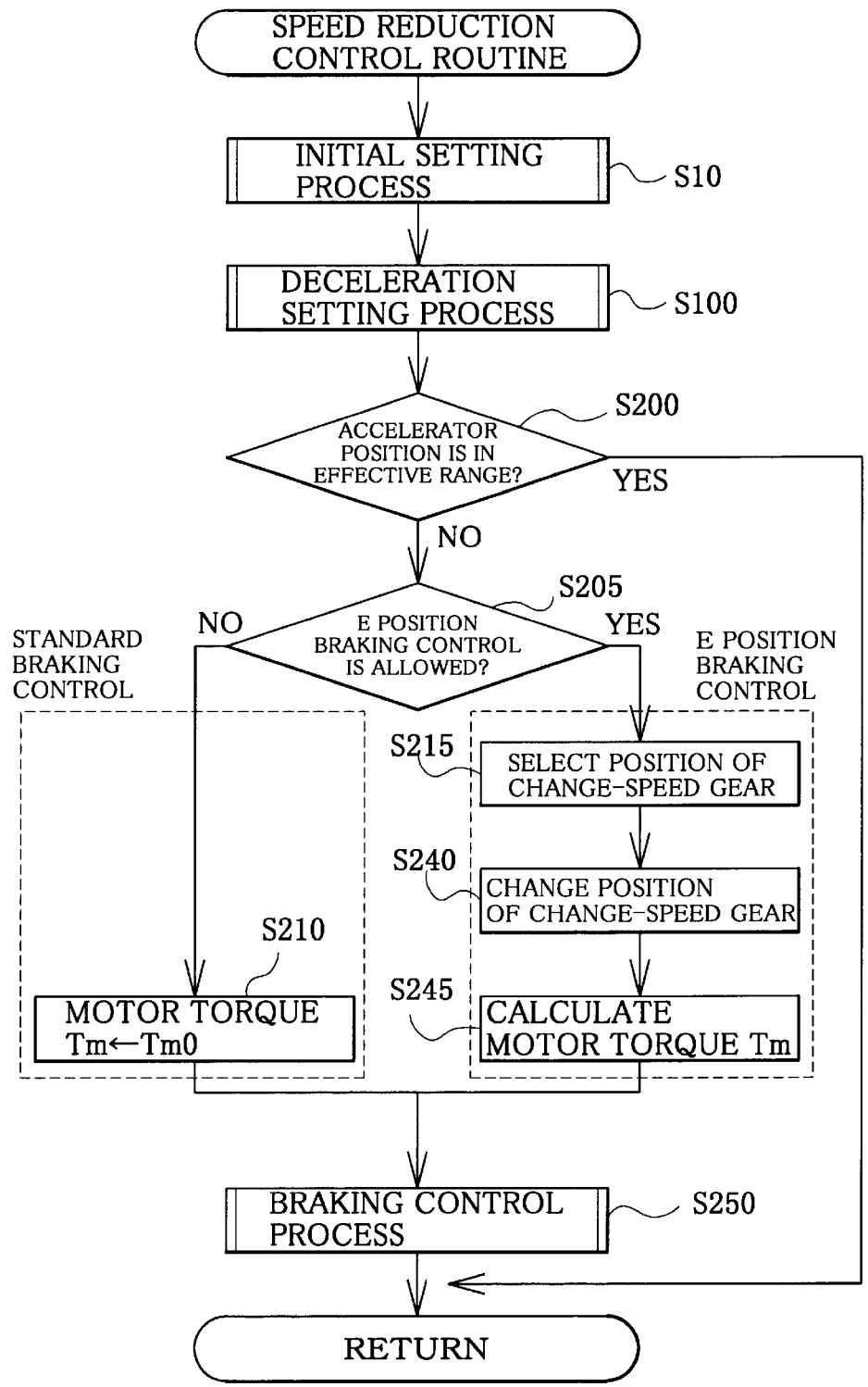
FIG. 15 is a flowchart showing a speed reduction control routine.

FIG. 15 is a flowchart showing a speed reduction control routine, which is executed at predetermined time intervals by the CPU included in the control unit 70. When the program enters the speed reduction control routine of FIG. 15, the CPU first carries out an initial setting process (step S10). The initial setting process sets the initial value of the target deceleration required for the speed reduction control and cancels the current setting of the target deceleration. The initial setting process is carried out not only at the first cycle of the speed reduction control routine but at every iterative cycle of the speed reduction control routine.

Figure 17:
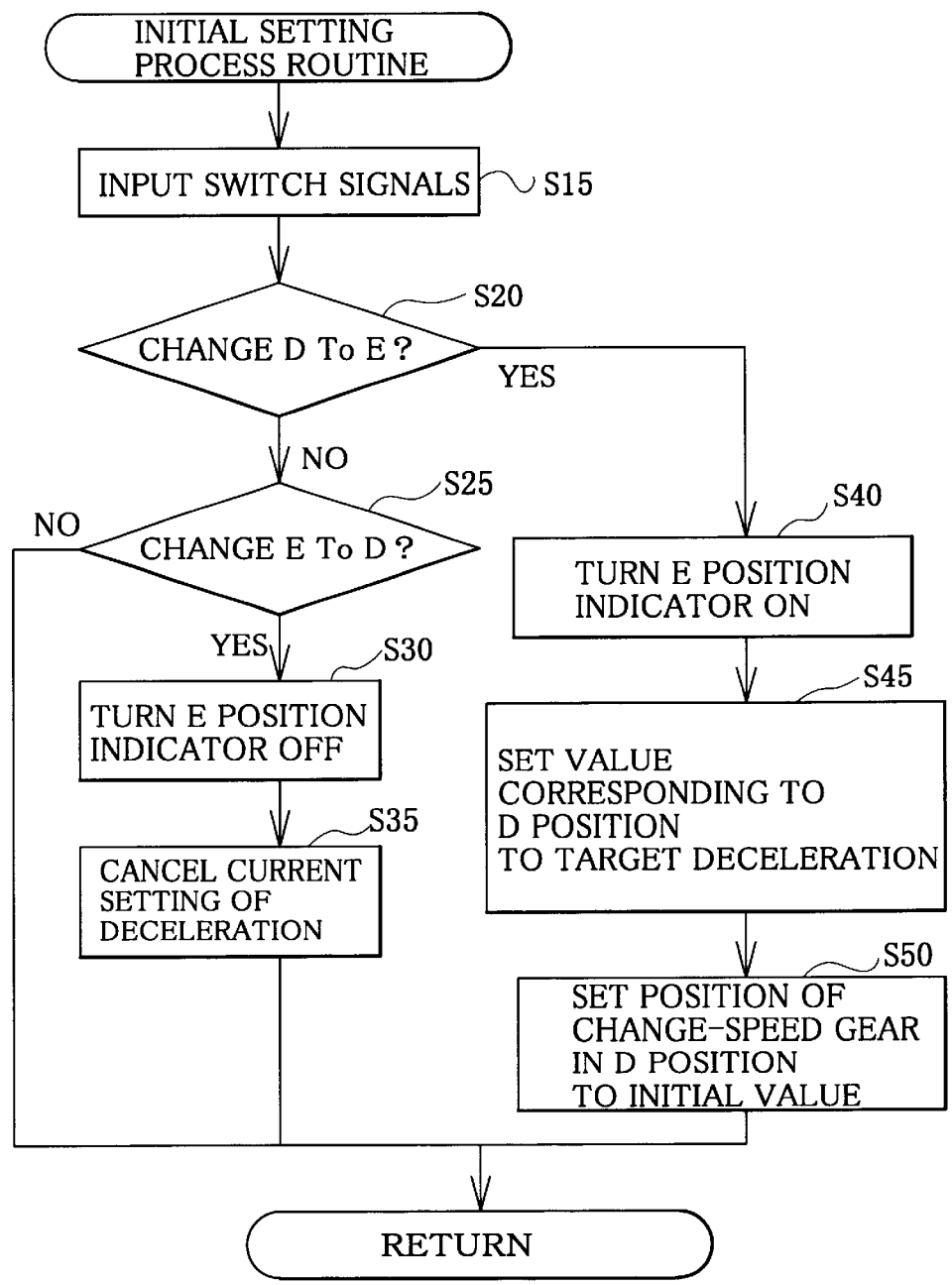
FIG. 17 is a flowchart showing a routine of initial setting process.

FIG. 17 is a flowchart showing details of the initial setting process. In the initial setting process routine, the CPU first receives signals from various switches (step S15). The signals input here are those enumerated in FIG. 8. The signals directly relating to the initial setting process routine are only the gearshift position signal and the E position switch signal. The procedure of step S15 may thus input only the gearshift position signal and the E position switch signal.

The CPU then determines whether or not the gearshift position has been changed over from the D position to the E position, based on the input signals (step S20). In the case where the currently input gearshift position is the E position and the previously input gearshift position is the D position, the CPU determines that the above changeover has been implemented. The determination may alternatively be based on the change of the state of the E position switch from the OFF position to the ON position.

When it is determined that the gearshift position has been changed over from the D position to the E position, the E position indicator (see FIG. 7) is turned on (step S40). An ON signal for turning the E position indicator on is output as the system indicator signal shown in FIG. 8. The E position indicator lights up in response to this ON signal.

Simultaneously with the light-up of the E position indicator, the CPU sets an initial value corresponding to the D position to the target deceleration (step S45).

In the case where the power source braking starts application at the fifth speed ($5^{th}$) while the gearshift lever is set in the D position, the procedure of step S45 sets the deceleration attained at the fifth speed ($5^{th}$) to the initial value of the target deceleration. In this embodiment, as shown in the map of FIG. 11, in the area of low vehicle speed, the minimum possible setting of the deceleration (defined by the straight line BL) may be greater than the deceleration attained at the fifth speed ($5^{th}$). Although not being specifically shown in the flowchart, the setting of the target deceleration at step S45 is performed only in the possible range of deceleration at the E position. When the deceleration attained at the D position is lower than the minimum possible setting of the deceleration (the straight line BL) at the E position, the value corresponding to the straight line BL is set to the target deceleration. The initial setting of the target deceleration accordingly depends upon the position of the change-speed gear used in the D position. The initial setting of the target deceleration is equivalent to the deceleration attained at the D position in the area of relatively high vehicle speed. The initial setting of the target deceleration may, however, be greater than the deceleration attained at the D position in the area of relatively low vehicle speed.

One modified procedure of step S45 unconditionally sets an initial value of greater than the deceleration attained at the D position to the target deceleration. In many cases, the driver desires to change the deceleration at the E position when feeling insufficiency of the deceleration attained at the D position. Setting the initial value of greater than the deceleration at the D position to the target deceleration at step S45 enables the deceleration required by the driver to be attained quickly. The processing of step S45 aims at setting the initial value of the target deceleration at the E position, on the basis of the deceleration attained at the D position. This arrangement enables the driver to readily estimate the value of deceleration immediately after the changeover of the gearshift position to the E position. This facilitates the setting of the deceleration at the E position and reduces the driver's sense of incompatibility at the time of changeover to the E position.

The CPU then sets the position of the change-speed gear used in the D position to an initial position of the change-speed gear (step S50). As described previously, the hybrid vehicle of the embodiment regulates the torque of the motor 20 in combination with the changeover of the position of the change-speed gear at the E position, thereby effecting the braking with the setting of the target deceleration. The setting of the target deceleration here represents the minimum level of the deceleration required by the driver. In the case where the deceleration corresponding to the straight line BL in the map of FIG. 11 is set to the target deceleration, the position of the change-speed gear attaining the desired deceleration at the vehicle speed Vs can be selected among the second speed ($2^{nd}$) through the fifth speed ($5^{th}$). The processing of step S50 selects the position of the change-speed gear currently used in the D position out of the possible alternatives to the initial setting. This arrangement prevents the position of the change-speed gear from being changed simultaneously with the changeover of the gearshift position to the E position. This favorably reduces possible shocks at the time of the changeover to the E position.

When it is determined at step S20 that the gearshift position has not been changed over from the D position to the E position, on the other hand, the CPU subsequently determines whether or not the gearshift position has been changed over from the E position to the D position (step S25). In the case where the currently input gearshift position is the D position and the previously input gearshift position is the E position, the CPU determines that the above changeover has been implemented. The determination may alternatively be based on the change of the state of the E position switch from the ON position to the OFF position.

When it is determined that the gearshift position has been changed over from the E position to the D position, the E position indicator (see FIG. 7) is turned off (step S30). An OFF signal for turning the E position indicator off is output as the system indicator signal shown in FIG. 8. The E position indicator lights out in response to this OFF signal. Simultaneously with the light-out of the E position indicator, the CPU cancels the current setting of the target deceleration (step S35). The driver operates the Decel switch and the Can-Decel switch to set the desired deceleration during a drive at the E position as discussed later. The processing of step S35 cancels such setting of the desired deceleration.

In many cases, the deceleration required by the driver varies according to the driving state of the vehicle. There is accordingly relatively little necessity of storing the current setting of the target deceleration as provision for a next selection of the E position. The driver rarely remembers the current value of the target deceleration set previously. The arrangement of not canceling the current setting of the target deceleration but using the current setting at the time of a next selection of the E position may cause the braking control to be performed with the deceleration against the expectation of the driver, simultaneously with the changeover of the gearshift position to the E position. In order to prevent such troubles, the technique of this embodiment cancels the current setting of the target deceleration every time the gearshift position is changed over from the E position to the D position.

A variety of techniques other than the procedure discussed above may be applied to cancel the current setting of the target deceleration. One available technique cancels the current setting of the target deceleration every time the gearshift position is changed over from the D position to the E position, instead of from the E position to the D position. The procedure of this embodiment sets the initial value of the target deceleration regardless of the previous setting at the time of the changeover to the E position. The processing of step S35 to cancel the current setting may thus be omitted. An operation of canceling the current setting of the target deceleration may be provided separately. In this case, the current setting of the target deceleration is not cancelled at the time of the changeover of the gearshift position from the E position to the D position, but is cancelled only in response to a specific operation, for example, an operation of a cancel switch.

As described above, the CPU carries out the initial setting of the target deceleration and the position of the change-speed gear or the cancellation of the current setting of the target deceleration at the time of the changeover of the gearshift position to the E position or to the D position, and exits from the initial setting process routine. When it is determined at step S25 that the gearshift position has not been changed over from the E position to the D position, that is, when the gearshift position has been kept at the E position or at the D position, the initial setting process does not require the change of the settings of the target deceleration and the position of the change-speed gear. The CPU accordingly exits from the initial setting process routine without any further processing.

Referring back to the flowchart of FIG. 15, after the conclusion of the initial setting process routine, the CPU carries out a deceleration setting process (step S100). The deceleration setting process sets the deceleration to be attained at the E position, in response to the operations of the Decel switch and the Can-Decel switch. The details of the deceleration setting process are described with reference to FIG. 18.

Figure 18:
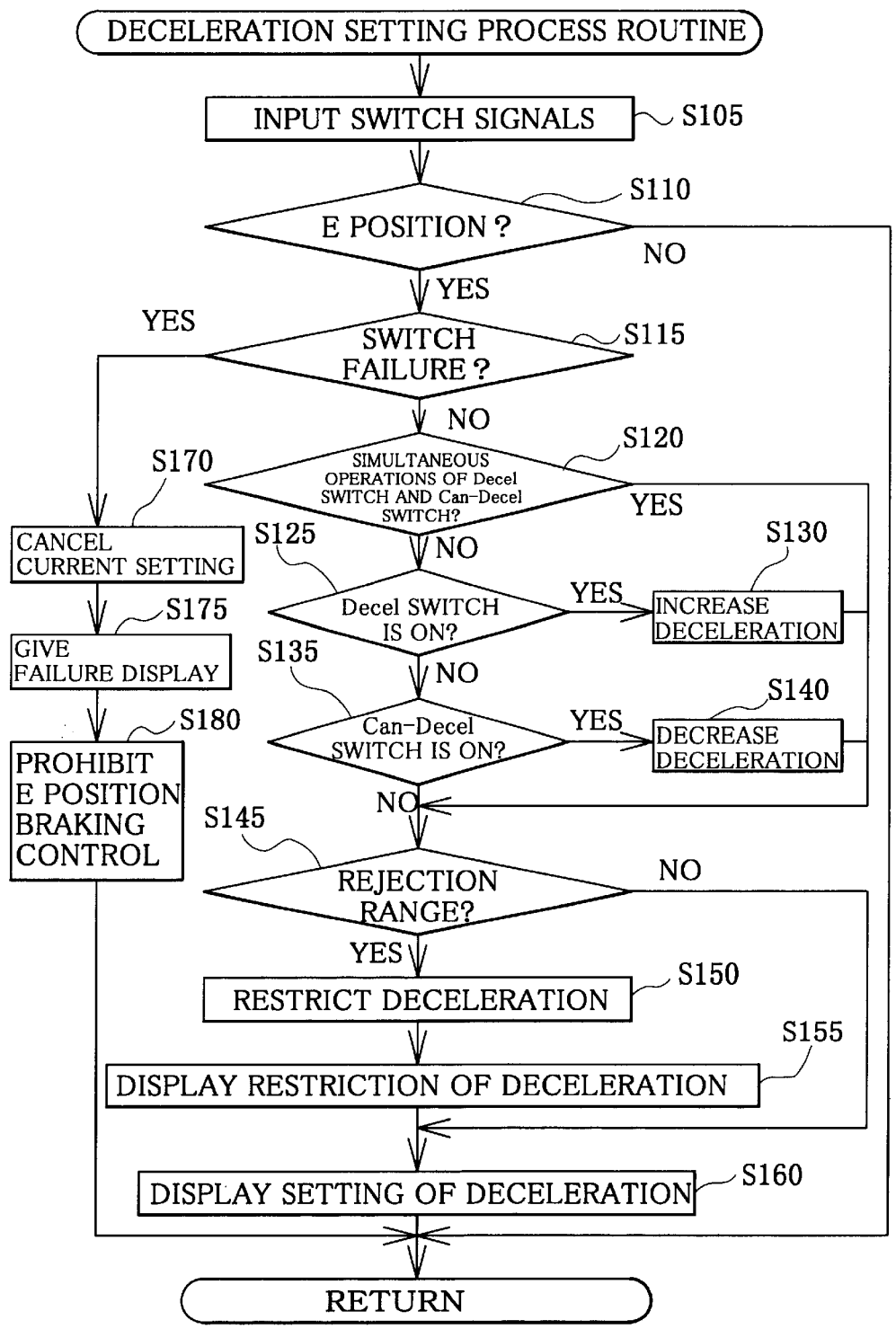
FIG. 18 is a flowchart showing a routine of deceleration setting process.

FIG. 18 is a flowchart showing a routine of the deceleration setting process. When the program enters the deceleration setting process routine, the CPU first receives signals from various switches (step S105). The signals input here are the Decel switch signal, the Can-Decel switch signal, the E position switch signal, and the snow mode switch signal among the various signals enumerated in FIG. 8, although the other signals may additionally be input.

The CPU determines whether or not the E position is currently selected, based on the input signals (step S110). More specifically the determination is based on the on-off state of the E position switch. When the E position is not selected at present, the CPU determines that there is no necessity of changing the current setting of the deceleration and exits from the deceleration setting process routine without any further processing.

When it is determined at step S110 that the E position is selected at present, on the other hand, the CPU subsequently determines whether or not there is any failure with regard to the Decel switch and the Can-Decel switch (step S115). A variety of techniques are applicable to detect the possible failure. For example, in the case of a contact failure of the switch, chattering occurs to cause extremely frequent switch-over between the ON position and the OFF position. The on-off change at a frequency of or over a predetermined level over a preset time period leads to detection of the switch failure. On the contrary, the continuous switch-on state for a longer time period than expected from the standard operation also leads to detection of the switch failure.

When any failure of the switch is detected, the CPU cancels the current setting of the target deceleration (step S170), in order to prevent the deceleration from being set against the intention of the driver. The processing may alternatively keep the current setting of the target deceleration unchanged. The procedure adopted in this embodiment takes into account the possibility that there is a failure of the switch while the driver corrects the deceleration set against the intention of the driver, and cancels the current setting of the target deceleration. After the cancellation of the current setting of the target deceleration, the CPU gives a failure display to inform the driver of the switch failure (step S175). A variety of techniques may be applied for the failure display. The technique adopted in this embodiment gives a sound alarm while flashing the E position indicator (see FIG. 7). These alarms are effected by outputting adequate signals as the alarm signal and the system indicator signal shown in FIG. 8.

The CPU then prohibits the E position braking control (step S180). A concrete procedure for the prohibition in this embodiment sets a prohibition flag, which is used to prohibit braking at the E position. As discussed later, in the actual process of braking control, braking at the E position is prohibited or allowed by the set and reset of the prohibition flag. This arrangement causes the braking control corresponding to the D position to be performed, whether or not the gearshift lever is at the E position. In the case of the switch failure, the CPU carries out the above series of processing and then exits from the deceleration setting process routine.

When it is determined at step S115 that there is no switch failure, on the other hand, the CPU shifts to a subsequent series of processing to change the setting of the target deceleration. The CPU first determines whether or not the Decel switch and the Can-Decel switch are operated simultaneously (step S120). In the case of the simultaneous operations of both the switches, it is unclear which of the operations of the two switches is preferential. The CPU accordingly skips the subsequent process of changing the setting of the target deceleration and keeps the current setting of the target deceleration unchanged.

As shown in FIGS. 4 and 5, the hybrid vehicle of the embodiment allows the driver to set the target deceleration by the operation of the gearshift lever as well as by the operations of the switches mounted on the steering wheel. There is accordingly a possibility that the driver operates the gearshift lever to set on the Decel or Can-Decel switch simultaneously with the operation of the Can-Decel or Decel switch on the steering wheel by accident or by mistake. There is also a possibility that the driver simultaneously operates the Decel switch and the Can-Decel switch mounted on the steering wheel by accident or by mistake. It is highly possible that the driver accidentally presses the Decel switch or the Can-Decel switch without any intention of changing the setting of the deceleration, while operating the steering wheel for the purpose of steering. The technique of the embodiment keeps the current setting of the target deceleration unchanged in the case of the simultaneous operations of both the Decel switch and the Can-Decel switch. This intends to prevent the setting of the target deceleration from being changed by the wrong operation against the intention of the driver.

In the case of a non-simultaneous operation of the Decel switch or the Can-Decel switch, on the other hand, the setting of the target deceleration is changed in response to the corresponding switch operation. When it is determined that the Decel switch is on (step S125), the CPU increases the setting of the target deceleration (step S130). When it is determined that the Can-Decel switch is on (step S135), on the contrary, the CPU decreases the setting of the target deceleration (step S140). In the procedure of this embodiment, the setting of the target deceleration is changed in a stepwise manner according to the number of operations of the corresponding switch. In the case of non operation of either of the switches, the current setting of the target deceleration is naturally not changed.

After setting the target deceleration by the series of processing discussed above (steps S120 through S140), the CPU determines whether or not the current setting of the deceleration is within a rejection range (step S145). The technique of this embodiment varies an upper limit of the deceleration according to the on-off state of the snow mode switch (see FIG. 8). The snow mode switch is pressed by the driver when the vehicle runs on the road surface having a low friction coefficient, such as the snow-covered road. An abrupt braking operation during a drive on the road surface having a low friction coefficient may cause the vehicle to slip or skid. The driver's ON operation of the snow mode switch restricts the upper limit of the deceleration to a certain level that avoids such a slip or a skid of the vehicle.

When the current setting of the deceleration exceeds the upper limit, it is determined that the current setting of the deceleration is within the rejection range. In the case of the determination that the current setting of the deceleration is within the rejection range, the CPU restricts the current setting of the deceleration to the allowable upper limit (step S150). The CPU then informs the driver of the restricted setting of the target deceleration (step S155). The technique adopted in this embodiment flashes the deceleration indicator 224 for about one second, simultaneously with sounding an alarm. These alarms are effected by outputting adequate signals as the alarm signal and the deceleration indicator signal shown in FIG. 8. When it is determined at step S145 that the current setting of the deceleration is not within the rejection range, on the other hand, the CPU skips this series of processing. The CPU displays the deceleration, which has just been set by the above series of processing, on the deceleration indicator 224 (step S160), and exits from the deceleration setting process routine.

Figure 19:
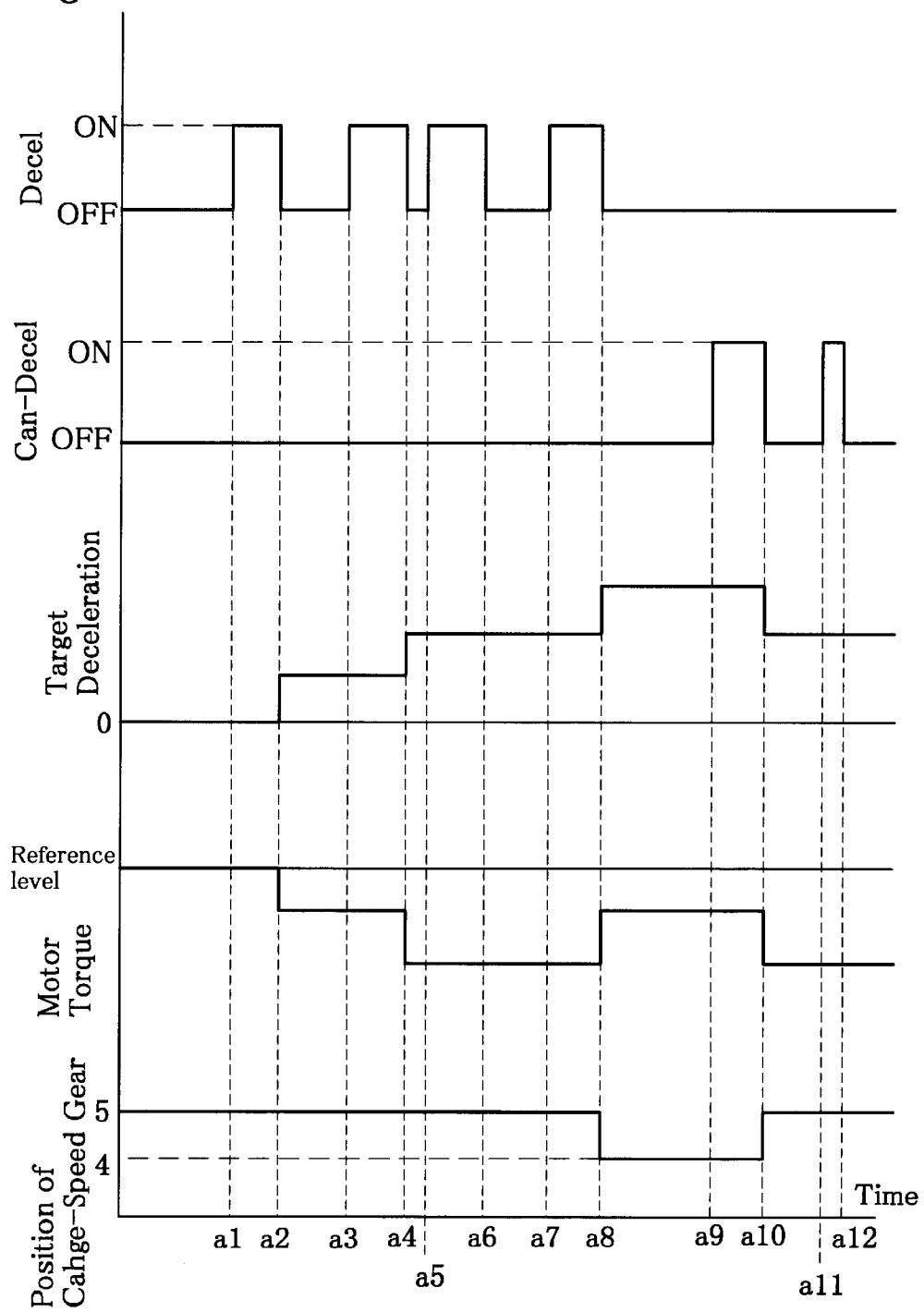
FIG. 19 is a timing chart showing a first example of the setting of the deceleration.

The detailed process of changing the setting of the target deceleration by the above series of processing (steps S120 through S140) is described with referring to concrete examples of FIGS. 19 through 22. FIG. 19 is a timing chart showing a first example of the setting. In the timing chart of FIG. 19, variations in on-off state of the Decel switch and the Can-Decel switch, in setting of the target deceleration, and in torque of the motor 20 and position of the change-speed gear to attain the setting of the target deceleration are plotted against time as abscissa. The vehicle speed is set to a fixed value in the example of FIG. 19.

The Decel switch is set on at a time point a1. Although not being specifically shown in the flowchart of FIG. 18, the technique of this embodiment accepts a change of the setting only when the switch is continuously kept on for a predetermined time period. The CPU inputs the operation of the switch at step S105 in the deceleration setting process routine (FIG. 18), based on the result of the determination of whether or not the switch is continuously kept on for the predetermined time period. Because of the phenomenon called chattering, in general, the ON signal and the OFF signal are detected alternately at very short cycles when the state of the switch is changed over to the ON position or to the OFF position. The arrangement of accepting the change of the setting only after the elapse of the predetermined time period effectively prevents the deceleration from being significantly varied against the intention of the driver due to the chattering.

Accepting the input of the operation of the switch only after the continuous actuation thereof for the predetermined time period advantageously prevents the setting of the target deceleration from being changed when the driver unintentionally touches the switch. The Decel switches and the Can-Decel switches are provided on the steering wheel in this embodiment, so that there is a high possibility that the driver accidentally touches any of the switches. The means of preventing the setting of the target deceleration from being changed by a driver's accidental touch or operation of the switch is thus especially effective in the structure of the embodiment.

The predetermine time period (hereinafter referred to as the ON-decision reference time) is set as the criterion used to determine whether the driver has operated the switch intentionally or unintentionally. Setting an excessively small value to the ON-decision reference time heightens the possibility that the setting of the target deceleration is changed by even a driver's accidental operation of the switch. Setting an excessively large value to the ON-decision reference time, on the other hand, worsens the response of the Decel switch and the Can-Decel switch. An appropriate value should thus be set, for example, experimentally, to the ON-decision reference time by taking into account these conditions. The driver may alternatively set a desired value to the ON-decision reference time.

In the example of FIG. 19, the time period between the time point a1 and a time point a2 exceeds the ON-decision reference time. The target deceleration is accordingly increased by one step at the time point a2. As described previously with FIG. 11, the technique of the embodiment carries out the torque control in combination with the changeover of the position of the change-speed gear, in order to attain an arbitrary deceleration in a wide range. As clearly shown in the map of FIG. 11, the allowable range of the deceleration is varied on the large scale by changing over the position of the change-speed gear and on the fine scale by regulating the motor torque. In this embodiment, the target deceleration is changed in a stepwise manner on a relatively fine scale. The varied step of the target deceleration at the time point a2 in FIG. 19 is in a range that is changeable without the changeover of the position of the change-speed gear but is achieved by the regulation of the motor torque. In this example, the fifth speed ($5^{th}$) is set as the initial position of the change-speed gear.

When the Decel switch is continuously kept on for a time period between time points a3 and a4, which exceeds the ON-decision reference time, the target deceleration is further increased by another step as shown in FIG. 19. This second variation of the target deceleration does not require the changeover of the position of the change-speed gear but is achieved by the regulation of the motor torque. In this embodiment, the respective steps of the variation in target deceleration are set on the fine scale. This arrangement advantageously widens the possible range of selection on the setting of the target deceleration without changing over the position of the change-speed gear. The driver can thus readily set a desired deceleration. The motor torque is varied at the time point a4, while the position of the change-speed gear is kept at the fifth speed ($5^{th}$) as shown in FIG. 19.

In the technique of the embodiment, an operation interval reference time, which relates to the interval between successive operations of the switch, in addition to the ON-decision reference time, is set as another condition of accepting the input of the operation of the switch. In the case of successive operations of the switch, only when there is a time interval of or over the operation interval reference time between a first operation and a second operation, the second operation is accepted as effective. The CPU inputs the operation of the switch at step S105 in the deceleration setting process routine (FIG. 18), based on the determination of whether or not the time interval of or over the operation interval reference time has elapsed since the previous operation.

In the example of FIG. 19, as the third operation, the Decel switch is continuously kept on for a time period between time points a5 and a6. The operation time exceeds the ON-decision reference time. However, the time interval between the second operation and the third operation, that is, the time interval between the time points a4 and a5, is rather short. Here the time interval is shorter than the operation interval reference time. Although the operation time of the switch exceeds the ON-decision reference time, the third operation is not accepted as effective and changes none of the setting of the target deceleration, the motor torque, and the position of the change-speed gear.

The arrangement of using the operation interval reference time effectively prevents the setting of the target deceleration from being varied in an excessively abrupt manner in response to a driver's operation. When the driver carries out some operation to change the deceleration to a new setting, there is generally a certain time delay to the actual speed reduction at the new setting of the deceleration. If the change of the setting of the target deceleration is accepted without using the operation interval reference time, there is a possibility that the setting of the target deceleration is successively changed without checking the actual decelerations attained by the successive settings. This may cause the deceleration to be varied abruptly over the intention of the driver. The arrangement of this embodiment sets the operation interval reference time to prevent such troubles.

The setting of the operation interval reference time may be specified experimentally or by another method to fulfill the above object. Setting an excessively small value to the operation interval reference time does not allow a sufficiently gentle variation of the setting of the target deceleration. Setting an excessively large value to the operation interval reference time, on the other hand, requires an undesirably long time to vary the setting of the target deceleration, thereby lowering the operatability. An appropriate value should thus be set, for example, experimentally, to the operation interval reference time by taking into account these conditions. The driver may alternatively set a desired value to the operation interval reference time.

In the example of FIG. 19, as the fourth operation, the Decel switch is continuously kept on for a time period between time points a7 and a8, which exceeds the ON-decision reference time. The target deceleration is thus increased again by still another step in response to the fourth operation. The target deceleration is accordingly increased by three steps from the reference level prior to any operation of the Decel switch. In this embodiment, the variation in deceleration of this level is not attained only by regulating the motor torque. In response to the fourth operation, the position of the change-speed gear is thus changed from the fifth speed ($5^{th}$) to the fourth speed ($4^{th}$) with the increase in setting of the target deceleration. The changeover of the position of the change-speed gear is implemented according to the map of FIG. 11 as discussed previously. Changing over the position of the change-speed gear to the fourth speed ($4^{th}$) widens the possible range of deceleration. The motor torque is accordingly decreased in response to the fourth operation, in order to attain the level of deceleration that is increased by three steps from the reference level. The motor torque is specified against the setting of the target deceleration and the position of the change-speed gear according to the map of FIG. 11.

Changing over the position of the change-speed gear with an increase in deceleration advantageously attains quick acceleration, as well as the required deceleration. After the braking operation at a high deceleration, quick acceleration is generally required to return the vehicle speed to the previous level prior to the braking control. Changeover of the position of the change-speed gear to a greater gear ratio with an increase in deceleration ensures the quick acceleration at the new position of the change-speed gear after the braking control. The arrangement of changing over the position of the change-speed gear according to the setting of the target deceleration thus improves the response of the vehicle at the time of speed reduction and acceleration.

The following description regards a series of operations to increase the deceleration. A similar series of operations is carried out to decrease the deceleration. In the example of FIG. 19, the Can-Decel switch is continuously kept on as the fifth operation for a time period between time points a9 and a10. This time period exceeds the ON-decision reference time. The target deceleration is lowered by one step to the level set at the time point a4, in response to this operation. The position of the change-speed gear and the motor torque are simultaneously changed to attain this deceleration.

As the sixth operation, the Can-Decel switch is continuously kept on for a time period between time points a11 and a12, which is however, shorter than the ON-decision reference time. The sixth operation is accordingly ineffective and does not change any of the setting of the target deceleration, the motor torque, or the position of the change-speed gear. Although not being specifically illustrated in the example of FIG. 19, when the time interval between two consecutive operations of the Can-Decel switch is shorter than the operation interval reference time, the second operation is determined to be ineffective and does not change the deceleration or any other related factors.

Figure 20:
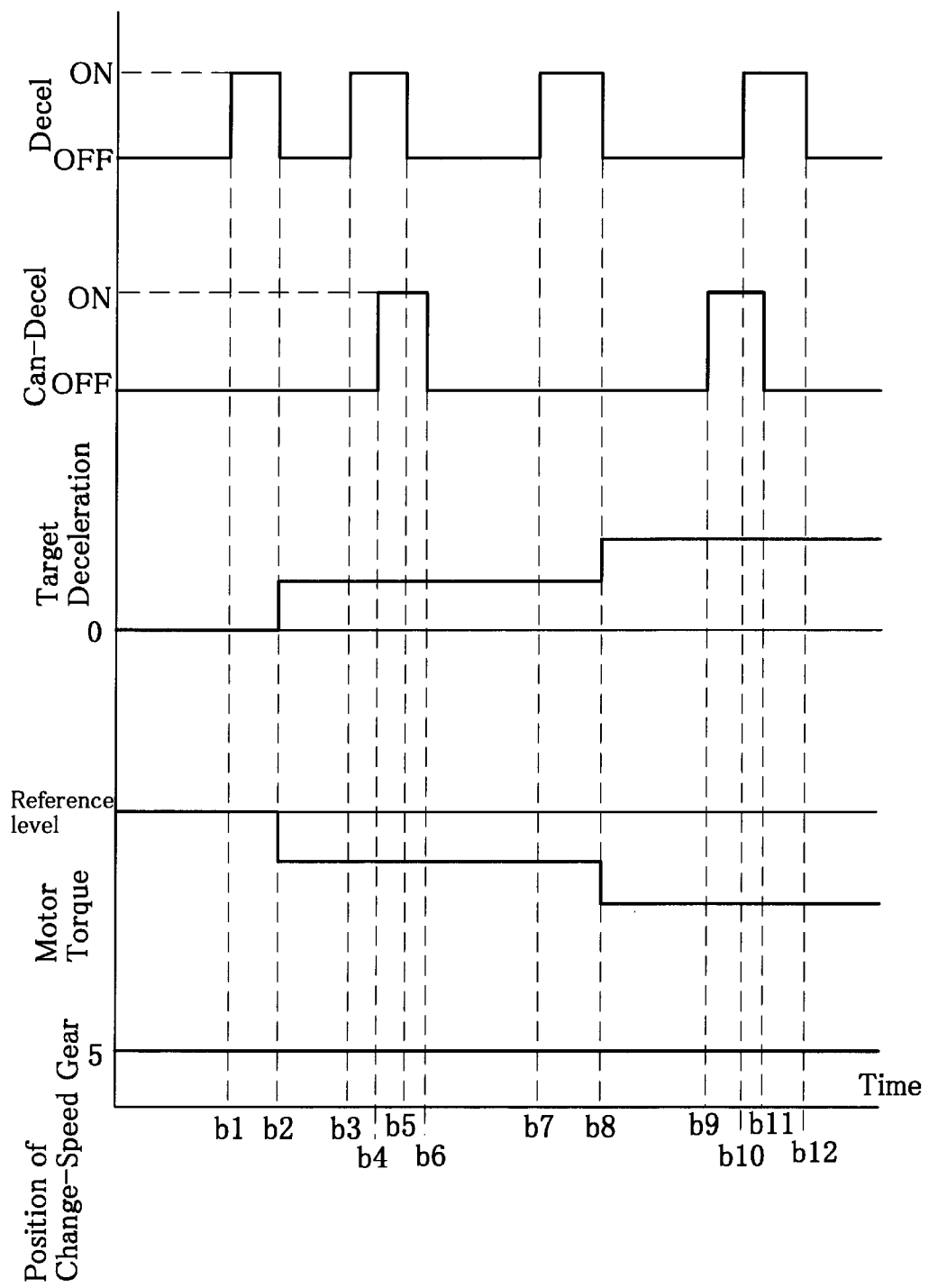
FIG. 20 is a timing chart showing a second example of the setting of the deceleration.

The following describes a second example of setting the target deceleration. FIG. 20 is a timing chart showing the second example of the setting of deceleration. In this example, the Decel switch is continuously kept on for a time period between time points b1 and b2, which exceeds the ON-decision reference time. As described in the first example of the setting, the target deceleration is increased by one step in response to this operation. The motor torque also increases to attain the target deceleration.

The Decel switch is then continuously kept on as the second operation for a time period between time points b3 and b6, which also exceeds the ON-decision reference time. In this case, however, while the Decel switch is operated, the Can-Decel switch is also kept on for a time period between time points b4 and b6. A time period between the time point b3 at which the operation of the Decel switch starts and the time point b4 at which the operation of the Can-Decel switch starts is shorter than the ON-decision reference time. At the time point b4 when the operation of the Can-Decel switch starts, the operation of the Decel switch is thus not accepted as effective.

As described previously in the deceleration setting process routine, the CPU of the control unit 70 does not change the setting of the target deceleration in the case of simultaneous operations of the Decel switch and the Can-Decel switch (see step S120 in FIG. 18). In the example of FIG. 20, although the Decel switch is continuously kept on for the time period between the time points b3 and b5, which exceeds the ON-decision reference time, this operation changes none of the setting of the target deceleration, the motor torque, and the position of the change-speed gear. This is because both the time period when only the Decel switch is operated (the time period between the time points b3 and b4) and the time period when only the Can-Decel switch is operated (the time period between the time points b5 and b6) are shorter than the ON-decision reference time. If the time period between the time points b3 and b4 exceeds the ON-decision reference time, the setting of the target deceleration is increased by one step in response to the operation of the Decel switch. If the time period between the time points b5 and b6 exceeds the ON-decision reference time, on the other hand, the setting of the target deceleration is decreased by one step in response to the operation of the Can-Decel switch.

After elapse of a time interval of or over the operation interval reference time, the Decel switch is continuously kept on as the third operation for a time period between time points b7 and b8, which exceeds the ON-decision reference time. The third operation is accepted as effective, and increases the setting of the target deceleration by another step while simultaneously raising the motor torque.

The second operation discussed above regards the case in which the operation of the Can-Decel switch starts while the Decel switch is continuously kept on. The setting of the target deceleration is also not varied when the operation of the Can-Decel switch starts first in the course of simultaneous operations of the Decel switch and the Can-Decel switch. In the example of FIG. 20, the Can-Decel switch is continuously kept on as the fourth operation for a time period between time points b9 and b11. During the operation of the Can-Decel switch, the Decel switch is also kept on for a time period between time points b10 and b12. Namely both the switches are simultaneously in ON position for a time period between the time points b10 and b11. As described previously in the case of the second operation, the fourth operation changes none of the setting of the target deceleration, the motor torque, and the position of the change-speed gear.

In the case of the simultaneous operations of the Decel switch and the Can-Decel switch, it is highly possible that the driver mistakenly operates these switches. As shown in the concrete example of FIG. 20, when the Decel switch and the Can-Decel switch are operated simultaneously, the setting of the target deceleration is kept unchanged. This arrangement effectively prevents the setting of the target deceleration from being changed mistakenly or accidentally against the intention of the driver. This arrangement also prevents the setting of the target deceleration from being changed frequently at the respective pressing timings of the Decel switch and the Can-Decel switch.

Figure 21:
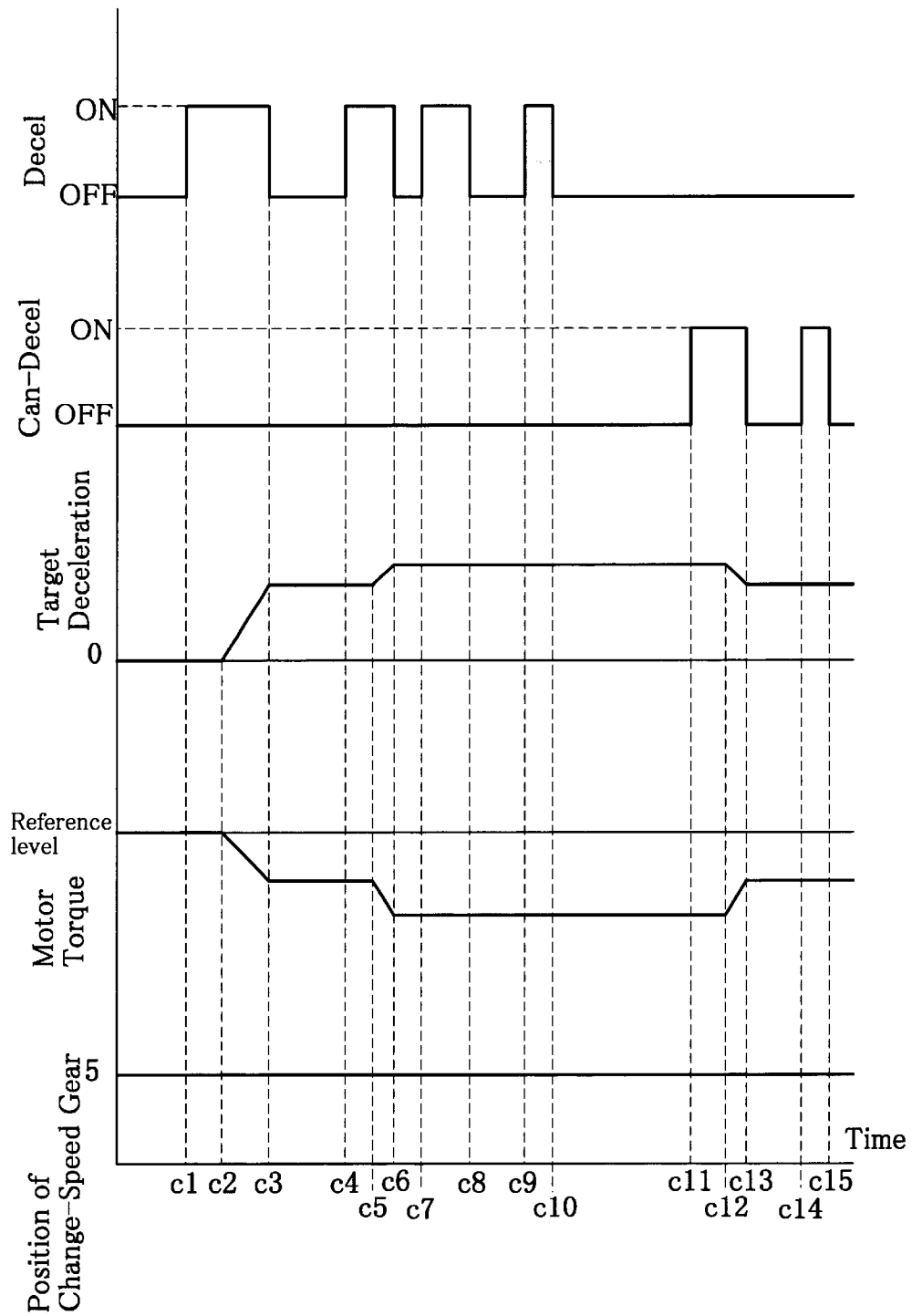
FIG. 21 is a timing chart showing a third example of the setting of the deceleration.

In the first and the second examples of the setting (FIGS. 19 and 20), the setting of the target deceleration is varied in a stepwise manner according to the number of operations of the Decel switch and the Can-Decel switch. Such arrangement attains the plain setting of the target deceleration. The stepwise change enables the target deceleration to be varied in a wide range by operations of a relatively short time, thereby achieving the excellent operatability. The setting of the target deceleration may alternatively be varied in a continuous manner according to the operation time of the switch. The timing chart of FIG. 21 shows a third example of setting the target deceleration, which is varied according to the operation time.

In this example, the Decel switch is continuously kept on as the first operation for a time period between time points c1 and c3. Like the first and the second examples of the setting, the switch operation is accepted as effective when the time period of the switch operation exceeds the ON-decision reference time. In the example of FIG. 21, a time period between the time points c1 and c2 corresponds to the ON-decision reference time. In the first operation, the target deceleration is raised in proportion to the operation time of the Decel switch between the time points c2 and b3. The motor torque simultaneously varies to attain the target deceleration.

When the Decel switch is continuously kept on as the second operation for a time period between time points c4 and c6, the target deceleration is raised in proportion to the operation time of the Decel switch after the time period c5 when the ON-decision reference time has elapsed since the start of the switch operation. The motor torque varies simultaneously with the increase in target deceleration. In the third example of the setting, the target deceleration set by the first and the second operations can be attained only by varying the motor torque, so that the position of the change-speed gear is not changed. In the case where the setting of the target deceleration is not attained only by varying the motor torque, the position of the change-speed gear is changed over according to the map of FIG. 11.

The Decel switch is again continuously kept on as the third operation for a time period between time points c7 and c8. In this case, however, the time interval between the time point c6 when the second operation is terminated and the time point c7 when the third operation starts is shorter than the operation interval reference time. As described previously in the first and second examples of the setting, the third operation is not accepted as effective and does not vary the target deceleration.

As the fourth operation, the Decel switch is continuously kept on for a time period between time points c9 and c10, which is shorter than the ON-decision reference time. The fourth operation is accordingly not accepted as effective and does not vary the target deceleration.

In the third example of the setting, as in the case of raising the target deceleration, the target deceleration is lowered according to the operation time of the Can-Decel switch. When the Can-Decel switch is continuously kept on as the fifth operation for a time period between time points c11 and c13, the setting of the target deceleration is reduced in proportion to the operation time of the Can-Decel switch after the time period c12 when the ON-decision reference time has elapsed.

As the sixth operation, the Can-Decel switch is continuously kept on for a time period between time points c14 and c15, which is shorter than the ON-decision reference time. The sixth operation is accordingly not accepted as effective and does not vary the target deceleration.

The arrangement of varying the target deceleration in a continuous manner according to the operation time of the switch as described in the third example of the setting enables the driver to obtain the desired deceleration without operating the switch many times. Another advantage of such continuous variation of the target deceleration is to ensure the minute adjustment of the target deceleration according to the intention of the driver. Although the target deceleration is varied in proportion to the operation time of the switch in the third example of the setting, the target deceleration may be varied non-linearly against the operation time of the switch. One exemplified process of such modification varies the target deceleration by a gentle slope at the beginning of the operation of the switch and by a more abrupt slope with elapse of the operation time.

Figure 22:
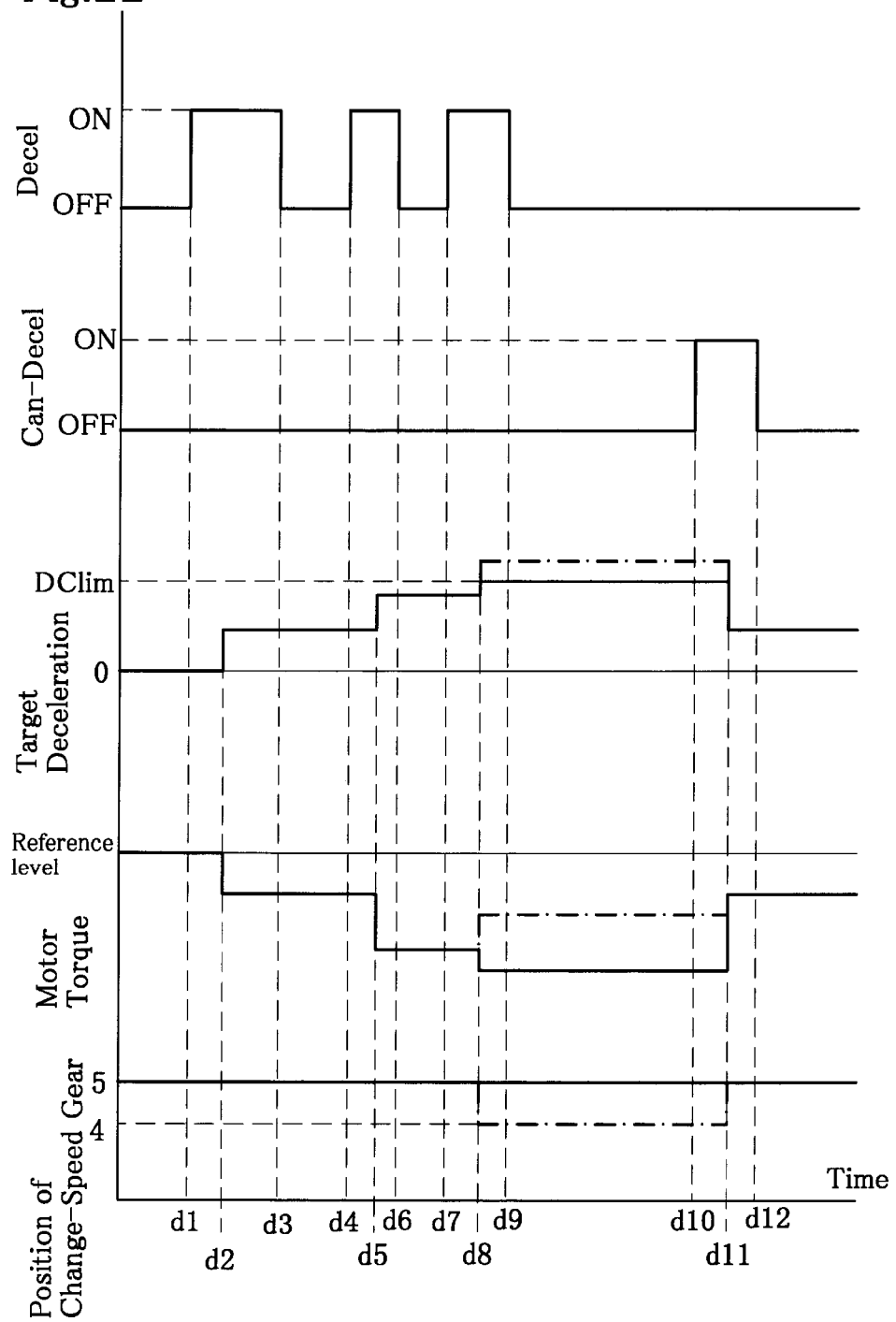
FIG. 22 is a timing chart showing a fourth example of the setting of the deceleration.

The timing chart of FIG. 22 shows a fourth example of the setting, where the setting of the target deceleration enters the rejection range. In the fourth example of the setting, the Decel switch is continuously kept on as the first operation for a time period between time points d1 and d3. The operation of the Decel switch is accepted as effective at a time point d2 when the ON-decision reference time has elapsed since the start of the switch operation. The first operation accordingly increases the setting of the target deceleration by one step while raising the motor torque.

When the Decel switch is continuously kept on again as the second operation for a time period between time points d4 and d6, the operation of the Decel switch is accepted as effective at a time point d5 when the ON-decision reference time has elapsed. The second operation further increases the setting of the target deceleration by another step while raising the motor torque.

The Decel switch is continuously kept on again as the third operation for a time period between time points d7 and d9. The operation of the Decel switch is accepted as effective at a time point d8 when the ON-decision reference time has elapsed. The third operation also raises the setting of the target deceleration. In the case where the upper limit of the target deceleration is not restricted, the target deceleration is increased by one step as shown by the one-dot chain line in FIG. 22. In this case, like the first example of the setting (FIG. 19), the operation requires not only a variation in motor torque but changeover of the position of the change-speed gear as shown by the one-dot chain lines.

In the fourth example of the setting, however, the upper limit of the target deceleration is restricted to a value DClim. Varying the setting of the target deceleration to the value defined by the one-dot chain line in response to the third operation makes the target deceleration exceed the upper limit DClim. In this case, the setting of the target deceleration enters the rejection range. As described previously (see step S150 in FIG. 18), the target deceleration is restricted to the upper limit DClim, that is, a value defined by the solid line in FIG. 22. Such restriction leads to the settings of the motor torque and the position of the change-speed gear respectively defined by the solid lines. In the example of FIG. 22, the motor torque is raised to a higher level than the value prior to the restriction, while the position of the change-speed gear is kept unchanged at the fifth speed ($5^{th}$). These settings follows the map of FIG. 11, in order to attain the deceleration DClim. The differences in position of the change-speed gear and in motor torque before and after the restriction are, however, not limited to such settings.

As described above with some concrete examples, in the hybrid vehicle of this embodiment, the driver operates the Decel switch and the Can-Decel switch to set a desired deceleration. The arrangement of the embodiment effectively prevents the setting of the target deceleration from being changed accidentally or extremely frequently against the intention of the driver.

Figure 16:
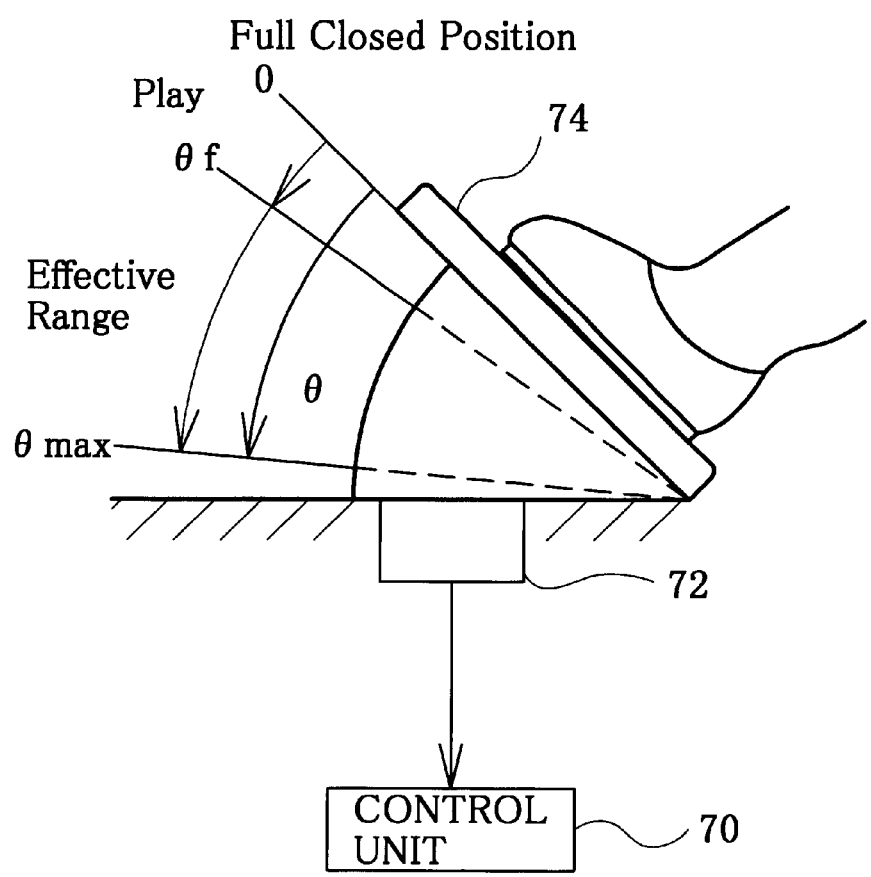
FIG. 16 shows the position of an accelerator pedal.

After the conclusion of the deceleration setting process routine, the program returns to the speed reduction control routine (FIG. 15). The CPU determines whether or not the accelerator position or travel is in an effective range as the criterion of carrying out the power source braking control (step S200). The decision is based on the input signal of the accelerator position. FIG. 16 shows the effective range of the accelerator position. The driver steps on the accelerator pedal 74 to change the pedal position. In the configuration of this embodiment, the accelerator pedal position sensor 72 detects the step-on amount of the accelerator pedal 74 as a step-on angle θ from a full closed position. The full closed position represents a specific state in which the accelerator pedal 74 is completely free from any operation.

The accelerator pedal 74 is a mechanism of requiring a variation in power output from the engine 10 and the motor 20. When the driver steps on the accelerator pedal 74 to a significant depth, the power output from the power source increases. The accelerator pedal 74 has a certain play. In a range of the step-on angle from the full closed position to an angle θf, the step-on operation of the accelerator pedal 74 does not contribute to a variation in required power. In a range exceeding the play, that is, in a range of the step-on angle θ that is greater than the value Of but is not greater than a maximum possible angle θmax, the required power varies according to the step-on angle θ. In the specification hereof, the range of the step-on amount that contributes to the variation in required power is referred to as the effective range of the accelerator position.

In the structure of this embodiment, the accelerator pedal position sensor 72 detects the step-on amount of the accelerator pedal 74 including the range of the play. The procedure of step S200 accordingly determines whether or not the accelerator position is in the effective range, based on the comparison between the observed value of the accelerator pedal position sensor 72 and the value θf.

When the step-on amount of the accelerator pedal 74 is in the effective range, the power source braking control is not required. The CPU thus immediately exits from the speed reduction control routine without any further processing.

When the step-on amount of the accelerator pedal 74 is not in the effective range, that is, when the step-on amount of the accelerator pedal 74 is in the range of the play, on the other hand, the CPU subsequently determines whether or not the E position braking control is allowed (step S205). As described previously in the deceleration setting process routine (FIG. 18), in the case of the switch failure, the prohibition flag is set to prohibit the E position braking control (see step S180 in FIG. 18). When the prohibition flag is set, the CPU determines that the E position braking control is not allowed. The E position braking control is also not allowed when the gearshift lever is not in the E position.

When it is determined at step S205 that the E position braking control is not allowed, the CPU carries out the standard braking control and sets a predetermined negative value Tm0 to a target torque Tm of the motor 20 (step S210). The predetermined value Tm0 may arbitrarily be set within the range of the rated torque of the motor 20. In this embodiment, the predetermined value Tm0 is set to a level that ensures a just sufficient deceleration at the D position by the power source braking.

When it is determined at step S205 that the E position braking control is allowed, on the other hand, the CPU carries out the E position braking control. The concrete procedure of the E position braking control first selects the position of the change-speed gear (step S215) according to the procedure of FIG. 23.

Figure 23:
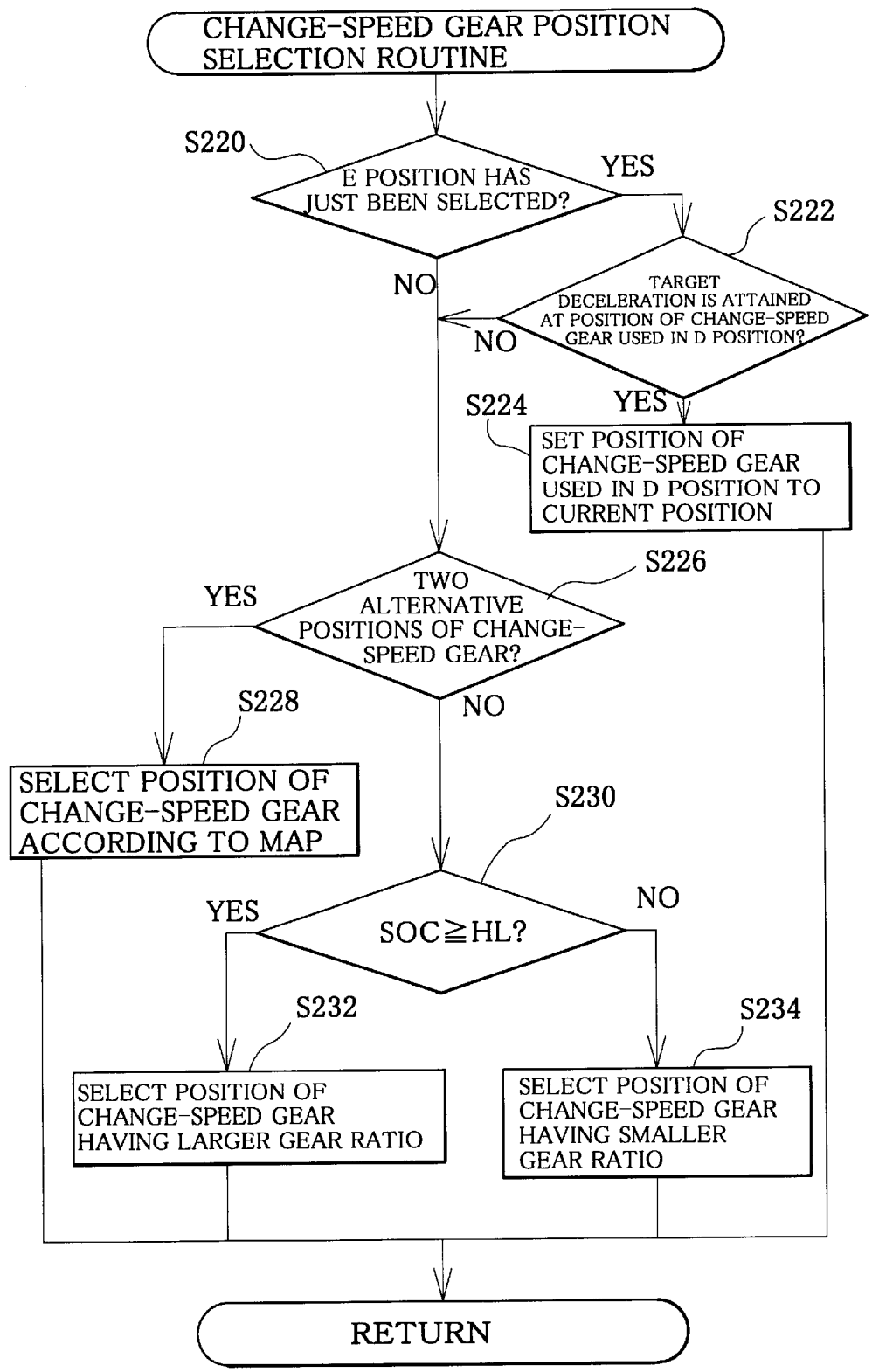
FIG. 23 is a flowchart showing a change-speed gear position selection routine.

FIG. 23 is a flowchart showing a routine of the change-speed gear position selection process. In the change-speed gear position selection routine, the CPU first determines whether or not the E position has just been selected (step S220). Like step S20 in the initial setting process routine (FIG. 17), the procedure determines whether or not the gearshift position has just been changed over from the D position to the E position. The term 'just' implies in a time interval between the changeover of the gearshift position to the E position and the change of the setting of the target deceleration.

When it is determined that the E position has just been selected, the CPU subsequently determines whether or not the setting of the target deceleration is attained at the position of the change-speed gear used in the D position (step S222). As described previously in the initial setting process routine (FIG. 17), when the gearshift position has just been changed over from the D position to the E position, the position of the change-speed gear used in the D position is set to the initial position of the change-speed gear. The CPU thus determines whether or not the setting of the target deceleration is attained at the initial position of the change-speed gear at step S222. In the case of an affirmative answer at step S222, the CPU sets the initial position of the change-speed gear, that is, the position of the change-speed gear used in the D position, to the current position of the change-speed gear (step S224). The setting of the target deceleration represents the required minimum deceleration as described previously. If the maximum deceleration attained at the position of the change-speed gear used in the D position is not lower than the setting of the target deceleration, the CPU determines at step S222 that the setting of the target deceleration is attained at the position of the change-speed gear used in the D position.

When it is determined at step S220 that the E position has not just been selected or when it is determined at step S224 that the setting of the target deceleration is not attained at the position of the change-speed gear used in the D position, the position of the change-speed gear is set according to the map of FIG. 11. In this case, the CPU refers to the map and determines whether or not there are a plurality of different positions of the change-speed gear mapped to the setting of the target deceleration (step S226). In the case where there is only one position of the change-speed gear mapped to the setting of the target deceleration, the position of the change-speed gear read from the map is set to the current position of the change-speed gear (step S228).

In the case where there are two different positions of the change-speed gear mapped to the setting of the target deceleration, on the other hand, the CPU compares the state of charge SOC of the battery 50 with a predetermined value H (step S230). As described previously with the map of FIG. 13, there are two different decelerations attained at each position of the change-speed gear, that is, the deceleration by the regenerative operation of the motor 20 and the deceleration by the power operation of the motor 20. When there are two different positions of the change-speed gear mapped to the setting of the target deceleration, the setting of the target deceleration is attained by the regenerative operation of the motor 20 at one position of the change-speed gear, while being attained by the power operation of the motor 20 at the other position of the change-speed gear. In the case where there are two different positions of the change-speed gear mapped to the setting of the target deceleration, the appropriate position of the change-speed gear is selected according to the state of charge SOC of the battery 50.

When the state of charge SOC of the battery 50 is not less than the predetermined value H, it is desirable to consume the electric power accumulated in the battery 50, in order to prevent the battery 50 from being excessively charged. The CPU accordingly selects the position of the change-speed gear that attains the setting of the target deceleration by the power operation of the motor 20, that is, the position of the change-speed gear having a greater gear ratio out of the two alternatives (step S232). When the state of charge SOC of the battery 50 is less than the predetermined value H, on the other hand, it is desirable to charge the battery 50. The CPU accordingly selects the position of the change-speed gear that attains the setting of the target deceleration by the regenerative operation of the motor 20, that is, the position of the change-speed gear having a smaller gear ratio out of the two alternatives (step S234). In order to prevent the position of the change-speed gear from being frequently switched over between the two alternatives according to the state of charge SOC, it is desirable to set a certain hysteresis for the determination of step S230.

When the appropriate position of the change-speed gear is selected by the above series of processing, the program returns to the speed reduction control routine. The CPU then actually changes over the position of the change-speed gear (step S240). The actual changeover of the position of the change-speed gear is implemented by outputting an appropriate signal as the transmission control signal (see FIG. 8) and controlling the on-off state of the clutches and the brakes included in the transmission 100 according to the table of FIG. 3 corresponding to the selected position of the change-speed gear.

After the position of the change-speed gear has actually been changed, the CPU calculates the target torque Tm to be output from the motor 20 (step S245). The total torque to be output from the engine 10 and the motor 20 functioning as the power source is calculated from the setting of the target deceleration, that is, the torque to be output to the axle 17, at the selected position of the change-speed gear according to Equations (2) through (6) with the gear ratios k1 through k5. The braking force output from the engine 10, that is, the power of engine brake, is substantially unequivocally determined according to the revolving speed of the crankshaft 12. The torque to be output from the motor 20 is thus obtained by subtracting the torque by the engine brake from the total torque to be output from the power source.

In this embodiment, the target torque of the motor 20 is calculated in the above manner. A map for specifying the target torque of the motor 20 may alternatively be provided together with the map of FIG. 11. Another possible procedure measures the deceleration of the vehicle with an acceleration sensor and feedback controls the torque of the motor 20, in order to attain the setting of the target deceleration. Although the calculation of the motor torque is performed after the actual changeover of the position of the change-speed gear in the flowchart of FIG. 15, this is just for convenience of illustration. The calculation may thus be performed in parallel to the actual changeover of the position of the change-speed gear.

The above series of processing causes the target torque of the motor 20 to be set under the standard braking control or under the E position braking control. The CPU then carries out a braking control process (step S250).

Figure 24:
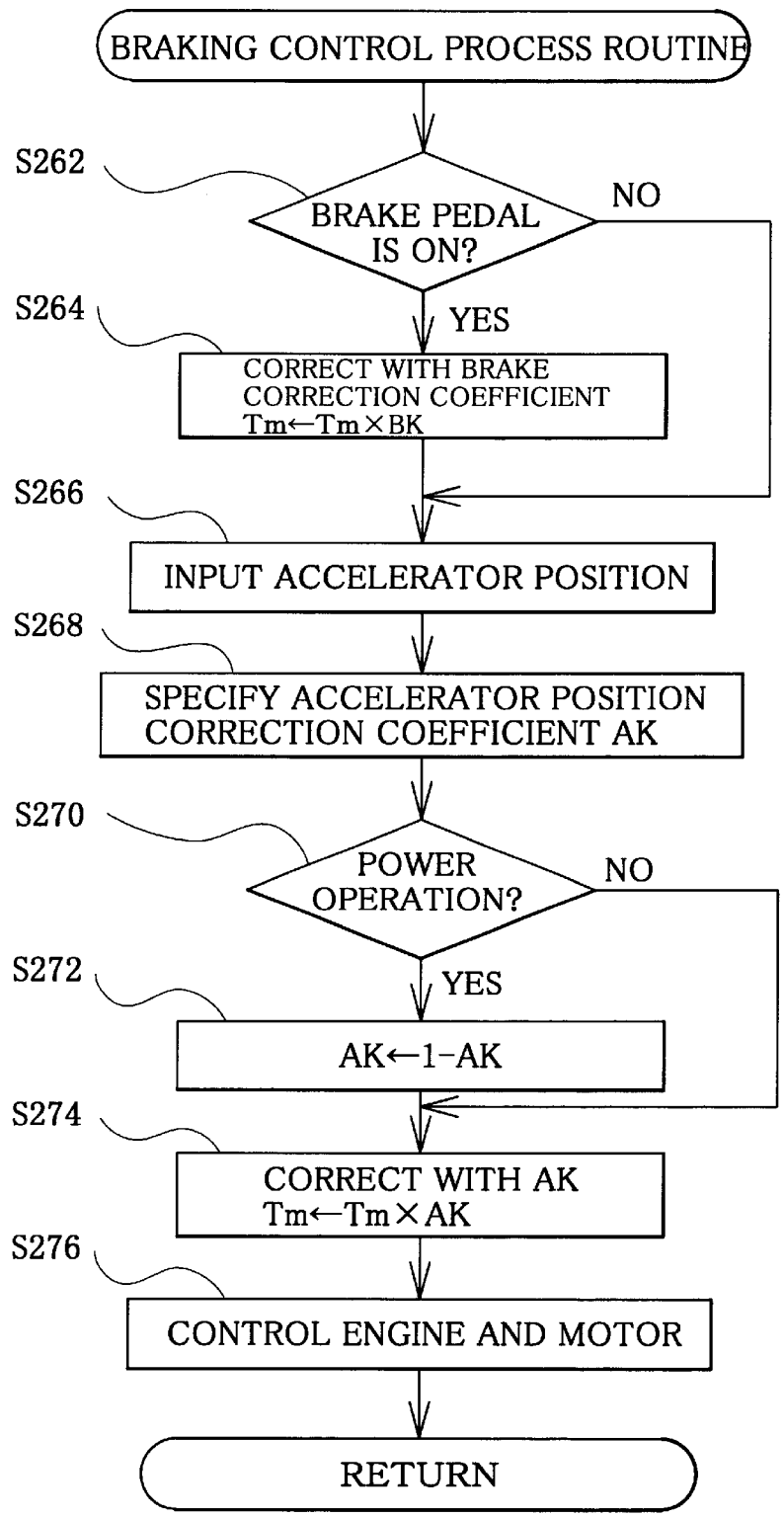
FIG. 24 is a flowchart showing a braking control process routine.

FIG. 24 is a flowchart showing a routine of the braking control process. When the program enters the braking control process routine, the CPU first determines whether or not the brake pedal is in the ON state, that is, whether or not the brake pedal is stepped on (step S262). The decision is based on the input of the brake pedal signal shown in FIG. 8. When the brake pedal is in the ON state, the CPU multiplies the target torque Tm of the motor 20 by a coefficient BK to correct the target torque Tm (step S264). When the brake pedal is in OFF state, on the other hand, the program skips this process.

The coefficient BK is set equal to 1.1 under the condition of the regenerative operation of the motor 20 and equal to 0.9 under the condition of the power operation of the motor 20. In the ON state of the brake pedal, the driver requires a greater deceleration. In such cases, the multiplication of the target torque of the motor 20 by the coefficient BK raises the deceleration of the vehicle. As clearly understood from the principle discussed above with FIG. 3, multiplication by a value greater than 1 raises the deceleration under the condition of the regenerative operation of the motor 20. Multiplication by a value smaller than 0, on the other hand, raises the deceleration under the condition of the power operation of the motor 20. An adequate value may be set, for example, experimentally to the coefficient BK according to the deceleration to be attained in the ON state of the brake pedal.

Figure 25:
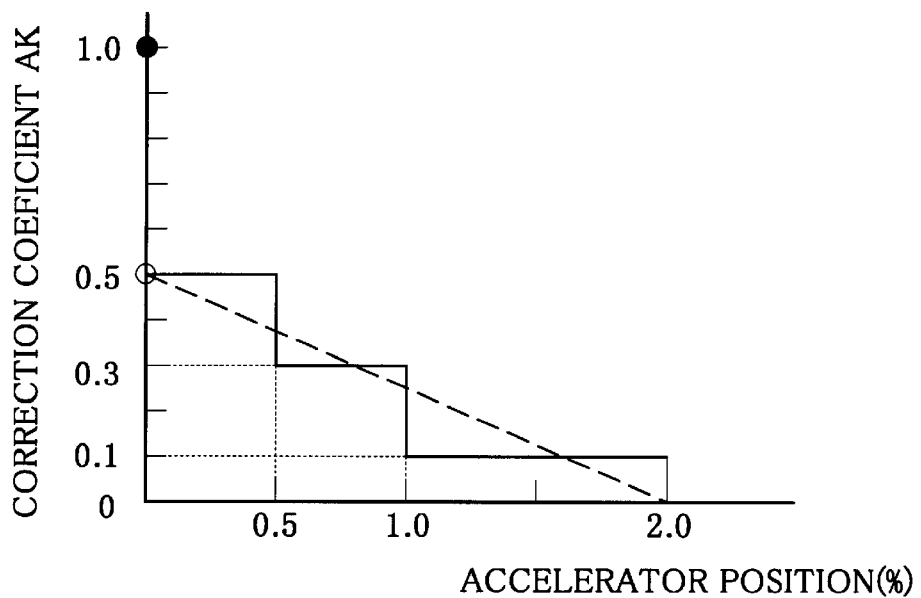
FIG. 25 shows settings of an accelerator position correction coefficient.

The CPU subsequently inputs the accelerator position or travel (step S266) and sets an accelerator position correction coefficient AK based on the input accelerator position (step S268). The accelerator position correction coefficient AK is used to adjust the deceleration attained by the corrected target torque Tm of the motor 20. The correction coefficient AK is specified, based on a preset table. FIG. 25 shows an example of this table. In the configuration of the embodiment, the table is stored in the ROM of the control unit 70.

In this embodiment, the correction coefficient AK is set according to the accelerator position as follows:

accelerator position=0→AK=1.0;

0%<accelerator position≦0.5%→AK=0.5;

0.5%<accelerator position≦1.0%→AK=0.3;

1.0%<accelerator position≦2.0%→AK=0.1.

The accelerator position (%) is expressed as:

actual step-on angle θ of the accelerator pedal 74/maximum possible step-on amount θmax (see FIG. 16).

The procedure of this embodiment sets the correction coefficient AK to increase with a decrease in accelerator position. The discrete large correction coefficient is set under the condition of the accelerator position=0%, that is, in the full closed position of the accelerator pedal. The correction coefficient AK is not set in a range of the accelerator position greater than 2%. This is because the limit angle θf in the range of the play corresponds to the accelerator position 2% in this embodiment. The correction coefficient AK is not restricted to the settings shown in FIG. 25. One possible modification may set a greater number of different values at a greater number of different stages. Another possible modification may set a continuous change of the correction coefficient AK as shown by the broken line in FIG. 25.

After setting the accelerator position correction coefficient AK, the CPU determines whether or not the target torque Tm of the motor 20 corresponds to the power operation (step S270). When the target torque Tm of the motor 20 corresponds not to the power operation but to the regenerative operation, the program skips the processing of next step S272 and multiplies the target torque Tm of the motor 20 by the correction coefficient AK to correct the target torque Tm (step S274). Such correction makes the braking torque of the motor 20 decrease in a stepwise manner with an increase in accelerator position.

When the target torque Tm of the motor 20 corresponds to the power operation, on the other hand, the CPU sets '1-AK' to the accelerator position correction coefficient AK (step S272) and multiplies the target torque Tm of the motor 20 by the new correction coefficient AK to correct the target torque Tm (step S274). Under the condition of the power operation of the motor 20, correction of the target torque of the motor 20 after the setting of '1-AK' makes the braking torque of the motor 20 decrease in a stepwise manner with an increase in accelerator position. The setting of the accelerator position correction coefficient AK is not restricted to the above equation (step S272), but any setting may be adopted to ensure an increase in correction coefficient AK with an increase in accelerator position. A table for specifying the correction coefficient AK under the condition of power operation may be provided separately, according to such tendency.

After the correction of the target torque of the motor 20 according to the on-off state of the brake pedal and the accelerator position, the CPU regulates the operations of the motor 20 and the engine 10 for braking control (step S276). In the course of regulating the engine 10, the CPU stops injection of the fuel to the engine 10 and ignition of the fuel, so as to effect the engine brake. The CPU may simultaneously regulate the VVT mechanism mounted on the engine 10. In this embodiment, however, since the deceleration by the power source braking is controllable with the torque of the motor 20, the CPU does not regulate the VVT mechanism.

The motor 20 is driven by the PWM control. The CPU sets a voltage to be applied to the coils of the stator 24. The voltage is specified corresponding to the revolving speed and the target torque of the motor 20, based on a preset table. The setting of the voltage takes a negative value under the condition of the regenerative operation of the motor 20, while taking a positive value under the condition of the power operation of the motor 20. The CPU regulates the on-off state of each transistor included in the driving circuit 40 to ensure application of the specified voltage to the coils. The PWM control is a known technique and is thus not specifically discussed here.

The hybrid vehicle of the embodiment iteratively carries out the speed reduction control routine discussed above, so as to effect the braking control by the power source braking. The hybrid vehicle may also carry out the braking control by the wheel braking in combination with the braking control by the power source braking.

The hybrid vehicle of the embodiment discussed above changes over the position of the change-speed gear in the transmission 100 according to the map shown in FIG. 11 and regulates the torque of the motor 20, thereby attaining the braking control at a desired deceleration in a wide range corresponding to a driver's requirement. This arrangement ensures braking and acceleration of the vehicle with the minimum frequency of the change of the foot position between the accelerator pedal and the brake pedal, thus significantly improving the operatability of the vehicle. Applicability of the power-source braking in a wide range enables the kinetic energy of the vehicle to be recovered efficiently, thus improving the energy efficiency of the vehicle.

The hybrid vehicle of the embodiment varies the target torque of the motor 20 according to the accelerator position and thereby regulates the deceleration to be effected, as discussed previously with FIGS. 24 and 25. This arrangement enables the driver to readily carry out minute adjustment of the deceleration by the power source braking. In many cases, the required deceleration is frequently changed according to the driving state of the vehicle. In the hybrid vehicle of the embodiment, the deceleration by the power source braking may readily be regulated according to the operation of the accelerator pedal 74. The deceleration can thus be regulated quickly according to a variation in required braking force. The hybrid vehicle of the embodiment significantly enhances the effects of the power source braking.

Figure 26:
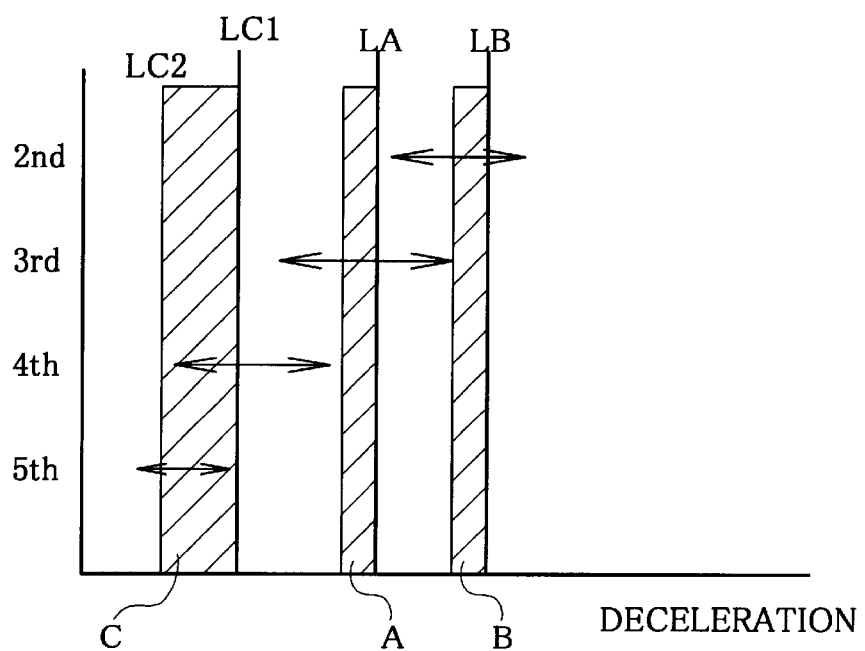
FIG. 26 shows the relationship between the changeable range of the deceleration according to the accelerator position and the change-speed gear position.

FIG. 26 shows regulation of the deceleration by the change of the accelerator position. The deceleration to be effected is plotted as abscissa, and the position of the change-speed gear in the transmission 100 is plotted as ordinate. An area A in the graph is discussed first. The deceleration set by the driver according to the initial setting process routine (see FIG. 17) is specified by a straight line LA on the right end of the area A. This corresponds to a reference deceleration having the accelerator position correction coefficient AK equal to 1. The braking torque by the motor 20 is varied according to the accelerator position, so that the deceleration is effected in a specific range corresponding to the hatched area A in FIG. 26. The driver changes the step-on amount of the accelerator pedal 74 in the course of the braking control, thus implementing minute adjustment of the deceleration in the range of the area A.

When a greater deceleration or a smaller deceleration than the deceleration in the area A is required, the driver operates the Decel switch or the Can-Decel switch to change the reference deceleration. For example, in the case of requirement of a greater deceleration, the operation of the Decel switch shifts the reference deceleration from the straight line LA in the area A to a straight line LB in another area B. Changing the step-on amount of the accelerator pedal 74 under such conditions varies the deceleration in the range of the area B. The deceleration is roughly set by the operations of the Decel switch and the Can-Decel switch, and is minutely adjusted according to the accelerator position. This arrangement enables the driver to readily set a desired deceleration. The hybrid vehicle of the embodiment thus enhances the effects of the power source braking and significantly improves the operatability of the vehicle.

In the hybrid vehicle of the embodiment, the reference deceleration is set not to require the changeover of the position of the change-speed gear, even when the deceleration is varied according to the accelerator position. In the map of FIG. 26, all the decelerations in the area A are attainable at the third speed ($3^{rd}$), whereas all the decelerations in the area B are attainable at the second speed ($2^{nd}$). It is assumed that the reference deceleration set by the operations of the Decel switch and the Can-Decel switch is specified by a straight line LC1, when the allowable setting range of the deceleration according to the accelerator position is relatively wide as in an area C in the map of FIG. 26. The deceleration corresponding to the straight line LC1 is attained at the fourth speed ($4^{th}$), whereas the minimum deceleration corresponding to a straight line LC2 is attained at the fifth speed ($5^{th}$). Changeover of the position of the change-speed gear is required for adjustment of the target deceleration in the area C according to the accelerator position. The changeover may cause the occurrence of a shock during the braking control and damage the ride of the vehicle. The arrangement of the embodiment sets the reference deceleration not to require the changeover of the position of the change-speed gear in the course of the braking control by taking into account the variable range of the deceleration according to the accelerator position. The hybrid vehicle of the embodiment thus attains the braking control without damaging the ride.

In the hybrid vehicle of the embodiment, the correction coefficient AK is set to attain a discrete large deceleration in the full closed position of the accelerator pedal as shown in FIG. 25. The driver generally sets the operating amount of the accelerator pedal equal to zero, that is, sets the accelerator pedal in OFF position, when requiring relatively abrupt braking. The braking control at a large deceleration in the full closed position of the accelerator pedal ensures the deceleration suitable for the driver's feeling.

The setting of FIG. 25 may be modified to continuously vary the correction coefficient from the value '1.0' in the full closed position of the accelerator pedal with a variation in accelerator position. In this case, however, the rate of change of the correction coefficient is relatively steep and makes minute adjustment of the deceleration rather difficult. The setting of the correction coefficient in this embodiment ensures the sufficient level of the deceleration in the full closed position of the accelerator pedal, while allowing minute adjustment of the deceleration in other accelerator positions.

The technique adopted in this embodiment specifies the target torque Tm of the motor 20 based on the reference deceleration and then corrects the target torque Tm according to the accelerator position. Another applicable procedure sets the target deceleration based on both the reference deceleration and the accelerator position and then calculates the target torque Tm of the motor 20.

The embodiment regards the hybrid vehicle in which the driver may adjust the deceleration through the operations of the Decel and Can-Decel switches. The principle of the present invention is also applicable to the hybrid vehicle without such a manipulation unit for adjustment. The hybrid vehicle of the embodiment regulates the position of the change-speed gear in the transmission 100 in combination with the torque of the motor 20, thus attaining the power source braking in a wide range. The technique of the present invention may, however, also be applicable to a hybrid vehicle without the transmission 100.

The above embodiment regards the parallel hybrid vehicle in which the engine 10 is directly linked with the motor 20 and is connected with the axle 17 via the transmission 100. The principle of the present invention is, however, applicable to any parallel hybrid vehicles of various configurations, in which the output from the engine is directly transmittable to the axle.

(4) Second Embodiment

The first embodiment describes the parallel hybrid vehicle in which the engine 10 is directly linked with the motor 20 and is connected with the axle 17 via the transmission 100. The principle of the present invention is also applicable to series hybrid vehicles of various configurations, in which the output of the engine is not directly transmitted to the drive shaft but is used only for power generation. An example of such application is discussed below as a second embodiment.

Figure 27:
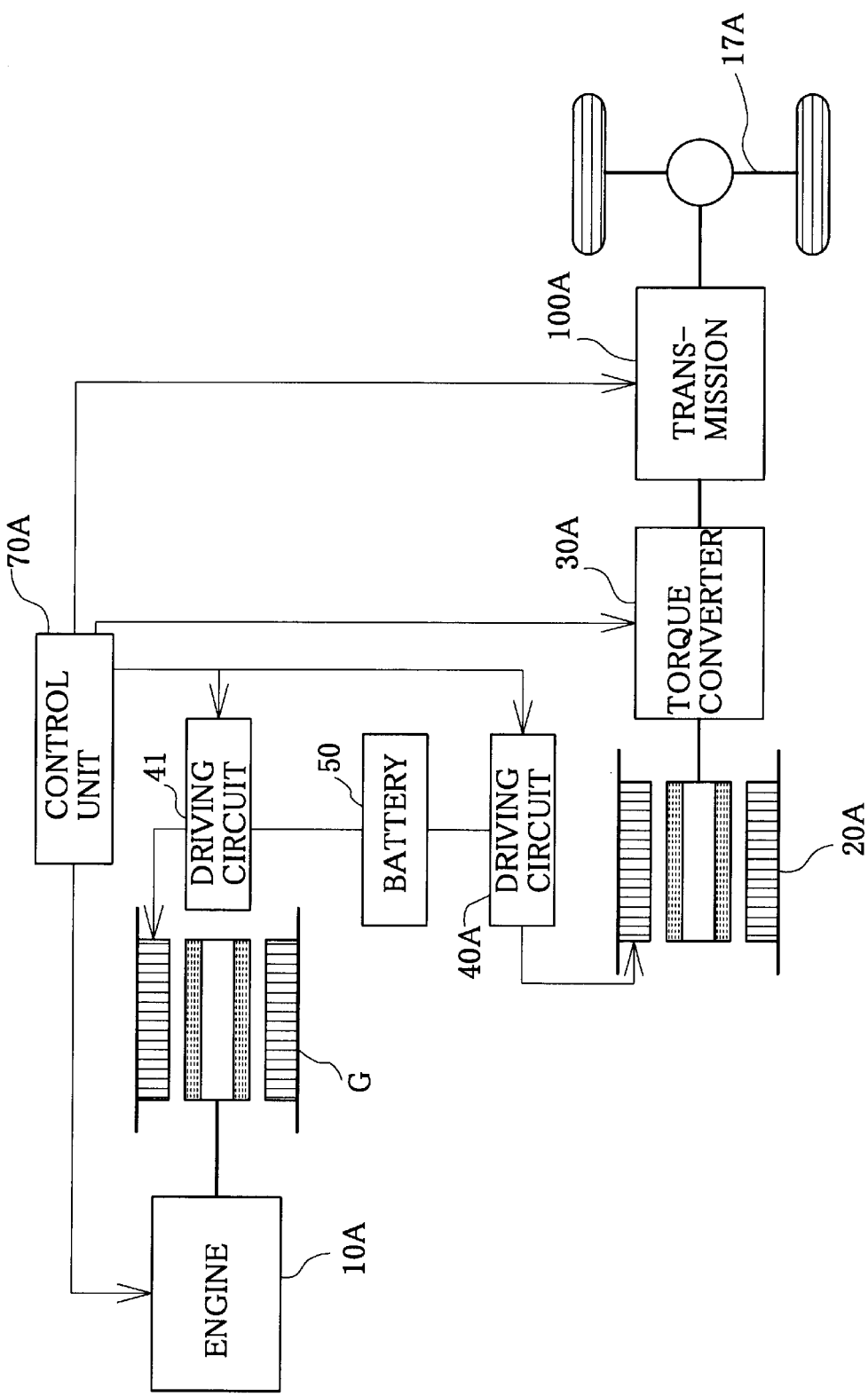
FIG. 27 schematically illustrates the construction of a series hybrid vehicle in a second embodiment of the present invention.

FIG. 27 shows the structure of a series hybrid vehicle. In the series hybrid vehicle, a motor 20A as the power source is connected with an axle 17A via a torque converter 30A and a transmission 100A. An engine 10A is not connected with the axle 17A but is linked with a generator G. The motor 20A is connected to a battery 50A via a driving circuit 40A. The generator G is connected with the battery 50A via a driving circuit 41. The driving circuits 40A and 41 are constructed as transistor inverters like the driving circuit of the first embodiment. The operations of these driving circuits 40A and 41 are controlled by a control unit 70A.

In the series hybrid vehicle of this configuration, the power output from the engine 10A is converted to electric power by means of the generator G. The electric power is accumulated in the battery 50A while being used to drive the motor 20A. The vehicle is driven with the power of the motor 20A. The motor 20A outputs a negative torque as the braking force, so as to effect the power-source braking. Like the parallel hybrid vehicle of the first embodiment, the series hybrid vehicle of this embodiment with the transmission 100A regulates the position of the change-speed gear in combination with the torque of the motor 20A, thus attaining the deceleration in a wide range set according to a driver's requirement.

In the hybrid vehicle of the first embodiment, the target torque of the motor 20 is calculated by subtracting the braking torque by the engine brake from the total torque to be output to the axle 17. In the hybrid vehicle of the second embodiment, on the other hand, the braking force by the engine brake is equal to zero, so that the braking torque to be output to the axle 17A is coincident with the target torque of the motor 20A.

The principle of the present invention is applicable to a vehicle using only the motor as the power source. The structure of such a vehicle corresponds to the structure of the series hybrid vehicle shown in FIG. 27 without the engine 10A, the generator G, and the driving circuit 41. Like the hybrid vehicles of the first and the second embodiments, the deceleration set according to a driver's requirement may be attained in a wide range by regulating the position of the change-speed gear in combination with the torque of the motor 20A linked with the axle in this vehicle.

(5) Third Embodiment

The above embodiments regard the hybrid vehicle having the engine and the motor as the available energy output source for driving. The principle of the present invention is applicable to a variety of vehicles of various configurations that enable regenerative braking by the motor. For example, the technique of the present invention may be applied to a vehicle that uses a motor mainly to drive auxiliary machinery while the engine is at a stop, to start the engine, and to effect the regenerative braking, and does not use the motor, in principle, as the power source for driving. An example of such application is described below as a third embodiment of the present invention.

Figure 28:
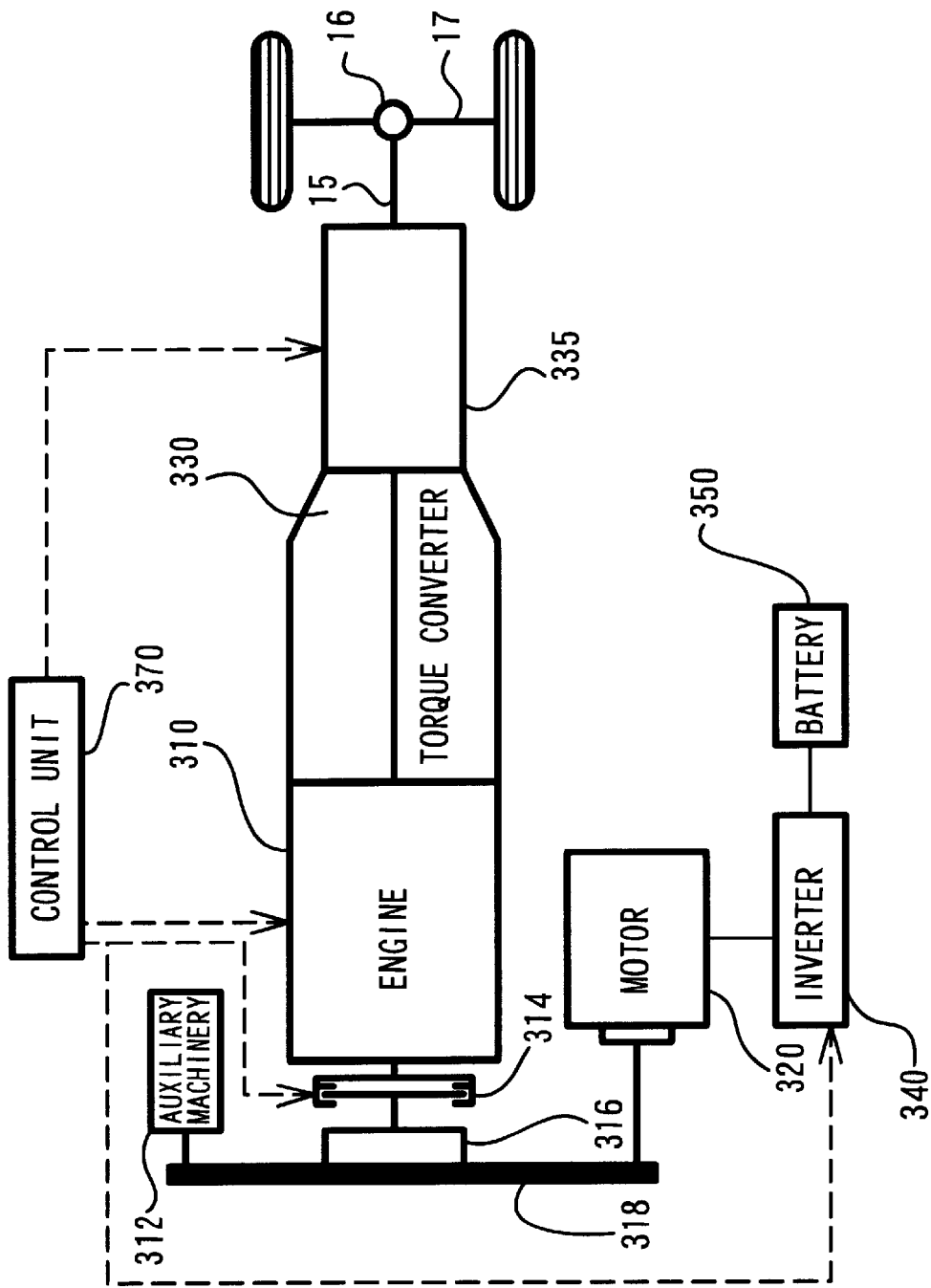
FIG. 28 schematically illustrates the construction of a vehicle in a third embodiment of the present invention.

FIG. 28 schematically illustrates the structure of a vehicle in the third embodiment. This vehicle has an engine 310 as the power source for driving. The power of the engine 310 is transmitted for driving in the sequence of a torque converter 330, a transmission 335, the drive shaft 15, the differential gear 16, and the axle 17. The structures of the torque converter 330 and the transmission 335 are identical with those of the torque converter 30 and the transmission 100 in the first embodiment.

In the vehicle of the third embodiment, a pulley 316 is connected with a crankshaft of the engine 310 via a clutch 314. The pulley 316 is further connected with auxiliary machinery 312 and a motor 320 via a power transmission belt 318 that allows mutual power transmission. The auxiliary machinery 312 includes a compressor of an air conditioner and an oil pump for power steering. The motor 320 is a synchronous motor and is driven with a battery 350 as the electric supply through switching operations of an inverter 340 working as a driving circuit. The motor 320 is also rotated by an external force to function as a generator.

The operations of the respective constituents included in the vehicle of the third embodiment are controlled by a control unit 370. Although not being illustrated specifically, signals from various switches and sensors, for example, the accelerator pedal position sensor, that enable the driver to specify the speed reduction rate are input into the control unit 370 in the same manner as discussed in the first embodiment.

The following describes general operations of the vehicle of the third embodiment. As mentioned previously, the vehicle is driven with the power of the engine 310. During the drive, the clutch 314 is coupled, so as to cause the auxiliary machinery 312 to be driven with the power of the engine 310.

While the clutch 314 is coupled, the motor 320 is rotated via the power transmission belt 318, so that the vehicle is braked by the regenerative operation of the motor 320.

When the vehicle stops even temporarily, for example, at a traffic light, the control unit 370 stops the operation of the engine 310. At the same time, the control unit 370 releases the clutch 314, so as to cause the motor 320 to carry out the power operation and drive the auxiliary machinery 312 with the power of the motor 320. In order to start driving the vehicle that has just been at a stop, the control unit 370 couples the clutch 314 to crank the engine 310 with the power of the motor 320 and start the engine 310. During the drive, the power of the motor 320 is used, in principle, only for cranking the engine 310. One possible modification continues the operation of the motor 320 to assist the power at the time of starting the vehicle, until the vehicle reaches a preset vehicle speed.

The vehicle of the third embodiment stops the operation of the engine 310 while the vehicle is at a stop. This arrangement effectively saves the fuel consumption.

The vehicle of the third embodiment enables the regenerative braking by the motor 320 and thus readily attains the speed reduction corresponding to the step-on amount of the accelerator pedal like the first embodiment. The connection of the motor 320, the engine 310, the torque converter 330, and the transmission 335 under the coupling condition of the clutch 314 is equivalent to the connection in the first embodiment, from the viewpoint of the application of the braking force. The series of control processing discussed in the first embodiment is accordingly applied for the braking control executed in the vehicle of the third embodiment. The torque by the regenerative braking of the motor 320 is transmitted to the drive shaft 15 via the transmission 335.

Like the first embodiment, regulation of the transmission 335 in combination with the torque of the motor 320 enables the speed reduction rate to be adjusted in a wide range.

As described above, the present invention is not restricted to the vehicle with the motor mounted thereon for driving. The third embodiment regards the structure in which the braking torque of the motor 320 is transmitted to the drive shaft 15 via the transmission 335. The vehicle may, however, have a motor for regenerative braking that is directly connected with the drive shaft 15.

(6) Fourth Embodiment

In the respective embodiments discussed above, the relationship between the accelerator position and the speed reduction rate or the braking torque is determined, irrespective of the operation of the brake pedal. The relationship may alternatively be changed according to the operation of the brake pedal. In the embodiment discussed above, the braking control is carried out at the coupling position of the lockup clutch 31. As described previously, the coupling state of the lockup clutch 31 may be controlled according to the driving state of the vehicle. Such control is discussed below as a fourth embodiment of the present invention.

Figure 29:
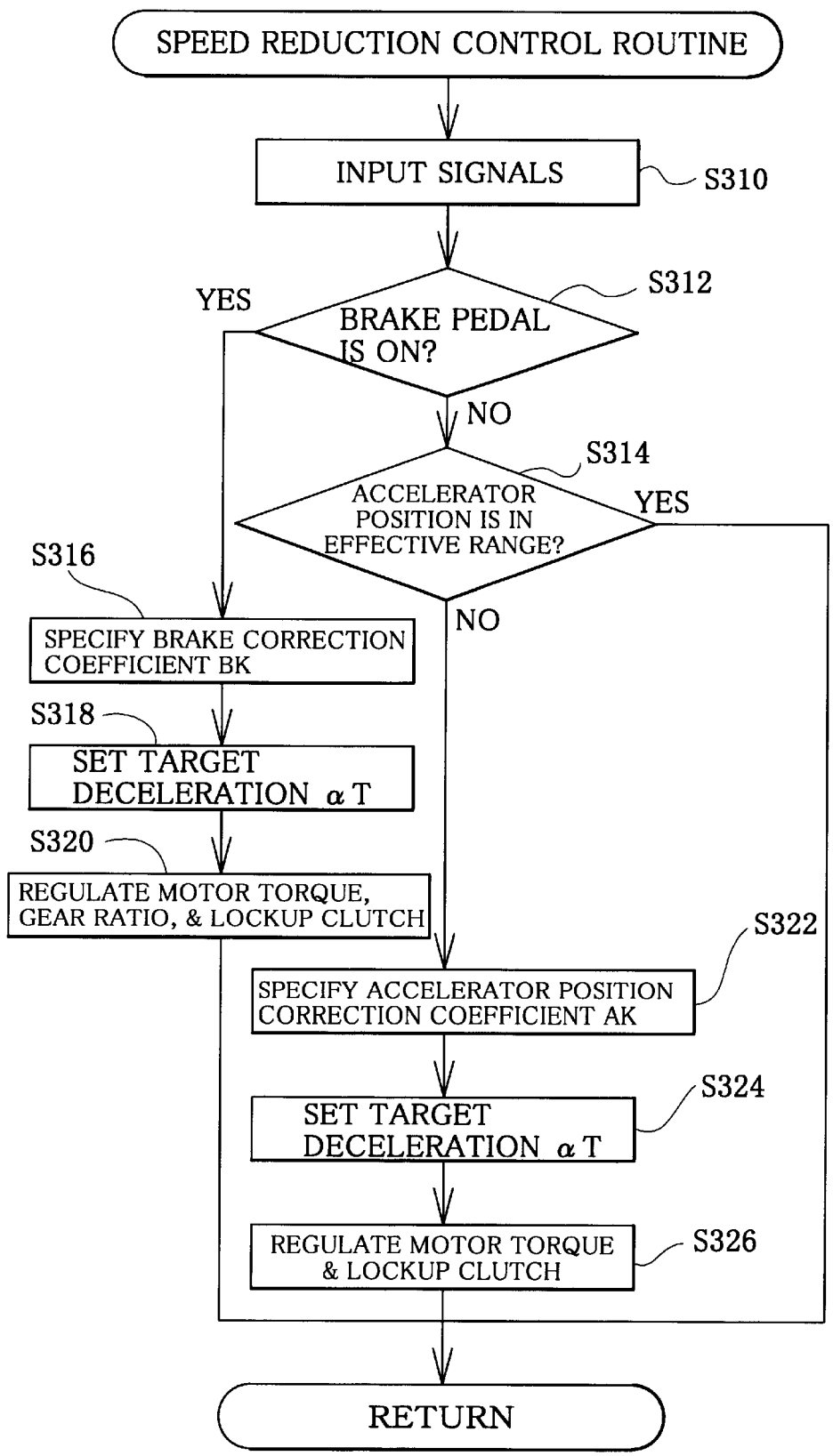
FIG. 29 is a flowchart showing a speed reduction control routine executed in a fourth embodiment of the present invention.

FIG. 29 is a flowchart showing a speed reduction control routine executed in the fourth embodiment. The vehicle of the fourth embodiment has the same structure as that of the first embodiment. Like the first embodiment, the control unit 70 executes the speed reduction control routine to effect the power source braking of the vehicle.

When the program enters the speed reduction control routine, the CPU first receives input signals (step S310). In the same manner as the first embodiment, after the preset initialization process, the procedure inputs a variety of signals required for the speed reduction control. The signals input in the fourth embodiment include the signal representing the step-on amount of the brake pedal, as well as the signals representing the accelerator position, the vehicle speed, and the gearshift position. The procedure of the fourth embodiment changes the process of braking control according to the on-off state of the brake pedal (step S312).

When the brake pedal is in the ON state, the braking control follows the processing of steps S316 to S320. The process specifies a brake correction coefficient BK, sets a target deceleration αT by taking into account the correction coefficient BK, and controls the torque of the motor 20, the gear ratio, and the lockup clutch 31 to attain the setting of the target deceleration αT.

Figure 30:
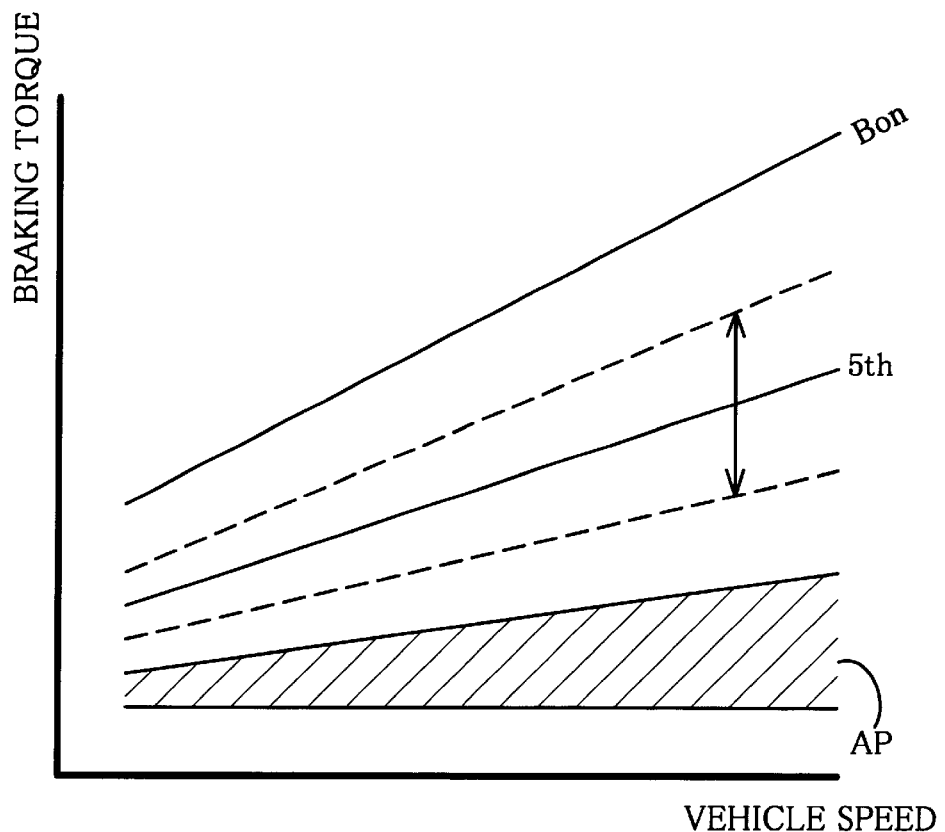
FIG. 30 shows settings of braking torque in the fourth embodiment.

In the procedure of the fourth embodiment, the brake correction coefficient BK is set in the following manner to attain the greater deceleration in the ON state of the brake pedal than the deceleration in the OFF state of the brake pedal. FIG. 30 shows an example of settings of the braking torque in the fourth embodiment. When the accelerator pedal is in the range of play, the braking torque is set according to the accelerator position in the range of an area AP. At the full closed position of the accelerator pedal, the setting of the braking torque is significantly greater than the area AP. In the illustrated example, the gearshift position is set at the fifth speed. At the full closed position of the accelerator pedal, the setting of the braking torque is in a range about the braking torque on a solid line 5th, which is defined by the broken lines. The braking torque may be varied by the operations of the Decel and Can-Decel switches as discussed in the above embodiment. Step-on of the brake pedal enhances the regenerative braking force of the motor to shift the braking torque from the solid line 5th to another straight line Bon. The braking torque on the straight line Bon does not include the braking torque by the wheel braking, which is effected by the operation of the brake pedal. The braking torque actually applied to the vehicle thus further increases according to the step-on amount of the brake pedal. The driver generally requires an increase in deceleration when stepping on the brake pedal. The arrangement of varying the braking force of the power source braking according to the operation of the brake pedal as shown in FIG. 30 attains the braking control suitable for the driver's feeling. The procedure discussed here varies the setting of the braking torque according to the operation of the brake pedal. One possible modification may set the braking torque in the pluralistic manner by taking into account a diversity of other parameters, such as the vehicle speed and the gearshift position.

The target deceleration $\alpha T$ is set by multiplying the deceleration, which is specified by taking into account a variety of factors including the gearshift position and the vehicle speed as discussed in the first embodiment, by the brake correction coefficient BK. In the procedure of the fourth embodiment, the target deceleration $\alpha T$ is set by multiplication of the brake correction coefficient BK=1 in the OFF state of the brake pedal and by multiplication of the brake correction coefficient BK=1.1 in the ON state of the brake pedal.

Figure 31:
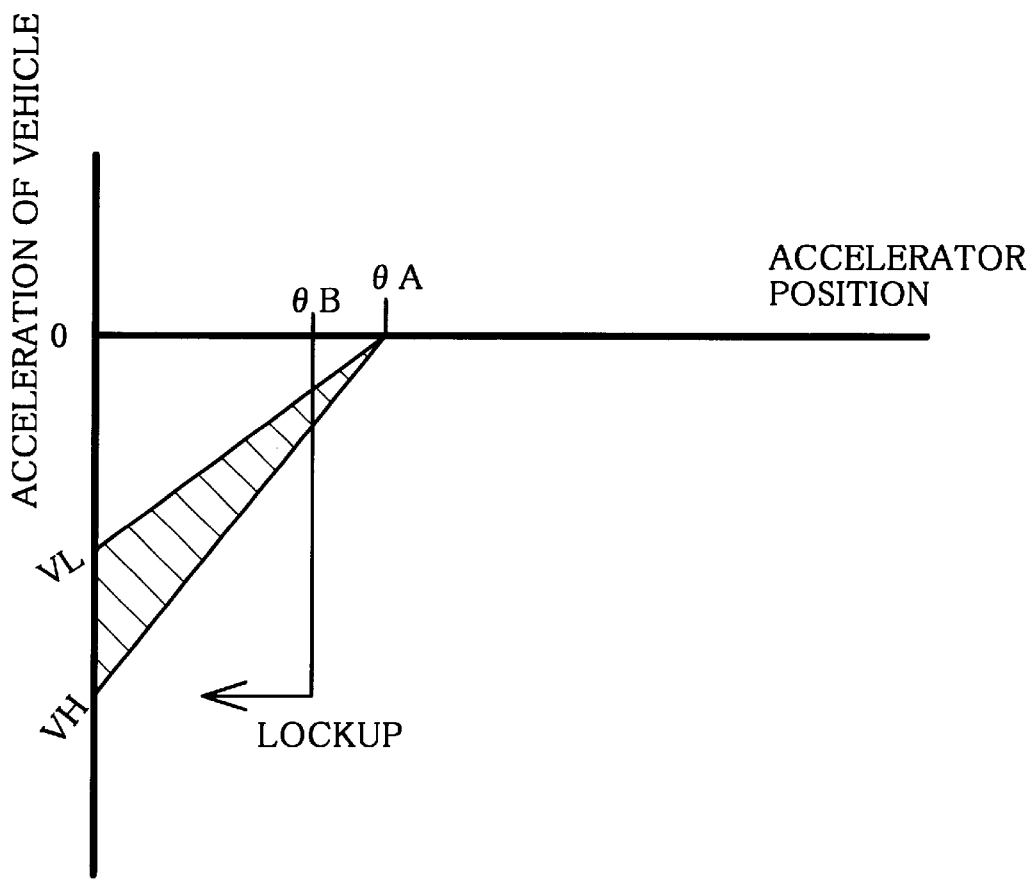
FIG. 31 shows the coupling state of a lockup clutch.

The process of the control (step S320) to attain the setting of the target deceleration is similar to that of the first embodiment. The difference from the first embodiment is that the procedure of the fourth embodiment regulates the coupling state of the lockup clutch 31. The following describes the regulation of the lockup clutch 31. FIG. 31 is a graph showing the acceleration of the vehicle plotted against the accelerator position. Only the acceleration by the power source braking is shown in this graph.

Like the vehicle of the first embodiment, the vehicle of the fourth embodiment is subjected to the braking control by the power source braking, that is, exposed to a negative acceleration, when the accelerator position is not greater than a predetermined value $\theta A$. As described previously, the negative acceleration by the power source braking is varied according to the vehicle speed and is defined by a hatched area in FIG. 31. An upper limit VL is the acceleration at low speed, and a lower limit VH is the acceleration at high speed.

When the accelerator position reaches a preset level $\theta B$, which is a little smaller than $\theta A$, the control procedure makes the lockup clutch 31 coupled. In the range of the accelerator position that is smaller than the preset level $\theta B$, the lockup clutch 31 is kept in the fully coupled state. The arrangement of setting the accelerator position $\theta B$ to couple the lockup clutch 31 immediately after the start of the braking control by the power source braking with a decrease in accelerator position during a drive enables the braking control by the power source braking to be well suited to the driver's image. In the ON state of the brake pedal, the accelerator position is generally set equal to zero. The control procedure thus makes the lockup clutch 31 coupled according to the map of FIG. 30.

The control of step S320 is carried out under the condition that the regulation of the gear ratio has the lowest priority. The control procedure first regulates the lockup clutch 31 according to the accelerator position and then the torque of the motor 20 to attain the target deceleration $\alpha T$ according to the coupling state of the lockup clutch 31. The control procedure increases the gear ratio by one step only when the maximum braking torque by the motor 20 can not attain the target deceleration $\alpha T$. The control process with such a priority order effectively prevents the frequent change of the gear ratio.

When the brake pedal is in the OFF state, on the other hand, the program carries out the similar control process to that of the first embodiment. When the accelerator position is in the effective range, that is, not less than the predetermined value $\theta A$ in the map of FIG. 30 (step S314), the braking control by the power source braking is not required. The program thus immediately exits from the speed reduction control routine without any further processing. When the accelerator position is less than the effective range (step S314), on the other hand, the program follows the processing of steps S322 to S326 to implement the braking control by the power source braking.

In the similar manner to that of the first embodiment, the process specifies the correction coefficient AK according to the accelerator position (step S322) and sets the target deceleration $\alpha T$ by taking into account the correction coefficient AK (step S324). This series of processing is identical with that of the first embodiment and is not specifically described here.

The process then regulates the torque of the motor 20 and the lockup clutch 31 to attain the setting of the target deceleration $\alpha T$ (step S326). The gear ratio is not the target of regulation in the OFF state of the brake pedal. As in the case of the ON state of the brake pedal (step S320), the lockup clutch 31 is regulated according to the map of FIG. 30 and is coupled in the range of the accelerator position that is not greater than $\theta B$.

The gear ratio is not regulated in this state, because of the reason discussed below. In the case of the braking control in the OFF state of the brake pedal, acceleration of the vehicle is typically required immediately after the braking control. There is accordingly a high possibility that the gear ratio changed during the braking control is required to immediately change again to a level suitable for acceleration. The arrangement of not regulating the gear ratio for the braking control in the OFF state of the brake pedal advantageously prevents the gear ratio from being changed frequently. As in the case of the braking control in the ON state of the brake pedal, the procedure may give the lowest priority to regulation of the gear ratio.

The vehicle of the fourth embodiment discussed above varies the deceleration according to the on-off state of the brake pedal, thus attaining the braking control suited to the driver's feeling. Regulation of the lockup clutch 31 in the above manner further enhances the suitability to the driver's feeling. Selected execution of regulation of the gear ratio according to the on-off state of the brake pedal further ensures the braking control that matches the driver's feeling.

The procedure of the fourth embodiment carries out the binary control, that is, couples or releases the lockup clutch 31. The lockup clutch 31 may be coupled under the slipping condition of the torque converter 30. The strength of the coupling force may be regulated, based on some parameters, for example, the vehicle speed. In such cases, the control procedure regulates the braking torque of the motor 20 according to the coupling force of the lockup clutch 31, so as to attain the target deceleration. An example of regulating the torque of the motor 20 is shown in FIG. 32.

Figure 32:
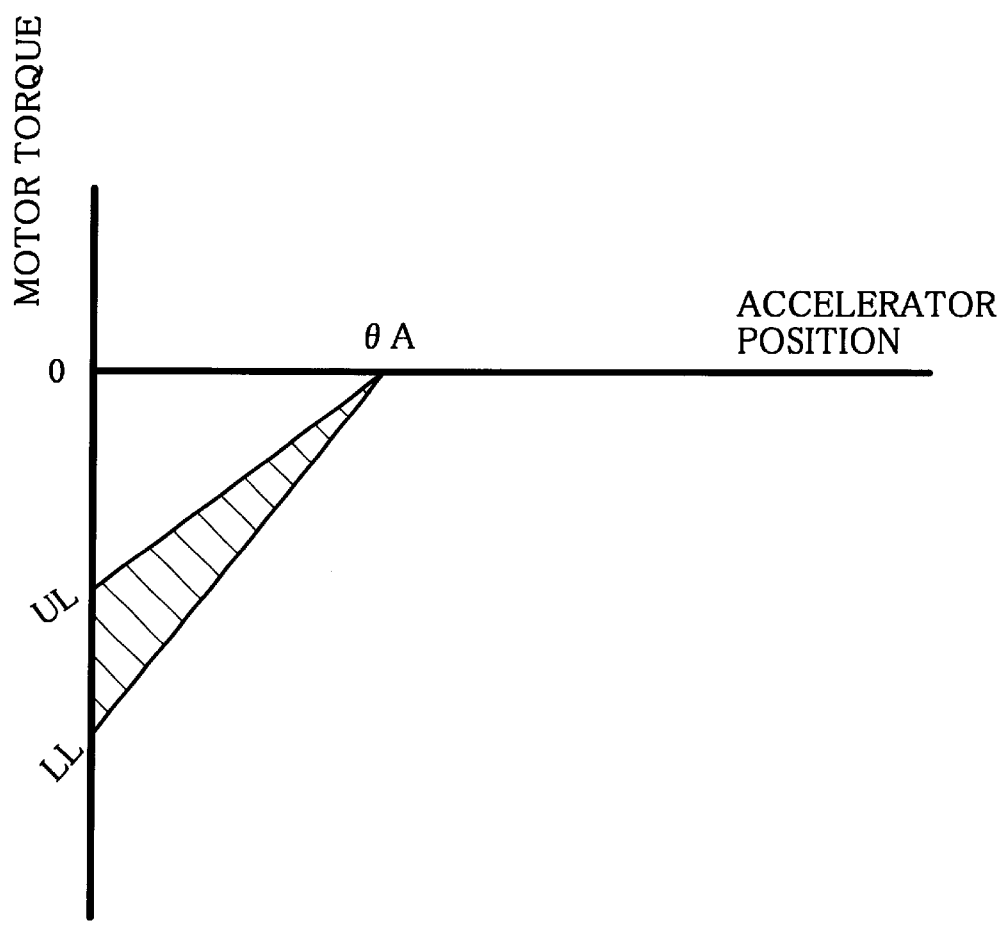
FIG. 32 shows the relationship between the coupling force of the lockup clutch and the braking torque of the motor.

FIG. 32 shows the relationship between the accelerator position and the motor torque. The power source braking is effective in a specific range of the accelerator position that is not greater than $\theta A$. The motor 20 accordingly outputs a negative torque in this range. Here it is assumed that the coupling force of the lockup clutch 31 is flexibly regulated. When the lockup clutch 31 is fully coupled, the torque of the motor 20 is transmitted as the braking force to the drive shaft without any loss. The braking torque of the motor 20 should thus be required to have a relatively small absolute value. When the lockup clutch 31 is in the released state, on the other hand, the braking torque of the motor 20 should have a relatively large absolute value. The output torque of the motor 20 is thus varied in a hatched area according to the coupling state of the lockup clutch 31. An upper limit UL of the torque corresponds to the fully coupled state of the lockup clutch 31, and a lower limit LL corresponds to the released state. Application of a map that specifies the braking torque of the motor 20 according to the coupling state of the lockup clutch 31 facilitates the achievement of the target deceleration.

(7) Other Modifications

In the embodiments discussed above, the driver specifies the setting of the target deceleration. The speed reduction rate is, however, not restricted to the deceleration, but a braking force or a braking rate applied to the wheels may be set to the speed reduction rate. The above embodiments regard the process of controlling the regenerative braking by means of the motor with the target torque as the parameter. A variety of other braking force-related parameters may, however, be used in place of the target torque. For example, the electric power generated by the regenerative braking or the electric current flowing through the motor may be used as the parameter of the control.

The embodiments described above use the transmission 100 that changes the gear ratio in a stepwise manner. Any other suitable structure, for example, a mechanism of continuously varying the gear ratio, may be employed for the transmission 100.

The present invention is not restricted to the above embodiments or their modifications, but there may be many other modifications, changes, and alterations without departing from the scope or spirit of the main characteristics of the present invention. In one possible modification, the variety of control processing discussed in the above embodiments may be actualized by the hardware configuration. Another modification carries out only part of the variety of control processing discussed in the above embodiments.

Industrial Applicability

The technique of the present invention is applied to arbitrarily regulate the speed reduction rate in the course of braking control in the vehicle that is braked with the torque of the motor.

What is claimed is:

1. A vehicle that is driven while regulating power output from a power source to a drive shaft through an operation of an accelerator unit, the vehicle comprising:

a power transmittable engine that is capable of transmitting power to the drive shaft;

a motor that is capable of applying a braking force to the drive shaft;

a detection unit that measures an operating amount of the accelerator unit;

a target speed reduction rate setting unit that, when the measured operating amount of the accelerator unit is not greater than a predetermined level, sets a target speed reduction rate of the vehicle corresponding to the measured operating amount, based on a predetermined relationship between operating amount and speed reduction rate;

a motor driving state specification unit that specifies a target driving state of the motor to apply a required braking force to the drive shaft, in order to attain the setting of the target speed reduction rate;

a control unit that controls the motor to be driven in the target driving state, so as to brake the vehicle;

a transmission that, in the course of applying a braking force, is capable of selecting one among a plurality of different gear ratios and is interposed between the motor and the drive shaft;

a selection unit that selects a target gear ratio to attain the target speed reduction rate with a torque of the motor; and a change speed control unit that controls the transmission to effect the target gear ratio.

2. A vehicle in accordance with claim 1, wherein the predetermined relationship referred to by the target speed reduction rate setting unit increases the speed reduction rate with a decrease in operating amount.

3. A vehicle in accordance with claim 2, wherein the predetermined relationship referred to by the target speed reduction rate setting unit decreases the speed reduction rate inversely proportional to the operating amount.

4. A vehicle in accordance with claim 1, wherein the predetermined relationship referred to by the target speed reduction rate setting unit gives a significantly greater speed reduction rate in a specific state practically corresponding to the operating amount of zero than speed reduction rates in residual states of the operating amount.

5. A vehicle in accordance with claim 1, the vehicle further comprising:

a braking mechanism that utilizes mechanical frictional force, wherein the predetermined relationship referred to by the target speed reduction rate setting unit is specified according to an operating state of the braking mechanism, so that a speed reduction rate by the motor in an operating state of the braking mechanism is greater than a speed reduction rate in a non-operating state.

6. A vehicle in accordance with claim 1, the vehicle further comprising:

a vehicle speed detection unit that measures vehicle speed of the vehicle, wherein the target speed reduction rate setting unit sets the target speed reduction rate, based on the measured operating amount and the measured vehicle speed.

7. A vehicle in accordance with claim 1, wherein the target speed reduction rate setting unit sets the target speed reduction rate, based on the measured operating amount and the target gear ratio.

8. A vehicle in accordance with claim 7, wherein the predetermined relationship referred to by the target speed reduction rate setting unit is specified to cause a variable range of the speed reduction rate corresponding to the operating amount to be allowed in a fixed gear ratio of the transmission.

9. A vehicle in accordance with claim 1, the vehicle further comprising:

a manipulation unit that is independent of the accelerator unit and enables a driver of the vehicle to specify a desired speed reduction rate in the course of braking control with the motor; and a change unit that changes a setting range of the target speed reduction rate of the vehicle according to the operating amount of the accelerator unit, in response to an operation of the manipulation unit.

10. A vehicle in accordance with claim 9, wherein the manipulation unit comprises a first switch that shifts the setting range in a stepwise manner in a direction of increasing the speed reduction rate, and a second switch that shifts the setting range in a stepwise manner in a direction of decreasing the speed reduction rate.

11. A vehicle in accordance with claim 10, wherein the first switch and the second switch are mounted on a steering wheel of said vehicle.

12. A vehicle in accordance with claim 9, wherein the manipulation unit comprises a mechanism that allows the driver to specify the desired speed reduction rate by sliding a lever along a preformed slide groove.

13. A vehicle in accordance with claim 12, wherein the manipulation unit comprises a mechanism that enables setting of the speed reduction rate to be continuously varied by a slide of the lever.

14. A vehicle in accordance with claim 9, the vehicle further comprising:
a gearshift lever that is operated to input a selected gearshift position, which represents a selectable range of the plurality of gear ratios while driving the vehicle,
wherein the manipulation unit and the gearshift lever have a common mechanism and the transmission is capable of selecting one among the plurality of different gear ratios for power output from the power source.

15. A vehicle in accordance with claim 14, wherein the manipulation unit comprises a slide groove, along which the gearshift lever is slid while driving the vehicle, and another slide groove, along which the gearshift lever is slid to specify the desired speed reduction rate, these slide grooves being provided in series.

16. A vehicle in accordance with claim 9, the vehicle further comprising an information unit that gives the driver information regarding a setting state of the speed reduction rate.

17. A vehicle that is driven while regulating power output from a power source to a drive shaft through an operation of an accelerator unit, the vehicle comprising:
a power transmittable engine that is capable of transmitting power to the drive shaft;
a motor that is capable of applying a braking force to the drive shaft;
a detection unit that measures an operating amount of the accelerator unit;
a target speed reduction rate setting unit that, when the measured operating amount of the accelerator unit is not greater than a predetermined level, sets a target speed reduction rate of the vehicle corresponding to the measured operating amount, based on a predetermined relationship between operating amount and speed reduction rate;
a motor driving state specification unit that specifies a target driving state of the motor to apply a required braking force to the drive shaft, in order to attain the setting of the target speed reduction rate;
a control unit that controls the motor to be driven in the target driving state, so as to brake the vehicle;
a torque converter having a mechanism that converts the output power to a combination of torque and revolving speed by utilizing a slip between two rotating members and transmits the converted power, and a lock mechanism that locks up relative rotations of the two rotating members to allow direct transmission of the output power, the mechanism and the lock mechanism being provided on a pathway for transmitting the braking force of the motor to the drive shaft; and
a lock mechanism regulation unit that, when the observed operating amount of the accelerator unit is not greater than a predetermined value, regulates the lock mechanism to fall into a specific state for restricting the slip between the two rotating members of the torque converter.

18. A vehicle in accordance with claim 17, wherein the specific state locks up the relative rotations of the two rotating members.

19. A vehicle in accordance with claim 17, wherein the predetermined value is set in a range smaller than a specific operating amount to start braking control.

20. A vehicle in accordance with claim 17, the vehicle further comprising:
a transmission that is capable of selecting one among a plurality of different gear ratios to transmit the braking force of the motor to the drive shaft;
a gearshift position input unit that is manipulated to specify a selectable range of gear ratio of the transmission; and
a mechanical braking mechanism that is operated to apply the braking force to the drive shaft by mechanical frictional force,
wherein the control unit regulates the gear ratio to allow selection of a greater gear ratio exceeding the selectable range specified by the gearshift position input unit, when the mechanical braking mechanism is operated.

21. A method of controlling a drive of a vehicle that is driven while regulating power output from a power source to a drive shaft through an operation of an accelerator unit, the vehicle being braked with a torque of a motor, comprising:
measuring an operating amount of the accelerator unit;
when the observed operating amount of the accelerator unit is not greater than a predetermined level, setting a target speed reduction rate of the vehicle corresponding to the observed operating amount, based on a preset relationship between operating amount and speed reduction rate;
specifying a target driving state of the motor, in order to attain the setting of the target speed reduction rate;
actuating the motor in the target driving state, so as to brake the vehicle;
selecting one among a plurality of different gear ratios within a transmission interposed between the motor and the drive shaft in the course of applying braking force;
selecting a target gear ratio to attain the target speed reduction rate with a torque of the motor; and
controlling the transmission to effect the target gear ratio.

22. A vehicle that is driven while regulating power output from a power source to a drive shaft through an operation of an accelerator unit, the vehicle comprising:
a motor that is capable of applying a braking force to the drive shaft;
a detection unit that measures an operating amount of the accelerator unit;
a target speed reduction rate setting unit that, when the measured operating amount of the accelerator unit is not greater than a predetermined level, sets a target speed reduction rate of the vehicle corresponding to the measured operating amount, based on a predetermined relationship between operating amount and speed reduction rate;
a motor driving state specification unit that specifies a target driving state of the motor to apply a required braking force to the drive shaft, in order to attain the setting of the target speed reduction rate;

a control unit that controls the motor to be driven in the target driving state, so as to brake the vehicle, wherein the predetermined relationship referred to by the target speed reduction rate setting unit gives a significantly greater speed reduction rate in a specific state practically corresponding to the operating amount of zero than speed reduction rates in residual states of the operating amount;

a transmission that, in the course of applying a braking force, is capable of selecting one among a plurality of different gear ratios and is interposed between the motor and the drive shaft;

a selection unit that selects a target gear ratio to attain the target speed reduction rate with a torque of the motor; and a change speed control unit that controls the transmission to effect the target gear ratio.

23. A vehicle that is driven while regulating power output from a power source to a drive shaft through an operation of an accelerator unit, the vehicle comprising:

a motor that is capable of applying a braking force to the drive shaft;

a detection unit that measures an operating amount of the accelerator unit;

a target speed reduction rate setting unit that, when the measured operating amount of the accelerator unit is not greater than a predetermined level, sets a target speed reduction rate of the vehicle corresponding to the measured operating amount, based on a predetermined relationship between operating amount and speed reduction rate;

a motor driving state specification unit that specifies a target driving state of the motor to apply a required braking force to the drive shaft, in order to attain the setting of the target speed reduction rate; and a control unit that controls the motor to be driven in the target driving state, so as to brake the vehicle;

a torque converter having a mechanism that converts the output power to another combination of torque and revolving speed by utilizing a slip between two rotating members and transmits the converted power, and a lock mechanism that locks up relative rotations of the two rotating members to allow direct transmission of the output power, the mechanism and the lock mechanism being provided on a pathway for transmitting the braking force of the motor to the drive shaft; and a lock mechanism regulation unit that, when the measured operating amount of the accelerator unit is not greater that a predetermined value, regulates the lock mechanism to fall into a specific state for restricting the slip between the two rotating members of the torque converter.

* * * * *